US012062294B2

(12) United States Patent
Proudfoot et al.

(10) Patent No.: US 12,062,294 B2
(45) Date of Patent: Aug. 13, 2024

(54) AUGMENTATIVE AND ALTERNATIVE COMMUNICATION (AAC) READING SYSTEM

(71) Applicant: Aacapella Holdings Pty Ltd, Valentine (AU)

(72) Inventors: Katherine Alison Proudfoot, Valentine (AU); Richard Barton Proudfoot, Valentine (AU)

(73) Assignee: Aacapella Holdings Pty Ltd, Valentine (AU)

( * ) Notice: Subject to any disclaimer, the term of this patent is extended or adjusted under 35 U.S.C. 154(b) by 0 days.

(21) Appl. No.: 17/505,335

(22) Filed: Oct. 19, 2021

(65) Prior Publication Data

US 2022/0036759 A1 Feb. 3, 2022

Related U.S. Application Data

(63) Continuation of application No. PCT/AU2020/050399, filed on Apr. 24, 2020.

(30) Foreign Application Priority Data

Apr. 24, 2019 (AU) .................................. 2019901389

(51) Int. Cl.
*G09B 17/00* (2006.01)
*G06F 3/16* (2006.01)
(Continued)

(52) U.S. Cl.
CPC ........... *G09B 17/006* (2013.01); *G06F 3/167* (2013.01); *G06F 40/205* (2020.01); *G06F 40/242* (2020.01); *G09B 7/04* (2013.01)

(58) Field of Classification Search
CPC ....... G09B 17/006; G09B 7/04; G06F 40/205; G06F 40/242; G06F 3/167
See application file for complete search history.

(56) References Cited

U.S. PATENT DOCUMENTS 6,442,523 B1   8/2002 Siegel
6,754,625 B2 * 6/2004 Olsen ...................... G10L 15/06
                                                    704/235

(Continued)

FOREIGN PATENT DOCUMENTS

GB          2465585 A      6/2010

OTHER PUBLICATIONS

International Search Report and Written Opinion of the International Searching Authority mailed Jun. 25, 2020 in International Patent Application No. PCT/AU2020/050399. 8 pages.
(Continued)

*Primary Examiner* — Xuan M Thai
*Assistant Examiner* — Sadaruz Zaman
(74) *Attorney, Agent, or Firm* — Kilpatrick Townsend & Stockton LLP

(57) ABSTRACT

An augmentative and alternative communication (AAC) system and methods therefore are provided for assisting in learning to read. The system stores book data capturing the sequence of a book and dictionary which is used by a display controller for displaying symbols on an AAC reading user interface. This enables set of symbols to be displayed for each word which include a symbols having a contextually appropriate meaning for the current word being read within a displayed group of symbols. A reader conveys their understanding of the word by selecting the correct symbol. Selecting a symbol triggers audio output of the word associated with the symbol.

20 Claims, 52 Drawing Sheets

(51) Int. Cl.
*G06F 40/205* (2020.01)
*G06F 40/242* (2020.01)
*G09B 7/04* (2006.01)

(56) References Cited

U.S. PATENT DOCUMENTS

| | | | | |
|---|---|---|---|---|
| 7,402,042 | B2* | 7/2008 | Kelley | G09B 5/02 |
| | | | | 434/167 |
| 8,977,779 | B2* | 3/2015 | Pratt | G09B 19/04 |
| | | | | 709/200 |
| 9,251,717 | B2* | 2/2016 | LoStracco | G09B 5/06 |
| 9,595,171 | B2* | 3/2017 | Hurtig | G06F 3/0487 |
| 9,679,496 | B2* | 6/2017 | Zilberman | G09B 5/06 |
| 10,262,555 | B2* | 4/2019 | Campbell | G09B 21/00 |
| 10,283,013 | B2* | 5/2019 | Cortes | G09B 5/065 |
| 10,497,368 | B2* | 12/2019 | Rose | G06F 16/685 |
| 10,649,612 | B2* | 5/2020 | Nelson | G06F 3/0483 |
| 10,740,804 | B2* | 8/2020 | Spivack | G06F 3/04815 |
| 10,866,484 | B2* | 12/2020 | Lin | G02F 1/3553 |
| 10,873,175 | B2* | 12/2020 | Ramer | H01S 5/4087 |
| 10,942,701 | B2* | 3/2021 | Boesen | H04R 1/1083 |
| 10,949,012 | B2* | 3/2021 | Choi | G06F 3/016 |
| 10,996,924 | B2* | 5/2021 | Nicholson | G06F 3/1446 |
| 11,551,568 | B2* | 1/2023 | Raynaud | G09B 5/06 |
| 11,598,884 | B2* | 3/2023 | Jackson | G01S 19/32 |
| 11,887,398 | B2* | 1/2024 | Rosenberg | G06V 40/67 |
| 2006/0257827 | A1* | 11/2006 | Ellenson | G10L 13/033 |
| | | | | 434/112 |
| 2007/0259318 | A1* | 11/2007 | Harrison | G09B 21/00 |
| | | | | 340/4.13 |
| 2010/0007507 | A1* | 1/2010 | Thompson | A61F 4/00 |
| | | | | 340/815.69 |
| 2011/0257977 | A1* | 10/2011 | Greenberg | G10L 13/00 |
| | | | | 704/271 |
| 2013/0029299 | A1* | 1/2013 | Layman | G09B 19/06 |
| | | | | 434/157 |
| 2013/0344466 | A1* | 12/2013 | Yook | G09B 21/009 |
| | | | | 434/236 |
| 2015/0301721 | A1 | 10/2015 | Clark | |
| 2018/0067902 | A1 | 3/2018 | Nelson | |
| 2020/0375943 | A1* | 12/2020 | Park | A61P 35/00 |
| 2022/0036759 | A1* | 2/2022 | Proudfoot | G09B 5/06 |
| 2023/0252234 | A1* | 8/2023 | Hoang | G06N 3/042 |
| | | | | 704/9 |

OTHER PUBLICATIONS

Kent-Walsh, Jennifer et al.; "Effects of Parent Instruction on the Symbolic Communication of Children Using Augmentative and Alternative Communication During Storybook Reading"; American Journal of Speech-Language Pathology; 2010; vol. 19, No. 2; pp. 97-107 (13 total pages).

Thistle, Jennifer J. et al.; "Working Memory Demands of Aided Augmentative and Alternative Communication for Individuals with Developmental Disabilities"; Augmentative and Alternative Communication; 2013; vol. 29, No. 3; p. 235-245 (12 total pages).

Extended European Search Report dated Dec. 6, 2022 in EP Patent Application No. 20795676.4. 8 pages.

* cited by examiner

AUGMENTATIVE AND ALTERNATIVE COMMUNICATION (AAC) READING SYSTEM

CROSS-REFERENCES TO RELATED APPLICATIONS

This application is a continuation application of International Patent Application No. PCT/AU2020/050399 entitled "AUGMENTATIVE AND ALTERNATIVE COMMUNICATION (AAC) READING SYSTEM," filed on Apr. 24, 2020, which claims priority to Australian Patent Application No. 2019901389, filed on Apr. 24, 2019, each of which are herein incorporated by reference in their entirety for all purposes.

TECHNICAL FIELD

The field of the invention is Augmentative and Alternative Communication (AAC) systems. Applications of the present invention are for reading using AAC systems and learning to read.

BACKGROUND OF THE INVENTION

Many people with little or no natural speech rely on Augmentative and Alternative Communication (AAC) interfaces with digitised voice output to communicate. These existing AAC communication interfaces assist people to participate in conversation by enabling the person to select a button (typically showing a symbol) representing a word, phrase or sentence which is then spoken by the AAC communication interface. These AAC interfaces typically consist of specialised communication software loaded on a mobile computing device such as a tablet or iPad. Some of these AAC systems can also assist with writing by inserting the text associated with the button pressed into a word processing document or email.

One important shortcoming of existing AAC communication interfaces is that they do not have the capacity to allow students to effectively participate in oral reading activities, particularly in the case of sounding out unfamiliar words and reading aloud the connected text in books. Current best practice in reading instruction relies heavily on oral instruction and learning techniques such as sounding out words and reading aloud, placing students who rely on AAC interfaces to communicate at considerable educational disadvantage. Students who use AAC communication interfaces are at high risk of achieving poorer literacy outcomes than their peers and experiencing associated social and economic disadvantage. It should be appreciated that for an individual not capable of verbal communication, part of the problem for learning to read the individual not being able to convey what their understanding of a written word is to their educator. Use of a conventional AAC communication interface typically requires a user to know what the word (or concept, i.e. hunger, fatigue, topic of interest) is that they wish to communicate, then the user selects the appropriate symbol, which may require selections through multiple symbol displays or pop ups to get to the particular symbols required for the communication. In a scenario where a person is learning to read the individual may not know the symbols associated with the written word—this is part of what the individual has to learn. Thus, learning to read relying on conventional AAC communication interfaces is cumbersome and can be very frustrating for the student. Currently only ten percent of students who use AAC communication interfaces achieve a grade 2 level of reading comprehension including students with average and above average levels of intelligence. This is well below a functional level of literacy. Whilst there are multiple complex factors contributing to these poor outcomes, one important factor, is the lack of opportunity to effectively engage in literacy instruction.

BRIEF SUMMARY OF THE INVENTION

According to aspects of the present invention there is provided an augmentative and alternative communication (AAC) system comprising:
  a user interface module configured to control rendering of visual data on a display, output of audio data and receiving user inputs;
  a symbol display controller configured to control allocation of symbols to symbol positions for rendering and display in an AAC layout by the user interface module, and access a symbol library storing data a plurality symbol records each symbol record including a unique symbol identifier and being associated with a symbol graphic file for the symbol; and
  memory storing dictionary data and book data for at least one book,
    the dictionary data storing:
    a set of a plurality of word records, each word record being associated with a word and comprising a word identifier unique within the dictionary, the word text, a symbol identifier for the word, and sound data to enable audible reproduction of the word via the user interface, the set of word records including a record for each one of all words occurring in the text of the at least one book,
    one or more display data structures, each display data structure comprising a display data structure identifier, a data record defining a set of lexical elements and an order for display of the lexical elements in n display positions, each one of the n display positions being allocated to a respective one of the lexical elements, each lexical element comprises a set of up to m semantically related words, where each of the up to m words is a word variant associated with a different one of m word categories, each word variant being associated with a symbol conveying meaning for the word variant, each word of a book occurring within a display data structure for the book, and, for each book, the book data comprises book text data encoded to reference word identifiers for each word of text of the book, sequence data for the book, and identifiers of display data structures for all words in text of the book;
  wherein the symbol display controller is configured to for each word, determine a display data structure including the word and identify symbols to populate the n symbol display position based on word category based on sequence data for the book and received user input, such that the symbols displayed will correspond to at least the symbol required for the user to select via the user interface for audio output based on reading sequence of the book.

In an embodiment of the Augmentative and Alternative Communication (AAC) Reading System, the dictionary data includes for each word record phonetic data to enable reproduction of the whole word by the user interface; and sounding out data to enable sounding out of components of the word.

In an embodiment of the Augmentative and Alternative Communication (AAC) Reading System, the symbols are displayed in fixed positions for all books.

In an embodiment of the Augmentative and Alternative Communication (AAC) Reading System, a plurality of display data structures are used, each data structure defining display order for a set of n lexical elements, such that all n symbol positions on display grid will be populated for display. In some embodiment, for the n lexical elements in a data structure, each lexical element has a common number and type of semantically related words, such that for all word types all positions of the symbol display grid will be populated. In some embodiments the number of display positions n is a configurable system parameter value. In some embodiments the dictionary data stores a plurality of sets of display data structures, each set of display data structures corresponding to a different value of n.

In some embodiments of augmentative and alternative communication (AAC) systems the symbol library is also stored in the AAC system memory. In some embodiments of augmentative and alternative communication (AAC) systems the symbol library is stored in external network accessible memory and is accessed by the AAC system via communication network.

In some embodiments of augmentative and alternative communication (AAC) systems the user interface controller is configured to suppress display of text in conjunction with symbols based on configurable system parameters or selected operating mode for the AAC system. In some embodiments the user interface controller is configured to highlight sections of the display symbols based on configurable system parameters or selected operating mode for the AAC system.

Some embodiments further comprise a vocabulary database storing dictionary data for a plurality of books. In some embodiments the vocabulary database is accessible via a communication network. Some embodiments further comprise a book parsing system configured to facilitate generation of book data and word records for books.

In some embodiments the symbol display controller is configured to trigger highlighting of one or more symbols for display based on any one or more of: symbol type, word being read, and operating mode.

Some embodiments of augmentative and alternative communication (AAC) systems as further comprise an assessment module configured to monitor user inputs and assess symbol selection, log errors, and generate feedback regarding errors. In some embodiments the assessment module is further configured to provide a teaching mode wherein a word in text and an associated symbol are concurrently displayed to the user, and user input monitored to determine whether or not the user inputs the correct symbol.

Some embodiments of augmentative and alternative communication (AAC) systems further comprise a sounding module configured to sound out word components based on sound data for the word.

In some embodiments the word categories are based on Fitzgerald key categories. In an embodiment the word categories include: noun; verb; adjective/adverb; pronouns & people; and miscellaneous.

Another aspect provides a method of displaying symbols in an augmentative and alternative communication (AAC) system for reading a book, the method comprising the steps of:

accessing book sequence data to determine a word identifier for a current word to be read and identifier for a display data structure including the current word;

selecting symbol identifiers from the display data structure for n symbols to display based on the word identifier;

accessing a symbol library using the selected symbol identifiers to retrieve symbol graphic file data for the n symbols, the symbol library storing data a plurality symbol records each symbol record including a unique symbol identifier and being associated with a symbol graphic file for the symbol; and populating n symbols display positions for display using the retrieved symbol data, whereby a symbol representing the meaning of the current word is displayed within the set of n symbols for selection by the user to indicate the user's reading interpretation of the current word.

Another aspect provides a method of parsing book data to build data structures to be used in an augmentative and alternative communication (AAC) system for reading a book, the method comprising the steps of: analysing book text data to identify individual sentences within the book text and for each word in a sentence: determine a word identifier for the word in accordance with meaning of the word in the context of the sentence; determine a display data structure incorporating the word; and store the word identifier and display data structure identifier in sentence data for the sentence.

In an embodiment of the Augmentative and Alternative Communication (AAC) Reading System, the symbol display controller is further configured to control display of a predefined group of words contained within a Sheet Layer within a predefined area of the display, and these groups of words and symbols are changed for each word based on reading sequence.

In an embodiment of the Augmentative and Alternative Communication (AAC) Reading System, the symbol display controller is configured to enable the display of symbols representing all the words in a written language (most languages) or dialect in a way that every word can be selected by the user with no more than two key presses.

DETAILED DESCRIPTION OF THE INVENTION

Definitions

Figure 1A:
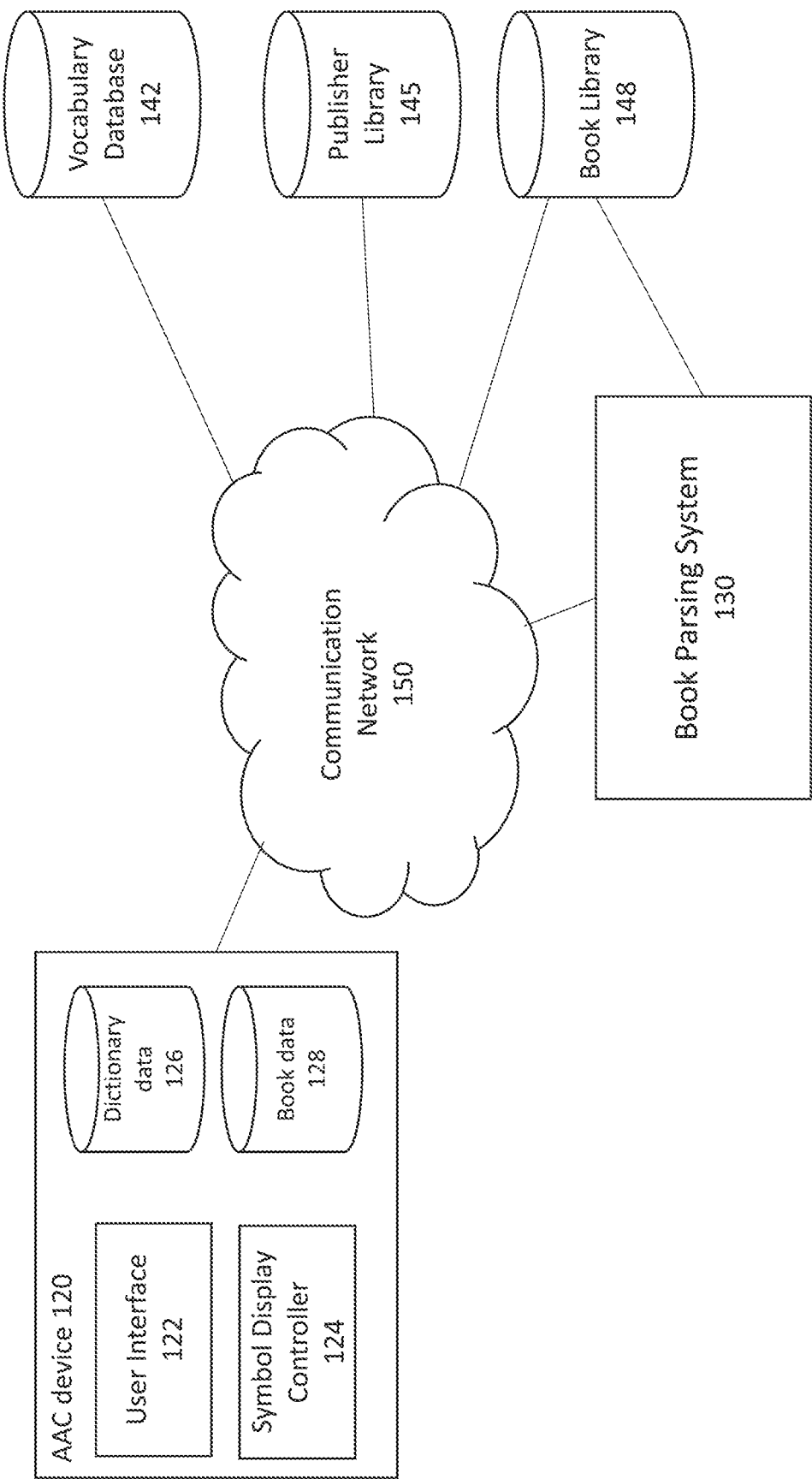
FIG. 1A is a block diagram of an embodiment of and AAC reading system.

The term 'AAC' refers to Augmentative and Alternative Communication. AAC is an umbrella term that encompasses the communication methods used to supplement or replace natural speech and/or writing for individuals with severe communication impairments and/or language impairments.

The term 'device' refers to any computing device, whether portable or not, that is able to be configured to run an embodiment of the current invention.

The term 'app' or 'Application' refers to an embodiment of the invention running on a user's device.

The term 'book' refers to, but is not limited to, any current and future developed text, both physical and virtual in form, covering a range of genres including but not limited to fiction and nonfiction books, plays, comics, text books, guided readers and independent readers (levelled books) and early story books.

The term 'button' refers to zones on the student interface that the student may activate either by directly pressing the touchscreen or indirectly using accessibility options such as switches or eye-gaze.

The term 'popup' refers to a panel that is superimposed on the reading interface grid that allows additional symbols to be displayed to the student.

The term 'symbol' refers to a graphic image displayed on a button which represents a word. Selection of a symbol is therefore synonymous with the process of selecting a word. Where possible, the graphic images in the symbol are semantically related to the words they represent.

The term 'current word' refers to the word in the text that the student is presently attempting to read.

The term 'next word' refers to the word immediately following the current word in the text.

The term 'single symbol' or 'single button press symbol' refers to occasions where a word is represented by a single symbol (i.e. requires a single button press to select the word which is then spoken by the processing device).

The term 'base symbol' refers to the initial symbol selection required on the primary screen when constructing a word that requires two button presses. The popup symbols related to the base word(s) are automatically displayed in a popup following the selection of the base symbol(s).

The term 'popup symbol' describes a symbol in a popup. For example, to say 'my' the student first presses the 'I' pronoun button (the base symbol) and then from the secondary screen that is displayed selects the symbol for 'my' (the popup symbol).

The 'Fitzgerald Key' is a system of colour coding words based on their part of speech. The Fitzgerald key classifies words as verbs (green), nouns (orange), adverbs and adjectives (blue), social words (pink) and miscellaneous words (grey). The system was originally used for deaf students to assist them to construct grammatically correct sentences. The Fitzgerald Key and the more recently developed Modified Fitzgerald Key which contains additional word categories such as places (purple), negations/important words (red), and the separation of adjectives (blue) and adverbs (brown) are now widely used in AAC systems as a visual support to help a user locate a symbol in a grid array by grouping specific word types by colour either on a single grid array page or series of pages where for example the user firstly selects a green verb button that takes them to a page of verbs and then the user navigates through the verbs to select the desired verb. Typically, in AAC devices the colour is applied to the border of the symbol button and/or as the symbol background colour.

The term 'sheet' refers to a data structure that contains a three-dimensional array of words which allows their dynamic display in the user interface.

The term 'layer' refers to a data structure contains a two-dimensional array within a sheet array.

The present application describes embodiments of Augmentative and Alternative Communication systems and methods to aid reading by users with severe speech impairments. With reference to FIG. 1A, embodiments of the system include an AAC module having a user interface module (122), a symbol display controller (124), and memory storing dictionary data (126) and book data (128) for at least one book. The user interface module (122) and symbol display controller (124) can be implemented in software executing in a hardware processor. The processor may be resident on a device (120) (such as a laptop, smart phone, tablet computer or dedicated device) providing the user interface for user access to the AAC system or implemented on a host server where the user interface is a client device.

The user interface controller (122) is configured to control rendering of visual data on a display, output of audio data, and receiving user inputs. The symbol display controller (124) is configured to control allocation of symbols to symbol groups for rendering and display in an AAC layout by the user interface module (122). The memory stores configuration data for the user and data that is collected throughout the reading process. The memory also stores dictionary data (126), symbol data, and book data (128) for at least one book. In alternative embodiments the symbol data may be accessed from an external database, which may be accessed via the communication network (150). The dictionary data (126) stores a set of a plurality of word records, each word record being associated with a word and comprising a word identifier unique within the dictionary, the word text, an identifier for a AAC symbol representation for the word, and sound data to enable audible reproduction of the word via the user interface, the set of word records including a record for each one of all words occurring in the text of the at least one book. For each book, the book data comprises book text data encoded to reference word identifiers from the dictionary for each word of text of the book and sequence data for the book. The sequence data defines the order of words in the book and attributes indicating contextual meaning for occurrences of words.

The system can include a book parsing system (130) which obtains electronic book data and analyses the book data to extract word and sequence data for the book. The parsing system can also facilitate building of data structures, described in further detail below, which applied for symbol display by the AAC system during book reading. Thus, an AAC parsed version of a book is supplemented with data characterising the sequence of the book and enabling appropriate symbols to be displayed for each word in the text. The parser may obtain books in electronic form from a publisher library (145), electronic file upload or manual entry. After parsing the AAC version of a book can be stored in a book library 148.

For each book, one or more display data structures are used to define layouts for presentation of symbols required for reading the book. These display data structures define a set of lexical elements and order for display of the lexical elements in n display positions. For example, the n display positions may be cell positions on a symbols display grid. Each lexical element is associated with a display position. Each lexical element comprises a set of up to m semantically related words, where each of the up to m words is a word variant associated with a different one of m word categories, each word variant being associated with a symbol conveying meaning for the word variant. During a book reading process a set of symbols is selected for display based on a current word being read so that the symbols displayed will include the symbol representing the word, along with other symbols to force the student to make a cognitive choice of which displayed symbol represents the current word. The set of symbols displayed is based on the current word being read, the word type and display order as defined in the data structure, to select the symbols representing the correct meaning of the word being read (the correct word) and a plurality of symbols of the same word type for display along with the correct word symbol.

Figure 4:
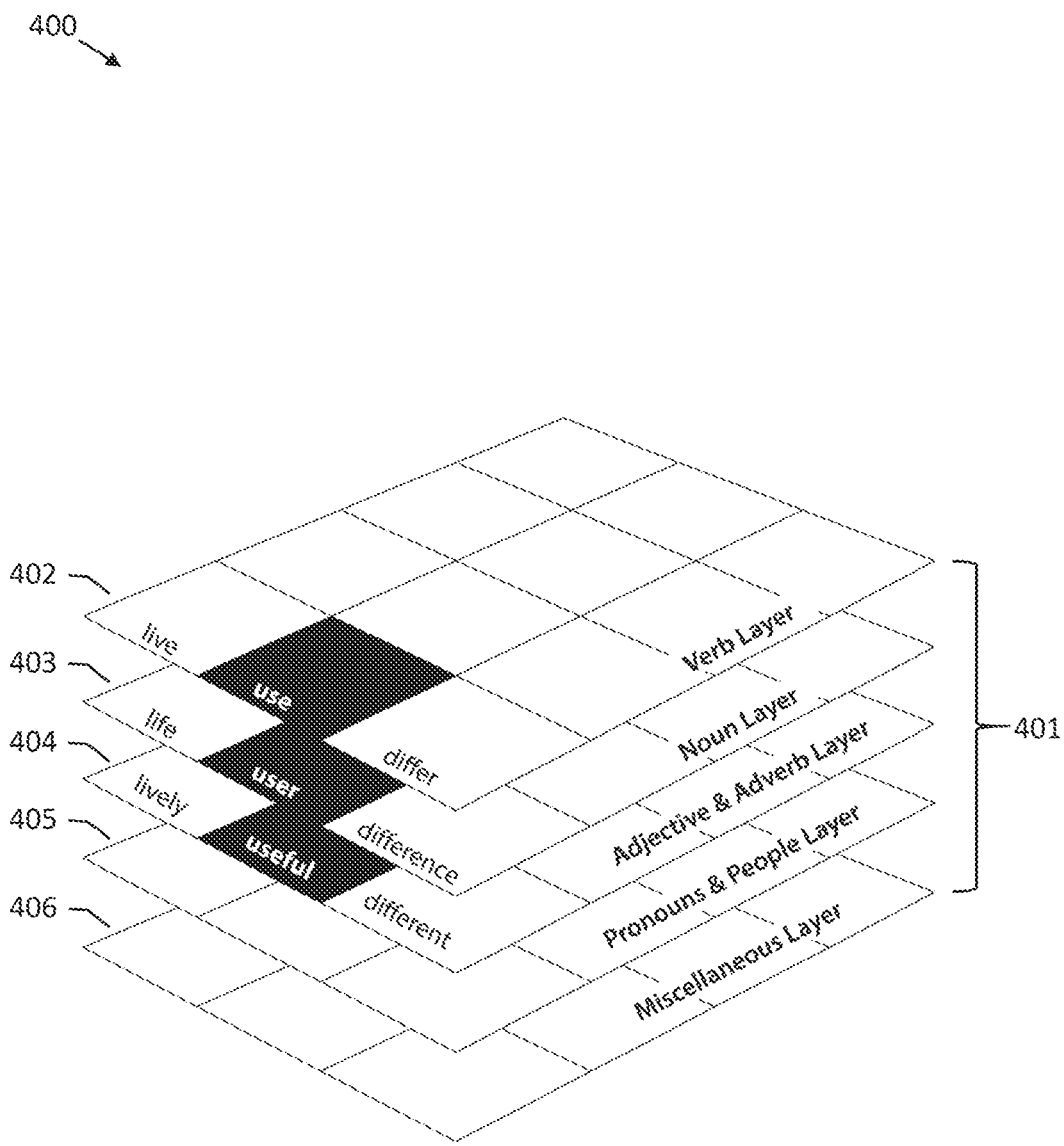
FIG. 4 is a representative diagram of the Sheets data structure of an embodiment.
Figure 5:
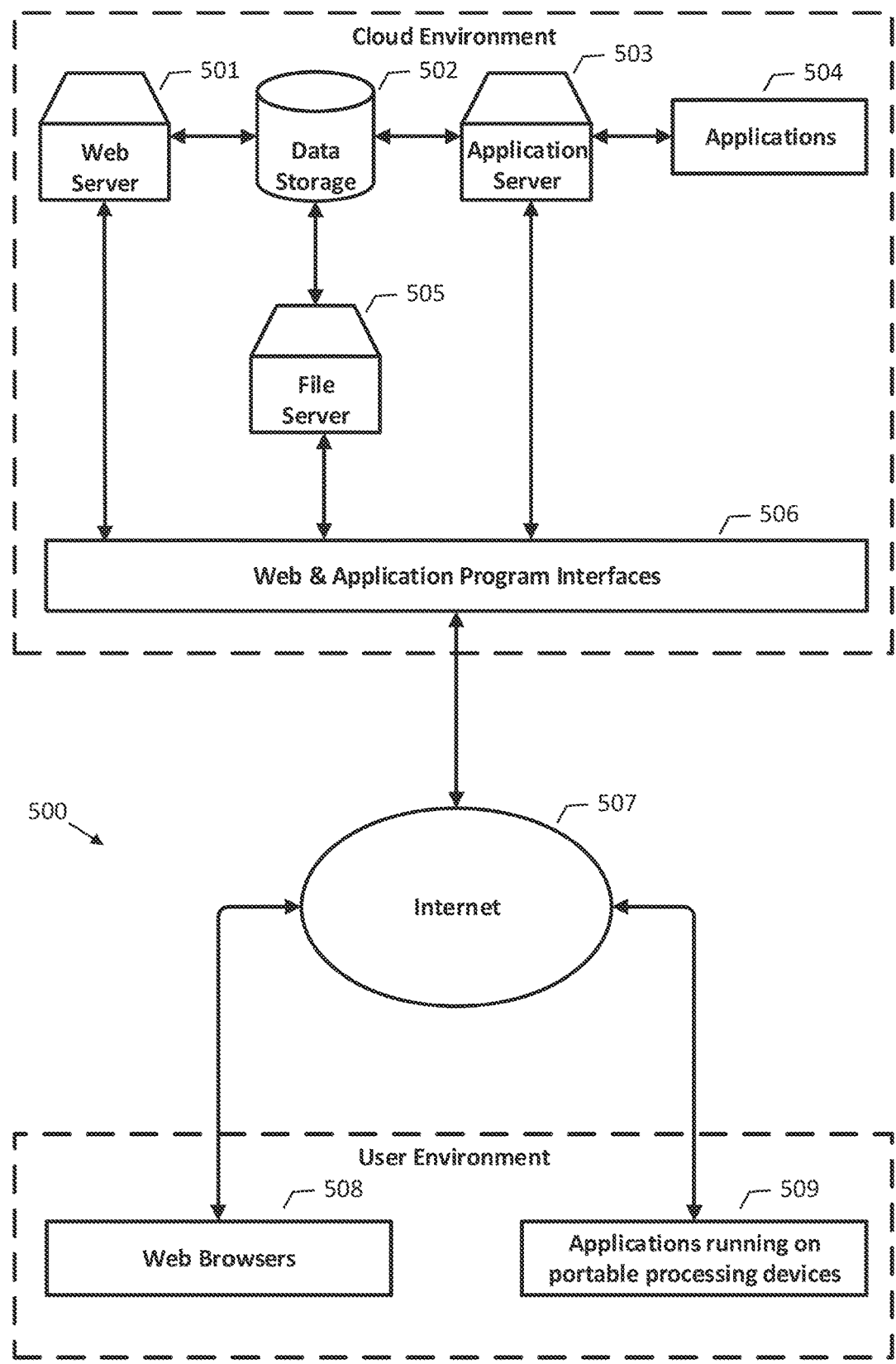
FIG. 5 is a block diagram of a System Environment for an embodiment of the system.

In an embodiment the display data structures are referred to as sheets, and layers within a sheet to provide a three dimensional conceptualisation of groups of symbols representing a set of words grouped for display (sheet), and the symbols to be displayed being varied based on word category (a layer for each word category) so that for each word category the symbol representing a variant of a word will appear in the same display position as for other variants of the same word, this is also described in further detail below with reference to FIG. 4.

In this embodiment a display data structure comprises a data record defining a set of n lexical elements and n display positions, each one of the n display positions being allocated to a respective one of the n lexical elements. Each lexical element comprises a set of m words grouped by meaning, with each of the m words being a word variant associated with a different word category. In other words, the lexical element stores identifiers in a word dictionary for a set of m words, these words being word category variants of a base word (for example, run, running, ran). The various forms of each word convey an associated meaning for different word categories (i.e. noun, verb, adjective, adverb, etc.). Each word variant is also associated with a symbol representing the word variant, the symbol being appropriate for the word and word category. The symbols for display are selected based on the word category and the display position for each selected symbol defined by the display position associated with the lexical element. Thus, words having related meanings, but being of different forms (i.e. run, running) will be displayed in the same position, within the same set of words each time these appear in the book.

Thus, the data structure defines for a set of words, an order for visual representation of symbols for each form of a word. The symbol display controller selects symbols to display for a word as used in the book text based on a word set selection (sheet) and word category attribute (layer) that includes the word as used in context in the book text. In exemplary embodiments disclosed in this document the word categories are based on Fitzgerald types (layers for each of noun, verb, adjective/adverb, pronouns & people and miscellaneous forms of the word), however alternative categorizations may be used in alternative embodiments. Any grouping of grammatical structures may be used to group words into lexical elements, or words may be grouped based on semantic similarity, or visual similarity of the graphemes within the words, or similarity of phonemes within the words.

It should be noted that in the context of this document "sheet" and "layer" are convenient labels for the data structure used for ordering symbols for presentation and are not meant to convey a limitation on the format of the data structure. The term sheet is used to conceptualise a two-dimensional grid layout for displaying a set of words, and the third dimension (referred to as layers in this document) corresponds to word categories. The data structure can store attributes linking a word variant and appropriate symbol for each word category from the word dictionaries and symbol libraries respectively.

A plurality of such display data structures can be defined to characterise a whole book, as each display data structure defines data for display in n symbol positions on the display—one symbol display grid—and therefore the number of data structures required is based on the display grid size. Display grid size may be a pre-set configuration parameter or may be selectable. For embodiments where the grid size is variable, a plurality of sets of display data structures may be required to define the sheets for different grid sizes. In an alternative embodiment, the display data structure may store a set of y lexical elements from which a subset of n lexical elements is selected to fill n display positions. Of course, with one of then lexical elements always including the current word being read, and with other words selected based on the defined display order. This embodiment may be advantageous when the grid size may be set by the user and is not confined to pre-set values (for example 3 pre-configured grid sizes with a set of display data structures defined for each grid size).

The symbol controller is configured to select the symbols for display by using a word identifier determine the display data structure including the word based on sequence data for the book and received user input, such that the symbols displayed will correspond to at least the symbol required for the user to select via the user interface for audio output based on reading sequence of the book. These selected symbols are displayed located in a grid in the user interface based on the word's location in a layer in a sheet. The dictionary data can include, for each word record, phonetic data to enable reproduction of the whole word by the user interface, and sounding out data to enable sounding out of components of the word.

In an embodiment of the Augmentative and Alternative Communication (AAC) system the user interface controller is configured to suppress display of text in conjunction with symbols based on configurable system parameters or selected operating mode for the AAC system.

In an embodiment of the Augmentative and Alternative Communication (AAC) system the symbol display controller is configured to trigger highlighting of one or more symbols for display based on any one or more of: symbol type, word being read, and operating mode. The dynamic display of symbols based on sequence of the book text reduces the symbol navigation burden required to read out the book via an AAC system compared with traditional AAC systems, typically designed to replace verbal communication and enable conversation.

Existing AAC systems were not designed for the purpose of enabling students to read aloud. Consequently, there are limitations on how well these existing systems can be programmed and adapted to perform this task. Accordingly, there is a need for the development of systems, methods and software that can meet the unique Augmentative and Alternative Communication (AAC) demands associated with sounding out words and reading aloud the connected text in books. Development of the AAC Reading System will enable students who use AAC to participate more effectively in literacy instruction.

One of the fundamental difficulties with existing systems is that these systems operate word-by-word and are designed for a user to select a symbol or set of symbols representing a word or simple phrase the person wants spoken. The user knows the meanings of the symbols and selects those which will enable them to communicate their desired message or intent. For use as a communication tool known systems are quite effective and suitable for purpose. However, in the context of learning to read, some problems associated with existing AAC systems include: limited predefined vocabulary typically focused on expression of intent or queries rather than rich dialogue; limited symbols and limited space for symbol display; and symbols are typically labelled with their associated word/meaning.

Vocabulary and Symbol Selection

The amount of vocabulary contained within books creates logistical difficulties when using existing AAC communication interfaces in literacy instruction. Many of the specific vocabulary words contained within the book may not be loaded on the existing AAC communication interface. Whilst it is possible to manually program these words into the AAC communication interfaces (within the current vocabulary layout constraints), this is a time-consuming task which is not scalable as a student's progress to increasingly sophisticated books containing more extensive vocabulary.

The specificity of vocabulary contained in books also creates difficulties when trying to assign symbols to represent the words in existing AAC systems. Many AAC devices contain a limited symbol bank which can make it difficult to assign a symbol to a word. For example, if reading a book about forests, several different types of forest symbols (e.g. tropical, temperate, boreal) may be required rather than a single symbol representing a forest. Whilst it is possible for a user to manually upload and use photos to compensate for the lack of symbol images, this is also a very time-consuming task which is not practical as the amount of vocabulary in books increases.

As the AAC Reading System knows the context of the words within the book and the meaning of the words within the sentences, it can address many of the limitations in functionality that occur with existing AAC systems when trying to use them for reading. The difficulties with existing AAC systems and the solutions provided by this AAC Reading System are discussed below.

The AAC Reading System addresses these difficulties by determining the vocabulary and semantically appropriate symbols required to read the book in advance so that when a user wants to download the book everything is pre-prepared and ready to go. The AAC Reading System parses the publisher's book files to determine all the words and their meaning in the context of the text so that appropriate symbols can be sourced or developed.

In the AAC Reading System, some single grid buttons represent a range of closely semantically related words, for example the verbs 'say', 'call', 'ask', 'yell' and 'shout' occupy one button space. In this case the symbol image displayed on the base grid button is dynamically reconfigured by the app to match the base symbol for the current target word and then a popup, if needed, will display the related words also with the semantically correct symbols. This dynamic configuration of symbols is only possible in the AAC Reading System because the system always knows the current word that the user is attempting to decode and the context of the word within the text.

Parsing of the text also builds a set of display data structures for the book, each of these display data structures representing a set of symbol grid displays with positions defined for a set of lexical elements—sets of words (grouped by meaning) which are variants of a base word (e.g. run, running, ran). Such that each word in a book is associated with a display data structure (a sheet) for a set of words, including the given word, and defines a set of symbols to display for each word category within which the symbol for the given word should appear (layer). Determination of the word classification is based on book sequence data, so that the appropriate meaning can be applied in the context of the book. This knowledge of the current word and the meaning of the word in the current sentence also avoids situations arising where a word with multiple meanings (e.g. 'go back to school' versus 'I have a sore back') is represented by a symbol that portrays a different meaning to the meaning portrayed in the text. For example, for a sentence 'John walked slowly back to school' the symbols illustrated for selection will include a symbol indicating 'return' rather than a body part for the student to select for 'back'. Searching for a symbol within a symbol array that is semantically congruent with the meaning of the word in the context of the sentence is an easier task for the user than when a word is represented with a symbol containing an image portraying a different meaning of the current word. Displaying a semantically congruent symbol also supports reading comprehension by alerting the student to the specific meaning of a word within the context of the current text. To further assist with differentiation of word meanings for reading comprehension, in the AAC Reading System when words like "back" that have multiple meanings are entered into the dictionary, each different word meaning is located on a different grid sheet and in a different cell location within the sheet layers than the other different meanings of the word.

In existing AAC systems, given the system does not know the current word or its meaning in the sentence, the user would have the task of locating the word "back" without assistance. Without guidance they may not be aware of the multiple meanings of the word "back" or of how to navigate to all the various forms, assuming they are all entered. If a student has to select a semantically incongruent form of the word to compensate this may be slower as they have to improvise with symbol selection rather than instantly seeing a symbol displayed with the correct meaning. The other difficulty is that if a semantically incongruent symbol is chosen, the AAC system will still say the correct word but will not adequately convey to the user the difference in meaning of that word in the context of the current sentence.

Embodiments include a book parser (130) to facilitate data entry for new books. Parsing the book file considerably speeds up the task of entering the vocabulary required to read the book. In an embodiment the AAC Reading System has a vocabulary database (142) that grows as each new book is entered. Over time this develops a large symbol and word dictionary that reduces the preparation time required to enter new books. The vocabulary database (148) can be a system maintained networked database, accessible to users for download of vocabulary data to a local database. User local databases may be limited to vocabulary for currently accessed books to reduce the memory resources required of the user device. When operated in on-line mode, the AAC Reading System (120) has access to all the texts, words and symbols that are associated with all of the books in the user's cloud library as these may be interactively downloaded to the user's device. When the AAC Reading System is operated in off-line mode (as may sometimes be required within the protected network school environment), only those books, words and symbols already present on the user's on-device library will be available.

In AAC communication systems, the symbols usually also display the text of the word above the symbol to aid with navigation. This is very helpful to assist with navigation when these systems are being used for their intended purpose of assisting with spoken communication. However, displaying the text above the symbol is undesirable when completing a reading task, as the user can match the book text to the symbol text (match to sample task) rather than performing the target task of decoding the word to determine the appropriate symbol. It is possible to manually remove symbol labels in existing AAC devices, but it is problematic because it often has to be done manually for each symbol which is time consuming and, when the user changes tasks to using their AAC system for communication, the word labels are required as they aid with navigation of the communication device. In the AAC Reading System, displaying the labels is a setting option so that the teacher can easily choose whether the student will read as a match to sample task with the help of the text, or they can turn off the text so that it becomes a true decoding task.

In this AAC Reading System (120), all words are represented by a symbol, even if the words do not have a semantic meaning that is readily portrayed by an image. In this case an abstract symbol is applied, and the symbol/word association must be memorised by the user. This is a departure from the methodology employed in existing AAC communication systems which frequently display words such as 'the', 'an' and 'a' as text on a button. The reason for assigning symbols to these words in the AAC Reading System is to ensure that the student is truly decoding/reading the current word and not simply matching the letters—which changes the nature of the learning task to a 'match to sample' task.

Vocabulary Layout on User Interface

An important limitation of using existing AAC communication interfaces for reading is the layout of vocabulary within the interfaces. Vocabulary layout in existing AAC communication interfaces is designed to maximise efficient verbal communication rather than maximising reading fluency. These existing AAC communication interfaces locate core vocabulary (high frequency words) and fringe vocabulary (less frequent words often related to specific topics) in locations that maximise fluency in oral conversation. Typically, this involves minimising the number of button presses for core vocabulary and displaying fringe words on a series of topic pages that are often accessed by multiple additional button presses. The fringe words are limited to those supplied with the interface but can be supplemented with additional words and symbols manually entered by the user. Books contain a high proportion of content words that would be classified as fringe vocabulary in existing AAC communication interfaces. The layout of existing AAC communication interfaces requires too many button presses to access vocabulary at an adequate rate for reading fluency to be maintained.

The AAC Reading System takes advantage of always knowing what the current target word is to utilise a novel approach to vocabulary layout that maximises fluency by always having the current target word displayed on the currently displayed sheet and layer. This results in every word being prioritised as if it were a frequently occurring core word in traditional AAC systems, although the methodology employed to achieve this process differs in the AAC Reading System due to the advantage of knowing the current and future target words. To achieve this in the AAC reading System, the symbol grid display dynamically changes for each word in the text. In some embodiments all words are also given a set button location regardless of the book being read so that students only have to learn the physical location of a symbol once which reduces learning load and increases reading fluency by ensuring predictable word locations. By using this methodology, the AAC Reading System allows all words to be accessed with a maximum of two button presses which both improves the speed of reading and reduces the navigation burden to locate the correct symbol.

It should be appreciated that existing, conventional, AAC systems are not programmed to dynamically adjust their grid display based on the current and future words contained within the text of a book. Words are either displayed in their pre-existing location within the communication system, which is configured for spoken language not reading, or, in the case of words that need to be manually added to the system, are likely to be created on a new topic page. New symbols are typically added to these topic pages in the order that they are manually added to the system. In the context of reading this creates several disadvantages that negatively impact on reading fluency and increase the cognitive demands of the task. Firstly, the lack of systematic placement of symbols makes it harder to locate the desired symbol. Secondly, there are often more additional symbols required to read a book/chapter than will fit on a single topic page which adds further button presses to the process as students must also navigate through the topic pages to find the correct symbol. The other difficulty is that the frequency of occurrence of these symbols is likely to differ between books. If frequent words are not identified and prioritised in terms of symbol placement, situations can occur where frequent words require more button presses to select them than infrequent words which negatively impacts on reading fluency. This is particularly problematic for students who rely on alternative access methods such as switching. By prioritising the location of every word as if it is a high frequency word, the AAC Reading System is able to maximise the efficiency of symbol selection for every word in the text which is particularly important for these students.

Switching is an example of an accessibility option for people who are unable to directly select symbol buttons with their hands due to a physical disability. Various aids are available to assist users with a physical disability to interact with the device. The simplest aid consists of an acrylic key-guard that allows the user to accurately locate their finger over a button without accidentally touching other adjacent buttons. Embodiments of the AAC Reading system can include a key-guard designed to accurately guide the user's finger to the buttons on the reading grid. It is helpful for people with milder levels of physical disability. For people with more severe levels of physical disability, alternative access methods allow users to interact with the AAC device by means other than physically pressing buttons on the screen. A user who cannot control hand movement sufficiently to accurately press buttons on the screen (even when a key-guard is employed) may use a switching mechanism that is connected electronically to the device to control the movement of a highlighted border that sequentially moves over the border of individual symbols in the grid. Depending on the switch configuration the user may press a switch to advance the highlighted border across the symbols or the highlighted border may automatically advance to the next symbol after a user defined time period has elapsed. Once the desired symbol is highlighted, the user activates the switch or if they are advancing the movement of the highlighted border, an additional switch is pressed to make the symbol selection. This process is both slow and cognitively and physically demanding so it is essential that symbols are positioned according to frequency of occurrence to make the process as efficient as possible. Another alternative access method employs eye gaze technology wherein the user's eye movements are used to select a symbol when the user's eyes dwell on a specific symbol for a user predetermined period of time. This is more efficient than switching however unfortunately many people with severe physical disabilities are unable to use this method due to involuntary eye movements making it difficult for the system to determine their symbol selection. These access methods are also commonly used in existing AAC communication interfaces and can be used with the AAC Reading System.

Another limitation of existing AAC communications systems occurs when a student can read a word in the text but either does not know the symbol for it or, alternatively, knows the symbol but does not know the series of button presses needed to navigate to the correct button within the AAC communication interface. Existing AAC communication interfaces do not have the capability to know the word the student is currently attempting to read in the book and therefore are unable to effectively scaffold the student's learning. In the AAC Reading System a 'Learn' system pre-teaches symbols associated with the new words in a book and the location of the symbol within the reading interface before they attempt to read the book. In addition, an interactive 'Learn-It' system teaches symbols and symbol locations within the reading interface so that the student can interactively access support while reading the book.

Book Parsing

An example of a method for preparing a book for reading using the AAC systems is described with reference to FIGS. 2A through to 4. It should be appreciated that this is one example of how this process may be implemented, and embodiments may vary. Further, in some system not all of the described steps may take place or steps may be executed in a different order to that described in the examples below.

Figure 2A:
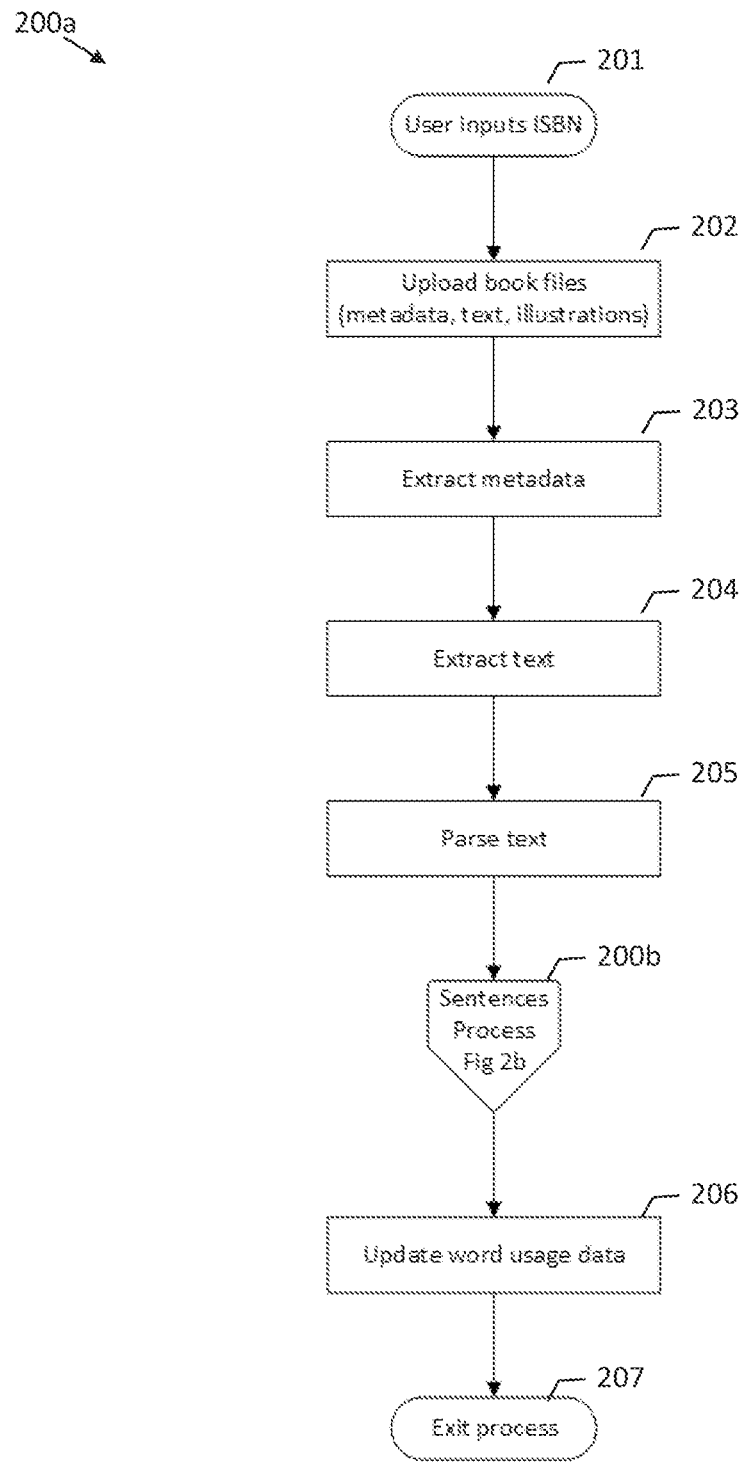
FIG. 2A is a flowchart of an embodiment of a New Book Process.

FIG. 2A provides an overview of the book parsing process when entering a new book. This process is completed before a book is available for purchase and download into a student's on-device library. This process may be applied using a book parser tool (130), which may be implemented as one or more software modules executable on a server or using distributed network computing hardware, accessible by a user via a user interface.

To enter a new book, a user with permission signs into the web-based interface and then selects the new book interface. The system then displays the new book user interface containing a field for the user to enter the new book ISBN (101). The system then verifies that the ISBN is in a valid format using the standard ISBN algorithm and then searches the database to confirm that the ISBN is not already present in the current database. If the ISBN is already in the database, the system outputs a message to the user advising of an existing entry and exits the new book process. If the ISBN is not already in the database, the system creates a new book record in system memory and uploads publisher-supplied or user-entered book files consisting of metadata, text and illustrations (102).

The system then commences the process of extracting the metadata for the book (103). Metadata includes text type, title, author(s), illustrator(s), publisher, publisher's copyright notice, the text series, publisher reading level, language and dialect(s), and other data that is related to the book. The system determines whether there is an available publisher's metadata file for the book by searching the database for the book's ISBN. These book files are uploaded into the database by publishers. If the publisher did not provide a publisher metadata file for the book, the system presents the user with a metadata user interface consisting of fields for each type of metadata and awaits input from the user.

If the publisher provides a metadata file for the book, the system extracts the metadata from the publisher's book file. The system then determines whether all the required data fields have been extracted from the publisher's book file. If any data is missing from a book file provided by the publisher, the system displays the metadata user interface with the missing data fields highlighted and awaits user input. Once all the required metadata has been extracted, the system then saves the input in the database.

The system then starts the text extraction process (104). The system searches the database to find the publisher's text file for this ISBN. If there is not a publisher text file for the book, the system displays the book text user interface with fields for chapter number, page number, page type, sentence numbers and sentences. If the book is a play, fields are also displayed to allocate sentences to play parts. Page types are classified as title, text, illustration or summary. When books are not chapter books all the text is allocated to Chapter 1. Title, cover and summary pages are allocated to Chapter 0. The system then waits for the user to manually enter the book text into the displayed fields, for example sentence by sentence, for each page of each chapter, additional information, such as speaker for a play. During manual entry sentence sequence numbers are automatically allocated as each sentence is entered. The system determines if the text on a page exceeds the space available for presentation to the user in the application and splits the text as required to achieve a balanced presentation of the text.

If the system has located a publisher text file, the system extracts chapter numbers, page numbers and text from the publisher's text file and saves it in the database. The system then displays the book text user interface to allow the user to modify the input from the publisher's file and data if required, and to add chapter numbers, page type, and sentence numbers. Page types are classified Title, Text, Illustration or Summary. For example, the parser (130) may provide an interactive web page or "wizard" to facilitate entry of classification information. Pages with both text and illustrations are treated as text pages. Any text imbedded in an illustration is treated as a sentence. Summary pages are typically the back cover, but may include end notes, glossary etc. which may not otherwise be identified as specific chapters. The system then saves the data in the database. In some embodiments the system is configured to automatically add sentence, page type, page and chapter numbers if not already provided in the publisher text file. Embodiments of the system can be configured to be utilised with traditional paper books—the user reading the physical book and using the AAC Reading System for vocalisation of the read words, it is therefore advantageous to reflect the paper book format within the book data. For example, for page navigation, this can aid maintaining flow of reading when the student is involved in a group reading activity where they may be asked to read non-sequential pages in the text. Embodiments can also be configured to operate with electronic books.

For either manual data entry or where data is retrieved from a publisher file, in the data structure for the book as stored in the database, the system assigns a page sequence number to each page in the book. A page sequence number is applied to all reading pages including the title and summary pages.

An important feature of this AAC system is the system maintains data to enable the user input for each word to be interpreted in the context of the book and sentence within the book. To enable this functionality the system stresses data which reflects the structure of the book. The data structure for a book data file includes assigned chapter numbers (or other identifies), page sequence numbers, sentence sequence numbers, and the specific sentence text data, this provides the framework for navigation through the book and context-based analysis of user inputs.

Figure 2B:
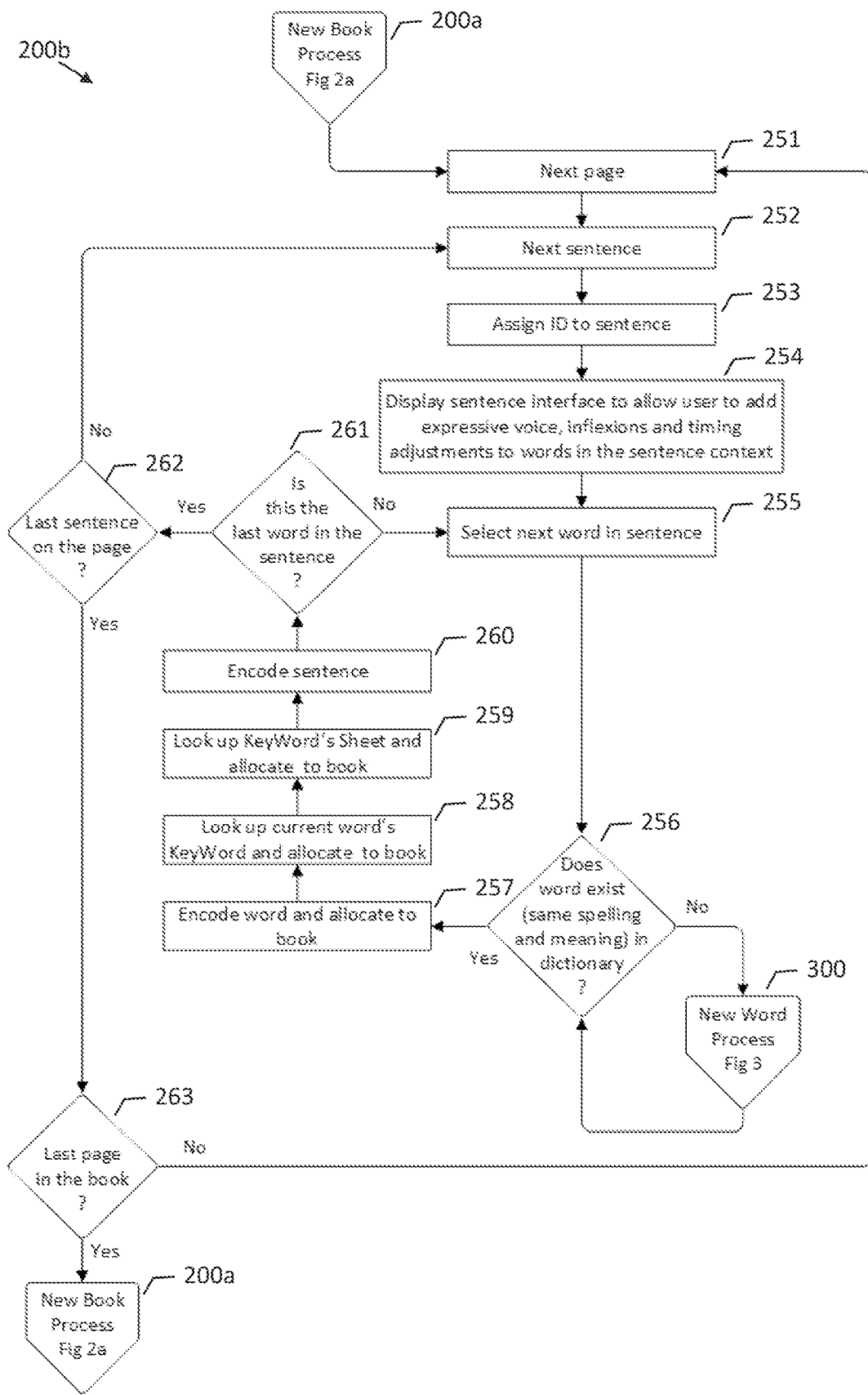
FIG. 2B is a flowchart of an embodiment of a Sentence Process.

Following completion of the text extraction process, the parsing process of the book begins (105). The AAC Reading system focusses on parsing the book text at a sentence level rather than treating the text of the book as a series of individual words (200). This sentence process is described in greater detail in FIG. 2B. Using the previously entered metadata, the system identifies the next page of text in the book (201), locates the next sentence on the page (202) and assigns a sentence ID to the sentence (203). The system optionally then displays a user interface to allow the user to add expressive voice, inflections and timing adjustments to improve the naturalness of the sentence when it is read aloud using the AAC Reading System (204). The book sequence data comprises records defining for each sentence the word order. Data defining the input expressive voice, inflections and time adjustments can be stored associated with each word in the sentence data record, the word data also defines the display data structure for use to display the symbol for the word (i.e. identifying the sheet and layer within the sheet). Thus, the sentence data maintains the sequence of words and supplementary data applied in processes such as reading aloud. Chapter, page and sentence identifiers maintain the overall book sequence. The system enables the user to hear an audio output of each of these expressive adjustments of the sentence and the user may make further adjustment and repeat the audio output until they input to the system that they are satisfied with the settings.

Following adjustments to the expression of the whole sentence, the system focusses on the specific words in the sentence (205). The process involves associated word data entry for each word contained in each sentence in the book. The purpose of this process is to ensure that every word in the book is associated with the correct meaning and AAC symbol in the context of the sentence. This may require addition of words to the dictionary. The dictionary for the AAC system is configured not only to associate words with meanings, but also with symbols to use through the AAC interface and phonetic codes for the synthesised articulation of the word, syllables and phonemes. In embodiments of the present system the dictionary can also include data to enable sounding out of words, for example word dictionary entries may include data for sounding out of a multisyllabic word (and its variations) or data to link to associated databases including the data for sounding out the word. Due to the nature of an AAC system, where a base symbol can be used to represent a parent word, and a subsidiary symbol (also referred to as a popup symbol) represent a variation on the parent word (for example, plural, verb tense, adverb), words may have multiple entries in the dictionary, each representing different meanings in context. Each of these entries for variations the word may be associated with a common base symbol. Multiple subsidiary symbols are then used to provide symbols combinations associated with all the different meanings. In some embodiments of the system each word variant may alternatively to additionally associated with a single symbol in the word dictionary, this being to facilitate the use of defined sheets, with layers defining single symbols to represent each word class variant of a word so that these may be displayed on a single grid.

Dictionary entries may also be case sensitive, however variation in case does not usually indicate a different meaning. Each dictionary record has a unique ID and includes for each word: spelling; capitalisation; pronunciation for each dialect; graphemes for each dialect; phonemes for each dialect; syllables and pronunciation of the syllables; meaning; Fitzgerald word type; if the word is regular or irregular; which sheet the word is attached to and the position on the sheet; if the words have relationships with other words (parent/child); foil words; and AAC symbols. The Fitzgerald word type refers to an existing AAC classification method that categorises words into different word classes/functional groups such as nouns, verbs, adjectives and adverbs, pronouns and people which assists in grouping words within AAC systems in a logical and predictable manner to assist with locating words. Regular and irregular refers to classification of words as either phonetically regular or irregular and is essential data for correctly sounding out words. Sheets refer to the grid locations allocated to display the symbol representing the word. The text of books for reading using the AAC Reading System is encoded using these unique IDs, such that every individual word, in reading order, is represented by the unique ID which is associated with the appropriate word meaning and symbols for reproduction of the word using the AAC system.

The process for encoding each individual word of the book text commences with the system identifying the next word in the book text that needs to be entered and performing a case sensitive search of the word to determine whether the exact word with the same spelling and meaning exists in the dictionary (206). In some embodiments the system determines the probable meaning of the word by utilising a part-of-speech tagger to identify the probable word class of the word in the context of the current sentence, allowing the word in the text to be accurately matched with the word's dictionary record. In other embodiments the word class may be determined by input from the user. If there is a match, the word is assigned meaning either by the system or by the user in the case of multiple potential word meanings being identified. The word is then encoded by the system with the unique word ID associated with the word and then allocated to the book (207). The system then looks up the current word's KeyWord (lexical element) and KeyWord Sheet and allocates it to the book (208, 209).

The system then encodes the sentence text for the text display and speech synthesis and saves the data in the database (210). The encoding for speech synthesis includes retrieving phonetic and sounding data defined in the vocabulary dictionary for the word. It should be appreciated that in this embodiment this data is prepared as a book file to enable this to be downloaded directly to users comprising all the data needed for the specific book. Not all the encoded sentence data may be utilised in every AAC operating mode, for example timing may not be required in performance and fluency modes where the user is reading the text and only inputting symbols via the user interface for verbalisation. However, the timing data can be utilised in a mode where the book is being read automatically to the student by the AAC interface, for reading out a full sentence after the individual word buttons have been pressed by the student, or for sounding out. The speech synthesis data may vary between embodiments or between books, for example based on reader competence level and nature of the book. For more advanced readers it may not be necessary to include sounding out data for every word, for example sounding data may not be required for common words for more advanced readers, expressive voicings may not be required for some types of books, such as textbooks.

Figure 1B:
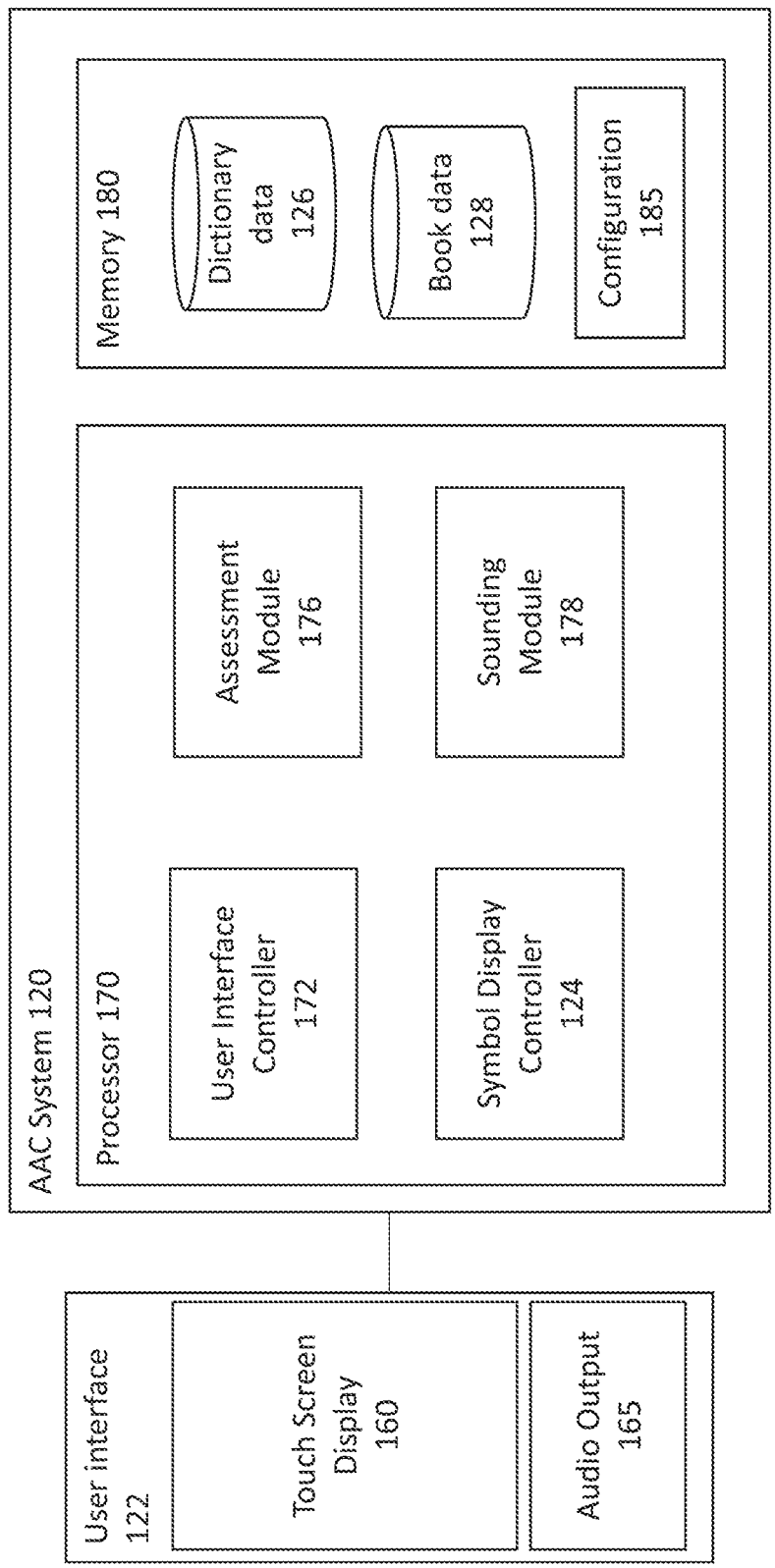
FIG. 1B is a block diagram of an embodiment of an AAC reading device.

The system then determines whether the current word was the last word in the sentence (211). If it is not, the system then selects the next word in the sentence and recommences the search for the next word in the dictionary (205, 206). If the word is the last word in the sentence (211), the system determines whether the sentence is the last sentence on the page (212). If it is not the system identifies the next sentence on the page and recommences the sentence encoding process (202). If the sentence is the last sentence on the page, the system then determines whether the page is the last page in the book (213). If it is not, the system identifies the next page in the book and recommences the sentence encoding process (201). If the page is the last page in the book (213), the sentence process is completed (200), and returning to FIG. 1 the system updates the word usage data (106) and concludes the new book entry process (107).

On some occasions, following the word search in the dictionary (206), a user may indicate that none of the meanings presented by the system were correct. For example, where the word has been used in a different context than for a previously entered book—for example "lead" being used as a noun to describe a dog's leash may be in the dictionary but the verb "lead" used to describe the action of leading a group is not in the dictionary and has a completely different meaning. In this case the user inputs to the system than none of the displayed meanings are correct and the new word process is activated to enter the new meaning of the word as a completely new word entry (300). The new word process (300) is also activated when the dictionary search by the system does not reveal and exact word match.

Where words are matched to those in the database, the database record includes all the attributes, meaning, symbol assignments, phonetic tags, sounding data, etc. for the matched word. The new word process is performed to build new database records including all of this data for words not already existing in the database, and to assign a new word code for the word to use for encoding the book text to enable access to the word record for the AAC Reading System during reading.

To assist with understanding the process of entering a new word into the dictionary, a description of the structure of the Sheets for displaying symbols, the different categories of words and their associated rules and is first provided.

In embodiments of the AAC reading system display data structures are used to define display positions for groups of words, for the embodiments discussed herein the symbols are displayed in a grid. FIG. 4 provides an example of a visual representation of the layout of sheets and layers within sheets in one possible embodiment of the AAC Reading System. FIG. 4 is a visual illustration of the sheet and layer concept. Each word is assigned a fixed position in a cell within a layer based on word type when it is entered as a new word into the dictionary. This position remains the same regardless of the book being read to reduce learning load and maximise reading fluency by making symbol navigation predictable for the student and minimising the button presses required to select each word. The cell position assigned to a word is determined by two factors: the Fitzgerald classification of the word and the relationship of the word to other words. In the AAC Reading System the Fitzgerald classification of words is represented by a series of layers (401) which includes a verb Layer (402), noun Layer (403), adjective and adverb Layer (404), pronouns and people Layer (405) and a miscellaneous Layer for all other words that do not fit within the other Layers (406). A word is assigned to a specific Sheet Layer based on its word class (e.g. noun, verb, adjective etc.).

The cell position that the new word will occupy within the layer is assigned by the relationship between the new word and existing words within the dictionary. Words are positioned in cells (which correspond to display positions) within sheets and across layers so that words that are related in meaning but have different word classes (Fitzgerald types) occupy the same cell on multiple layers. For example, in FIG. 4 the words "use", "user" and "useful" are all semantically related words but have different word classes so the words appear on different layers but occupy the same cell position. A set of semantically related words is referred to in some embodiments as a lexical element, and each lexical element is associated with a single symbol display position, this display position is used for display of the symbol for each different semantically related word. In use the system displays multiple symbols, these symbols being all of those within the sheet for a single word class—a layer. The symbol required for reading the word will appear within the populated symbol grid. They may also have different symbols to more accurately represent the meaning of each word. These layers are displayed dynamically by the symbol display controller in the application with the appropriate layer displaying the correct symbol for the current word in the reading interface for the current word in the book. The sheets and layers displayed dynamically change on a word-by-word basis as the student reads the text of the book. It should be noted that existing AAC systems are not able to dynamically display vocabulary in such a functional way for reading because they are not able to parse the book and hence do not know the current word that the student is attempting to read or the meaning of the word within the current sentence. Grouping related words in the same cell position and in their grammatically correct layers reduces learning load by ensuring similar words appear in a single predictable location. The sheet and layer data structure and the predictable nature of the text enables the Reading System to present every word in the English language (and most other languages) in a way that is accessible in one or two button presses, with most words accessible with one key press. Combined with the consistency of location for each word this substantially improves reading fluency. The sheets and layers are also preferably defines such that for a group of lexical elements for a sheet, each has the same word types for word variants so that there will be no gaps in the displayed symbol grids.

This system also makes it possible to display a symbol that is semantically congruent with the subtly different meanings of words in different word classes such as the noun 'spy' (the person who watches), the verb 'spy' (the act of watching another person's actions). Provision of semantically congruent symbols enhances reading fluency by providing symbols that make sense in the context of the sentence which reduces the symbol search time particularly when a student is less familiar with a symbol. It also supports reading comprehension and vocabulary expansion by providing an accurate depiction of the meaning of the word in the specific context of the current sentence.

In addition to the word type, the relationship assigned to the new word in relation to existing words within the dictionary plays an important role in assigning a sheet cell position to the new word. Words can be classified as KeyWords, AssociatedWords, ConnectedWords, LinkedWords and SharedKeyWords. Each of these words and the implications for placement of words within the Sheets, Sheet Layers and cells are described below.

A KeyWord is a word that anchors a collection of words to a cell in a sheet and the sheet's layers. Data defining the collection of semantically related words is referred to as a lexical element, and is associates with a display (cell) position within the display grid. The choice of which word out of a group of related words is assigned as the KeyWord is made by the user and is normally the most commonly occurring word form in children's books. The selection of a word as KeyWord is arbitrary and not critical to the functioning of the application. The KeyWord determines the placement of all its related words which include SharedKeyWords, AssociatedWords, ConnectedWords and LinkedWords. A KeyWord may be moved to a different Sheet of the same Fitzgerald Type, but can only be placed in the same cell position. When a KeyWord is moved to a different Sheet, all its related words are automatically moved with the KeyWord to the appropriate sheet and layers within the sheet according to the related words' Fitzgerald type. The KeyWord is the default word for its sheet and determines the default symbol to be displayed in the sheet. During book parsing or other processed, when preparing a new sheet or updating existing sheets, a new lexical element is assigned a next vacant symbol position. For example, the KeyWord is automatically placed in the next available free cell in the appropriate sheet in the Layer of the appropriate Fitzgerald type. This automatic placement can be manually overridden if the placement is not suitable. The next available free cell is the leftmost free cell in the topmost row in the lowest numbered sheet with a Layer of the appropriate Fitzgerald type. If there are no free cells, a new sheet is created. A KeyWord that has a LinkedWord with the same spelling must have a definition. A KeyWord may or may not have popups.

A SharedKeyWord is identical to a KeyWord in all attributes except that it occupies a different sheet. Although the SharedKeyWord is on a separate sheet, it occupies the same cell position within its sheet and layers as the original KeyWord. A SharedKeyWord does not occur very often. The main reason for the occurrence is when the original KeyWord has an AssociatedWord which in turn has additional words associated with it that vary substantially in semantic meaning from the original KeyWord. Having a SharedKeyWord ensures that the cell position can remain the same for both the AssociatedWord and the related new SharedKeyWord whilst maintaining the ability to group words which vary considerably in meaning (i.e. the original KeyWord and the new SharedKeyWord) on separate sheets under separate KeyWords.

A LinkedWord is a word linked to a KeyWord and has a grammatical association with the KeyWord. It is located on the same sheet as the KeyWord in the same cell position but on a different layer than the KeyWord. The layer that the LinkedWord appears on is the appropriate layer for the LinkedWord's Fitzgerald type. A LinkedWord can be a noun, verb or adverb/adjective, but it cannot be the same Fitzgerald type as the KeyWord. A LinkedWord inherits the symbol of the KeyWord but this can be manually overridden if a different symbol is deemed more semantically appropriate. A LinkedWord may or may not have popups. The layer containing the LinkedWord dynamically replaces the KeyWord Sheet Layer when the LinkedWord is the current word in the text of the book.

A ConnectedWord is related to a KeyWord or an AssociatedWord and has a grammatical connection with the KeyWord or AssociatedWord. The main difference between a LinkedWord and a ConnectedWord is that a ConnectedWord is the same Fitzgerald type as the KeyWord or AssociatedWord that it is related to. The system automatically places the ConnectedWord in the same Sheet Layer as the KeyWord or AssociatedWord that it is connected to and this placement cannot be overridden manually. The ConnectedWord inherits the symbol from the KeyWord or AssociatedWord that it is related to. The ConnectedWord is dynamically displayed in the cell that the KeyWord or AssociatedWord occupies when the ConnectedWord appears as the current word in the text of a book. The ConnectedWord may or may not have popups.

An AssociatedWord is a different word with a semantic connection to the KeyWord. The word is associated with the KeyWord but may or may not have a grammatical connection to a KeyWord. An AssociatedWord may be placed on the same layer or a different layer than the KeyWord depending of the Fitzgerald word type of the AssociatedWord. Regardless of the layer the AssociatedWord always occupies the same cell position as the KeyWord and is dynamically displayed when the AssociatedWord is the current word in the text of a book. An AssociatedWord may or may not have its own symbol. If it does have its own symbol this symbol overrides the KeyWord symbol when the AssociatedWord is the current word in the text of a book. If it does not have its own symbol it inherits the symbol of the KeyWord. An AssociatedWord that has the same spelling and Fitzgerald type as the KeyWord must be given a definition for differentiation with the KeyWord. An AssociatedWord may or may not have popups.

There are different types of sheets available for word placement depending on the Fitzgerald word types of the KeyWord and the other related words which are placed on the same sheet. These different types of sheets consist of different groupings of layers. Sheet types include single layer sheets for verbs, nouns, adjectives, pronouns and people, and miscellaneous. Sheets with multiple Layers include the following combinations: verb and noun; verb and adjective; noun and adjective; and verb, noun and adjective. KeyWords are allocated to the correct sheet by the user to ensure that the sheet have the required combination of layers to accommodate all the Fitzgerald word types for all the word related to the KeyWord but no redundant Layers that would result in blank cells appearing in the application user interface. This allocation of KeyWords to the correct sheet and associated layers is essential as it ensures that all the cells on each Sheet Layer can be fully populated. It is envisaged that only one or two sheets for each word type will be incomplete at any one time as vocabulary is cumulatively entered into the dictionary.

Figure 3A:
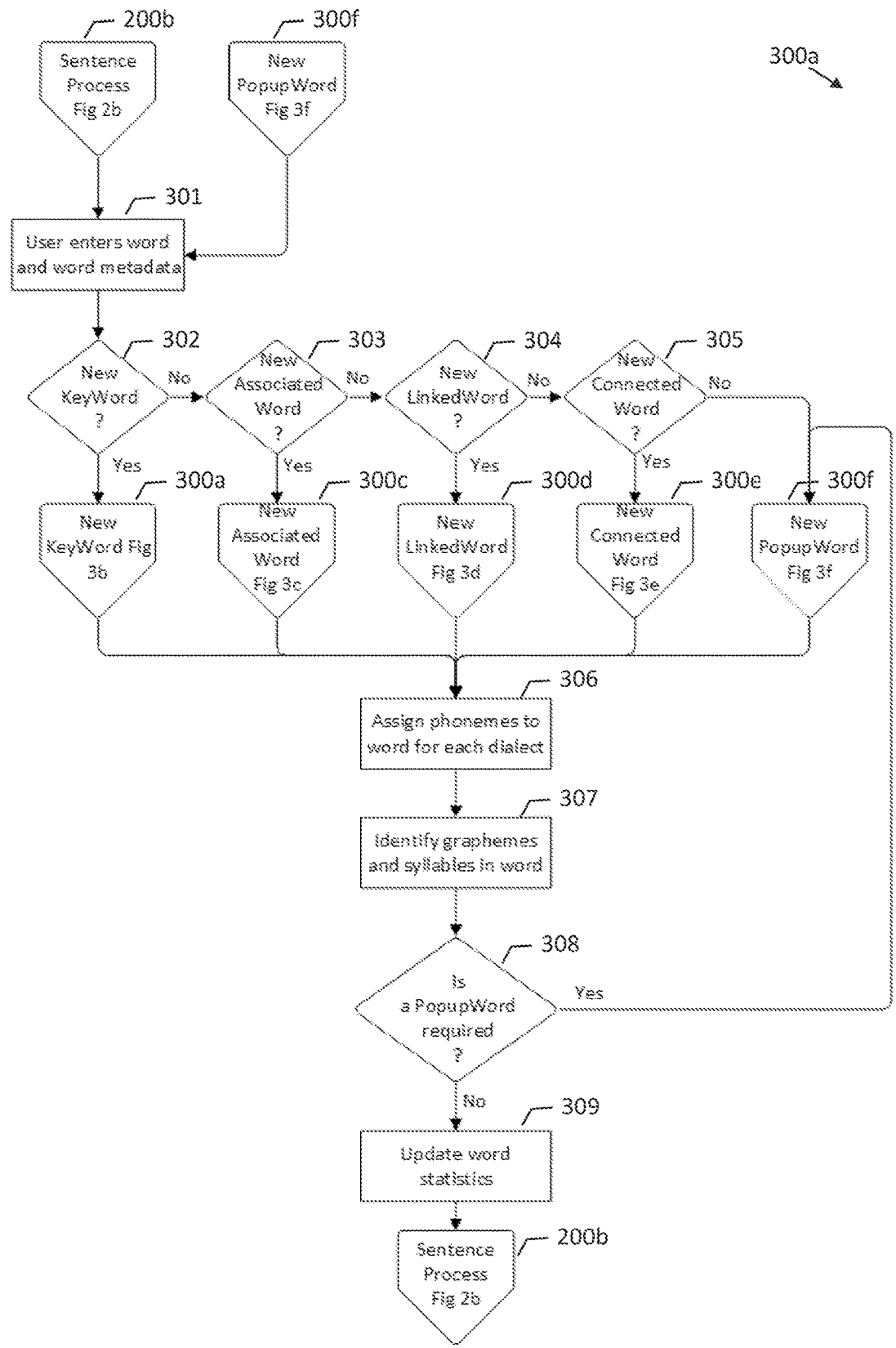
FIG. 3A is a flowchart of an embodiment of a New Word Process.

FIG. 3A describes the process of entering a new word into the dictionary in greater detail. The system waits for input from the user to enter the word's associated metadata such as the dialects the word appears in, whether the word is single or multisyllable, phonetically regular/irregular and the Fitzgerald word type (301). The system then obtains input from the user to determine whether the word is a new KeyWord (302), AssociatedWord (303), LinkedWord (304) or ConnectedWord (305), or Popup word (300*f*).

Figure 3B:
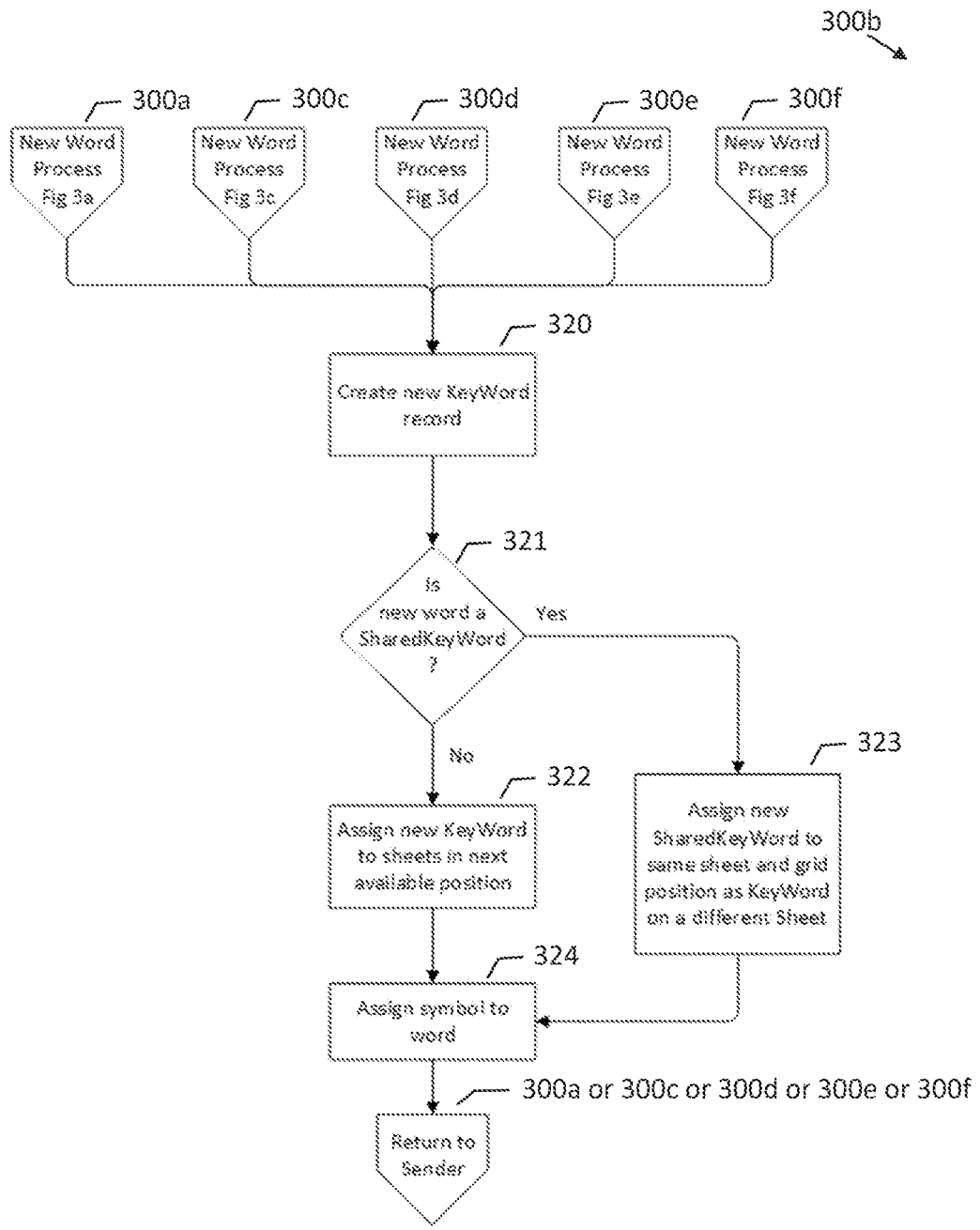
FIG. 3B is a flowchart of an embodiment of a New Word Process—New KeyWord.

If the word is a new KeyWord or SharedKeyWord (302), the process of entering a new KeyWord (300*b*) is described in greater detail in FIG. 3B. The system creates a new KeyWord record (320) and waits for the user to indicate whether the new word being added is a SharedKeyWord (321). If the word is a KeyWord rather than a SharedKeyWord, the user indicates the combination of sheet layers needed for the KeyWord and (if required) its related words. The system then assigns the new KeyWord to the next available sheet containing the required layers and the next available cell position within the appropriate layer for the KeyWord's Fitzgerald word type (322). If the word is a SharedKeyWord, the user indicates the KeyWord that the SharedKeyWord has a relationship to and the system then assigns the SharedKeyWord to the same sheet layer and grid position as the Keyword but on a different sheet than the KeyWord (323). A symbol is then allocated to either the KeyWord or the SharedKeyWord (324) and the process returns to FIG. 3A.

Figure 3C:
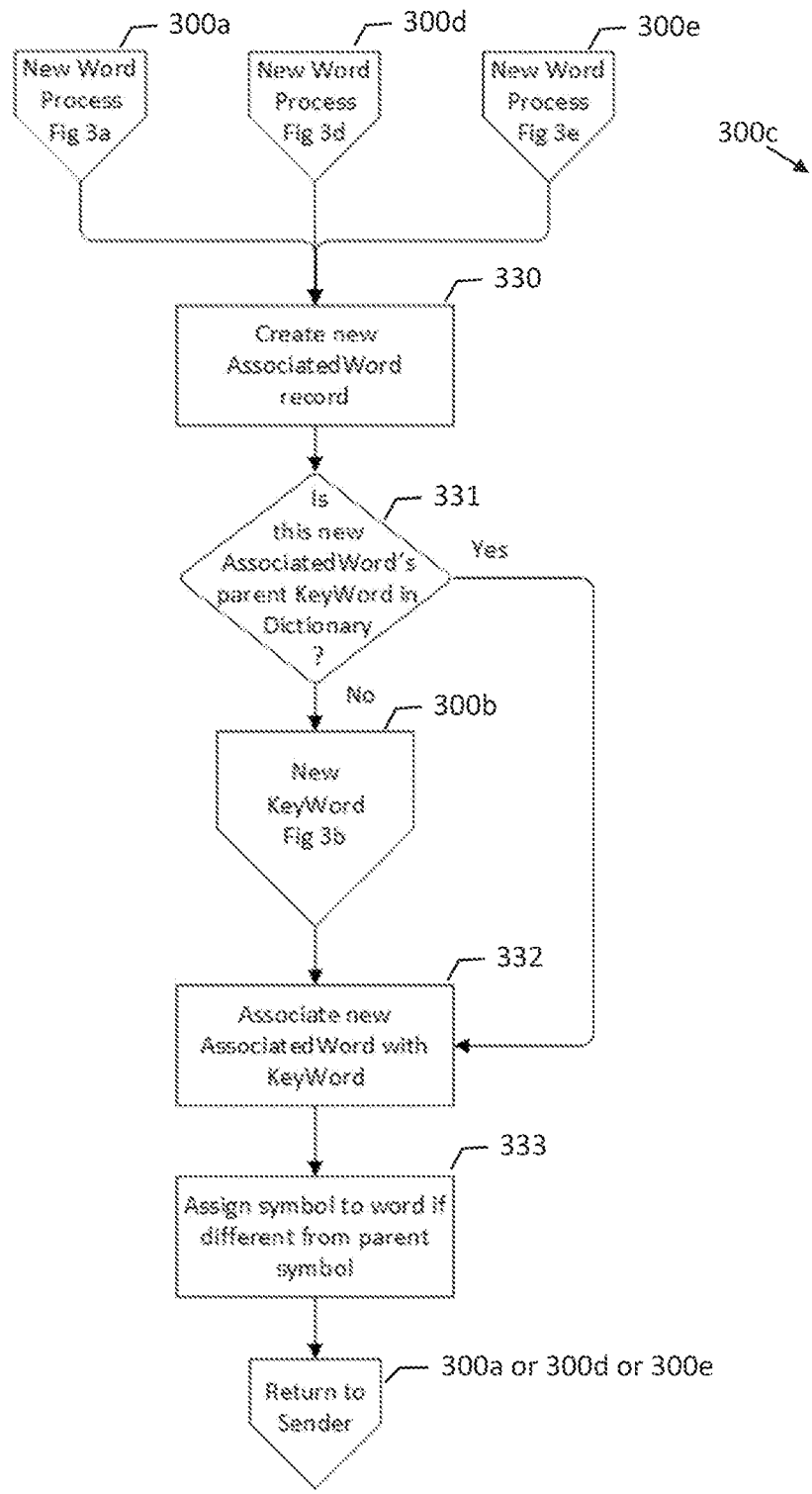
FIG. 3C is a flowchart of an embodiment of a New Word Process—New AssociatedWord.

If the new word is an AssociatedWord (303), the process for entering the AssociatedWord (300*c*) is outlined in greater detail in FIG. 3C. The system creates a record for the new AssociatedWord (330). The system then asks the user whether the AssociatedWord's parent KeyWord is already in the dictionary (331). If it is not, the system completes the new KeyWord process (300*b*) described above in FIG. 3B for the new parent KeyWord and then associates the new AssociatedWord with the KeyWord (332). If the parent KeyWord is already in the dictionary, the system associates the AssociatedWord with the KeyWord (332). The user then assigns a symbol to the AssociatedWord if it requires a different symbol from the KeyWord (333). The process then returns to FIG. 3A.

Figure 3D:
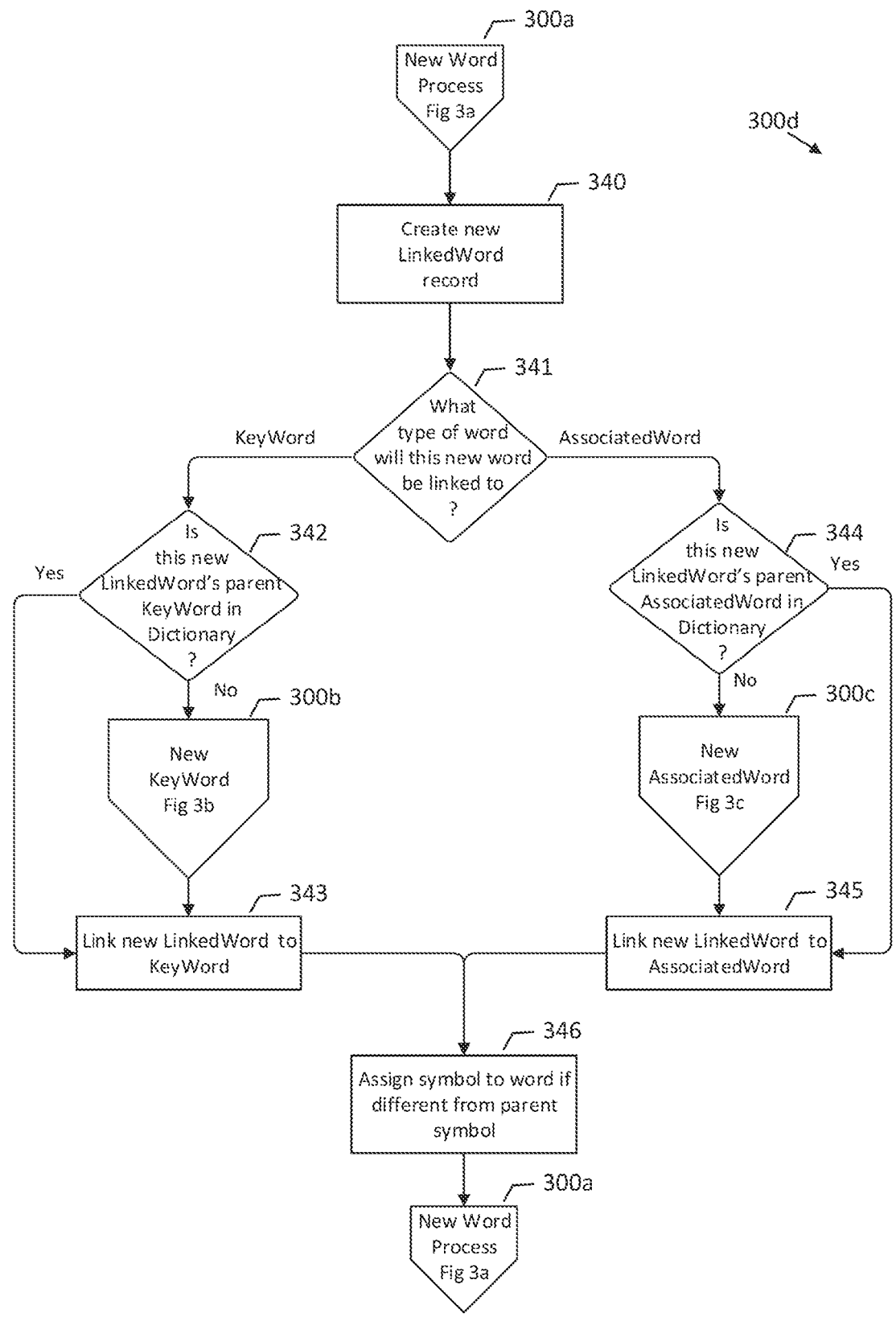
FIG. 3D is a flowchart of an embodiment of a New Word Process—New LinkedWord.

If the new word is a LinkedWord (304), the process (300*d*) is outlined in greater detail in FIG. 3D. The system creates a new LinkedWord record (340). The system then asks the user whether the new word will be linked to a KeyWord or an AssociatedWord (341). If input from the user indicates that the word is linked to a KeyWord, the system then asks the user to indicate whether the LinkedWord's parent KeyWord is already in the dictionary (342). If it is not the system completes the new KeyWord process (300*b*) described above in FIG. 3B for the new parent KeyWord and then associates the new LinkedWord with the KeyWord (343). If the parent KeyWord is already in the dictionary (342), the system associates the LinkedWord with the Key-Word (343). If input from the user indicates that the word is linked to an AssociatedWord (341), the system then asks the user to indicate whether the LinkWord's parent Associated-Word is already in the dictionary (344). If it is not, the system completes the new AssociatedWord process (300*c*) described above in FIG. 3C for the new parent Associated-Word and then associates the new LinkedWord with the AssociatedWord (345). If the parent AssociatedWord is already in the dictionary (344), the system associates the LinkedWord with the AssociatedWord (345). Once the new LinkedWord has been linked to either the parent KeyWord or AssociatedWord, the user then assigns a symbol to the LinkedWord if it requires a different symbol from the KeyWord/AssociatedWord (346). The process then returns to FIG. 3A.

Figure 3E:
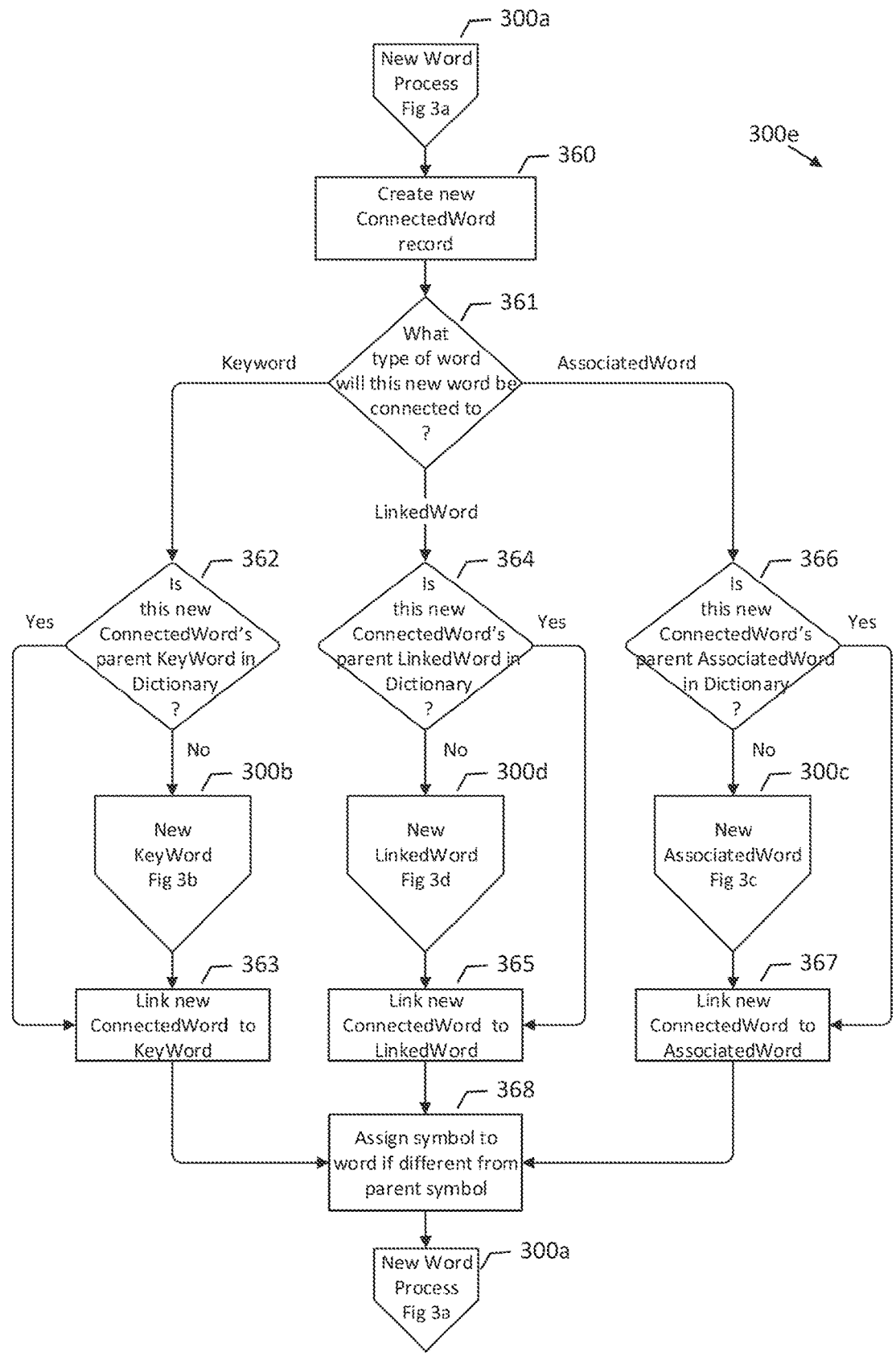
FIG. 3E is a flowchart of an embodiment of a New Word Process—New ConnectedWord.

If the new word is a new ConnectedWord (305), the process (300*e*) is outlined in greater detail in FIG. 3E. The system creates a new ConnectedWord record (360). The system then asks the user whether the word will be connected to a KeyWord, LinkedWord or an AssociatedWord (361). If input from the user indicates that the word is linked to a KeyWord, the system then asks the user to indicate whether the ConnectedWord's parent KeyWord is already in the dictionary (362). If it is not the system completes the new KeyWord process (300*b*) described above in FIG. 3B for the new parent KeyWord and then links the new Connected-Word with the KeyWord (363). If the parent KeyWord is already in the dictionary, the system associates the Connect-edWord with the KeyWord (363). If input from the user indicates that the new ConnectedWord is linked to a Linked-Word (361), the system then asks the user to indicate whether the ConnectedWord's parent LinkedWord is already in the dictionary (364). If it is not, the system completes the new LinkedWord process (300*d*) described above in FIG. 3D for the new parent LinkedWord and then associates the ConnectedWord with the LinkedWord (365). If the parent LinkedWord is already in the dictionary (364), the system associates the ConnectedWord with the LinkedWord (365). If input from the user indicates that the word is linked to an AssociatedWord (361), the system then asks the user to indicate whether the ConnectedWord's parent Associated-Word is already in the dictionary (366). If it is not, the system completes the new AssociatedWord process (300*c*) described above in FIG. 3C for the new parent Associated-Word and then associates the new ConnectedWord with the AssociatedWord (367). If the parent AssociatedWord is already in the dictionary (366), the system associates the ConnectedWord with the AssociatedWord (367). Once the new ConnectedWord has been linked to either the parent KeyWord (363), LinkedWord (365) or AssociatedWord (367), the user then assigns a symbol to the ConnectedWord if it requires a different symbol from the parent symbol (368). The process then returns to FIG. 3A (300*a*).

Once all the word relationships have been assigned to the new word, the next step in the new word process is to assign phonemes to the word for each dialect (e.g. Australian English, UK English and American English) (306). Initially the system makes a rules-based attempt to identify the graphemes in a word and then to assign phonemes to each grapheme. The user then determines if the system allocation is correct. This process occurs through a repetitive process of input of phoneme(s) by the user and audio output by the system of the entered phoneme until the user provides input to the system to indicate that the phonemes are correct. The system then converts the phonemes entered to phonetic tags. These phonetic tags are then saved in the database by the system to enable the individual sounds in each word and each syllable to be correctly pronounced for the purpose of sounding out words. This process is necessary because the voice synthesis programs have a native understanding of how to correctly pronounce words as a complete unit, but need specific input from the user in the form of phonetic tags to instruct the system on how to correctly pronounce individual phonemes within words and also the individual syllables within words. This process enables the AAC Reading System to sound out words. Modifications can also be made to the pronunciation of the whole word if required. It should be noted that this ability to program pronunciation at the word, syllable and individual sound level for every word is not present in existing AAC systems and is a reason why they don't have the capacity to effectively enable students to sound out words.

Once the user is satisfied with the pronunciation of the word, the next process involves the user assigning the sounding out pattern for the word by associating graphemes with the individual sounds in words and within the syllables in words (307). For example, the word table could be sounded out as t-a-b-le, to-ble or t-a-b-le depending on where the user specifies the pauses between sounds should occur. In the case of phonetically irregular words, the association of letter names for spelling with the graphemes also enables words to be spelt out when the traditional approach to sounding out is selected in settings.

The system then asks the user if a popup needs to be added to the new word (308). Popups are usually required to enable the system to correctly present the plural and possessive forms of nouns, various endings of some adjectives and adverbs, some verb forms, and for some pronoun forms. If no Popup Words need to be added, the system then updates word statistics (309).

Returning to the sentence process (200) in FIG. 2, the new word entry is located in the dictionary (206), the word is encoded and allocated to the book (207), and the current word's KeyWord and KeyWord's sheet is also allocated to the book (208, 209). The system then encodes the sentence text for the text display and speech synthesis and saves the data in the database (210). The system then continues with the sentence process outlined previously to identify whether there are additional words in the text to enter.

Figure 3F:
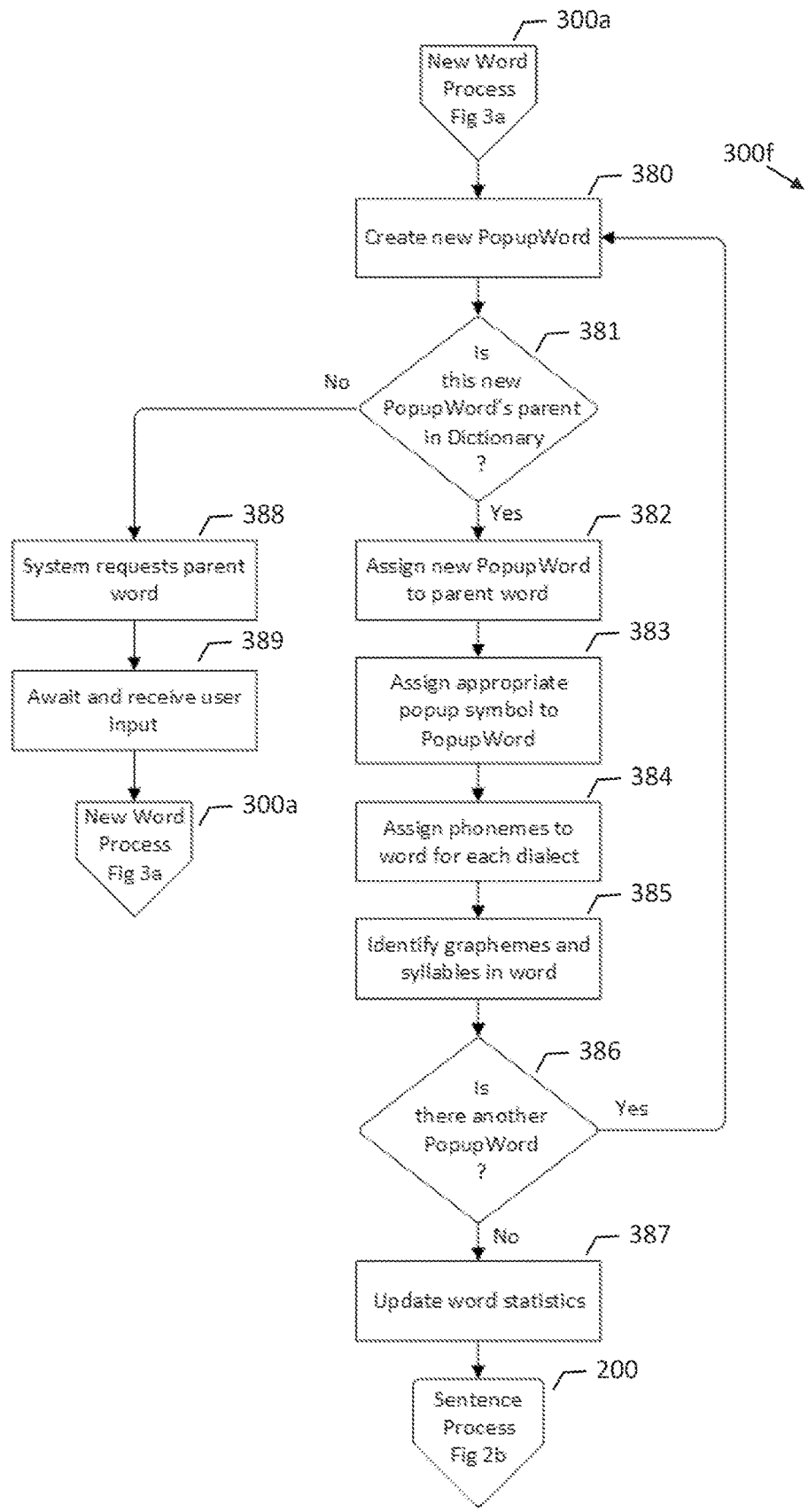
FIG. 3F is a flowchart of an embodiment of a New Word Process—New PopupWord.

Returning to FIG. 3A, if the user indicates the new word does need a PopupWord to be added (308), the new popup process commences (300*f*). This new PopupWord process can also be commenced when a parent word already exists in the dictionary and the new word just needs to be added as a PopupWord (301, 302, 303, 304, 305, 300*f*). For the purposes of completeness and cumulatively expanding the vocabulary in the dictionary, all known popups for each new word are added at the time of new word entry even if the word being parsed in the sentence is only the base word. Ideally the case of adding a popup later to an existing word should only be used when there has been an accidental omission during a previous new word entry. The new PopupWord process is outlined in greater detail in FIG. 3F (300*f*). The system creates a new PopupWord record (380). The system then asks the user whether the parent of the PopupWord is in the dictionary (381). In some cases where the new word process has been activated for a word that is a PopupWord and occurs in a sentence, the parent word may not exist in the dictionary yet. In this case the system requests input of the parent word prior to adding the PopupWord. The user enters the parent word (388, 389) and then the system starts the previously described new word process (300*a*) outlined in FIG. 3A to enter the parent of the PopupWord. Following entry of the parent the need to enter a popup is indicated by the user (308) and the PopupWord process (300*f*) is reactivated in FIG. 3F.

Returning to FIG. 3F, if the new PopupWord's parent is in the dictionary (381), the user assigns the new PopupWord to the parent word (382), assigns the appropriate popup symbol to the Popup word (383), adds the phonemes for each dialect (384), and then the graphemes and syllables in the word (385). The system then asks the user if an additional PopupWord needs to be added (386). If there is an additional popup required, the PopupWord process is repeated (380). The system then updates word statistics (387) and returning to the sentence process in FIG. 2 (200), the new word entry is located in the dictionary (206), the word is encoded and allocated to the book (207), and the current word's KeyWord and KeyWord's sheet is allocated to the book (208, 209). The system then encodes the sentence text for the text display and speech synthesis and saves the data in the database (210). The system then continues with the sentence process outlined previously to identify whether there are additional words in the text to enter.

The output of the parsing process is a new book file that can be made accessible to users via a library (typically online), and an updated system-wide vocabulary dictionary (with any new words or meanings). As more books are parsed the vocabulary library grows accordingly and exponentially diminishes the complexity of the user task and accordingly the time to perform the task.

Smart Popups

In the AAC Reading System, knowing the current word and its meaning enables the system to use a method of smart popups which only displays the popup symbols when required which enhances reading fluency. Typically, in existing AAC communication systems, if a user wanted to say a word like 'run' they would first have to select the verb section of the communication device, then the base symbol 'run' which would activate a popup with all the verb forms of 'run' (e.g. 'run', 'running', 'ran') and they would then have to select the symbol for 'run'. In the AAC Reading System, because the system already knows what form of a word the current word is, the system can use a method of smart popups whereby if the base symbol represents the current word, the word is treated as a single symbol rather than activating a popup and appearing in the symbol array of the popup. For example, if the current word is 'run', because this word represents the base word for the verb run, the system will treat this word as a single symbol in this case which reduces the buttons pressed from three to one to read this word.

This allows faster access to the symbol representing the word to promote reading fluency. Popups are only activated when the current word relates to the ontology of the base word. For example, to say the word 'go', the student only requires a single button as it is the base word of the popup.

In contrast to say the related word 'went' requires selection of the symbol for 'go' which is the base word and then selection of the symbol representing 'went' on the popup. Note though that even when a popup is required, the initial navigation step in existing AAC Systems of navigating to the verbs page is eliminated because the AAC Reading System already knows the current word the student is reading so it displays the verb sheet layer of the correct sheet to enable the student to select the current word from the symbols displayed on the sheet layer by firstly selecting the base word symbol for the verb and then the associated popup symbol.

Using Symbols Group Highlighting to Reduce Cognitive Load

In the AAC Reading System, knowing the current word enables the reading system to highlight only a small symbol group containing the target symbol within the sheet layer which reduces learning load by reducing the number of symbols the user must visually differentiate between at any given time. When a user inputs a symbol selection, the system also knows what popups need to follow and dynamically displays them immediately adjacent to the base symbol without the need for additional user input. Reducing the amount of user input required also speeds up reading fluency and reduces fatigue for users who find symbol selection physically difficult. This also substantially speeds up the scanning process for those users who provide system input through switches.

Sounding Out Words

Existing AAC communication interfaces do not contain enough letter-to-sound correspondences to enable students to sound out novel words. Furthermore, because existing AAC communication interfaces do not know the context of the word in the sentence, even if the AAC communication interface has some of the letter-to-sound correspondences, the system will be unable to always provide the correct pronunciation. This is particularly problematic in languages such as English where a letter combination may have multiple meanings and pronunciations and some words are highly irregular in their pronunciation. Furthermore, the meaning of the word is derived from the context of the sentence and this meaning often influences the correct pronunciation (e.g. lead (noun—metal) vs lead (verb—show the way) vs lead (noun—leash)). Not having the predictive capabilities derived from the contextual information contained within the whole sentence reduces the accuracy of pronunciation. Knowing the word and the meaning of the word through the book parsing process combined with the phonetic coding of each word at a whole word level, syllable level and individual sound level enables the word and its subcomponents to be accurately sounded out in the AAC Reading System.

In addition to the difficulties associated with pronunciation, different sounding out processes are used depending on instructional approaches to phonics instruction. For example, the instructional approach employed may influence whether words are considered decodable (phonetically regular words) or not (phonetically irregular). Sounding out processes can also differ depending on whether the word is comprised of single or multiple syllables. Decodable words are sounded out using the individual sounds relating to each letter or letter combination. Multisyllabic decodable words are segmented into the sound combinations of each syllable and non-decodable words are spelt out using letter names rather than sounds. Existing AAC systems do not have a dedicated sounding out system like the 'Sound-It' system contained within this AAC Reading System. Furthermore, because existing AAC systems were not designed for reading there is no method for the system to identify and provide a differentiated sounding out procedure for these different word types within the text.

Error Correction

An additional limitation of existing AAC communication interfaces is that because they don't know the current word that the student is attempting to read, apart from articulating the word associated with the selected symbol (and relying on the student to self-monitor), they cannot provide any instructional feedback to the user regarding whether they correctly selected the symbol corresponding to the text. They are also unable to collect data on error types, fluency rates and provide instructional support that is tailored to the support needs of the individual user based on this data.

The AAC Reading System is configured in some embodiments to provide this corrective feedback to the user because it knows what the current word in the sentence is. The AAC Reading System can contain different corrective feedback options depending on the previous number of errors on the current word and the learning strategies already attempted by the user. The level of feedback provided to the user is also determined by the reading mode selected.

The first reading mode is Join-In Mode. This mode is aimed at allowing very young children and older students who are just beginning to enjoy books the opportunity to more actively participate in shared book reading experiences. This mode commonly involves reading preschool books rather than the levelled readers used in formal literacy instruction. This mode is as much a language-based early literacy task as a reading task in that the student is attending to the repetition of language in the book to select the symbol rather than decoding the words in the text. The inclusion of this mode has a very important function as early engagement in shared book reading is a positively correlated with acquiring formal literacy skills. Without appropriately configured AAC systems like the AAC Reading System it is difficult for students who use AAC to fully participate in these shared book reading activities. In Join-In Mode, the AAC Reading System is configured so that either the system or another person such as a parent or teacher reads the majority of the text and user is responsible for "reading" a single word or phrase that is used repetitively in the book. For example, if reading *The Very Hungry Caterpillar* book by Eric Carle, the phrase " . . . he was still hungry." occurs frequently in the text. If this book was being read in Join-In Mode the settings would allow for the user to either read the complete phrase "he was still hungry" or the word "hungry" depending on which option was more developmentally appropriate for the user.

In Join-In Mode the system is configured for errorless learning by pulsing the current symbol that needs to be selected within the symbol group and then pulsing the next required symbol within the symbol group and so forth.

The next reading modes provided are Pre-Reading and Read-Along Modes. The reading processes in these modes are the same, the only difference being that Pre-Reading Mode occurs as an option when reading books and Read-Along Mode occurs as a reading option for reading plays. When Pre-Reading or Read-Along Mode has been enabled, they also use errorless learning methodology that is identical to in Join-In Mode. The only difference between these modes and Join-In mode is that in Pre-Reading and Read-Along modes, the user reads the entire text using this method or in the case of plays the users entire play part. This mode is a stepping-stone to the more formal reading instruction modes described below.

These reading instruction modes include Learning Mode and Fluency Mode for books and Practice and Performance Modes for plays. These modes are discussed in greater detail below, but briefly, Fluency Mode and Performance Mode are designed to provide an express error correction process that alerts the user to their error and displays the correct symbol to provide explicit error correction but also maximise reading fluency. In contrast, Learning Mode and Practice Mode provide greater scope for learning opportunities following an error with the student provided with an opportunity to independently determine the correct word, but the trade-off is to sacrifice some degree of reading fluency due to a more time intensive error correction process.

An embodiment of the AAC system will now be described in more detail with reference to an example illustrated in FIGS. 5 to 27.

Application Environment

The application environment includes a student reading application running on a device. This application allows the student to select a book or play and read it aloud by sequentially selecting symbol(s) that represent the words. When the student selects a symbol, the device outputs an audible output of the user-selected word. The relationship between the components within the application environment is outlined in FIG. 5. The application (509) on the student's device communicates with other components of the reading system such as the cloud-based data storage (502), file server (505), application server (503) and applications (504) via application program interfaces (506) using an internet-based network (507) to enable the student to read aloud the text in the selected book.

The application environment also includes an administration application running on a network server and accessed via a web browser. This application allows the administrator to perform numerous data maintenance functions including: entering new books and editing existing books; entering new vocabulary into the dictionary; adding word symbols to the symbols library; and sourcing data files from book publishers. The application on the administrator's device communicates via a web browser (508) with other components of the reading system such as the cloud-based data storage (502), file server (505), application server (503) and applications (504) via web and application program interfaces (506) using an internet-based network (507) to enable maintenance of all the system data.

The application environment also includes a teacher (and parent) application running on a network server and accessed via a web browser. This application allows the teacher to browse books that are available as book files for the student reading application and to purchase the files. Once purchased, the files are then automatically available for download to the student's device. This application also allows the teacher to enter certain data relating to the student (including the symbol set to be used and the grid configuration to be used by the student in the reading application) that assists with the configuration of the student reading application and determines the structure of the book files downloaded to the device. The application on the teacher's device communicates via a web browser (508) with other components of the reading system such as the cloud-based data storage (502), file server (505), application server (503) and applications (504) via web and application program interfaces (506) using an internet-based network (507).

Figure 6:
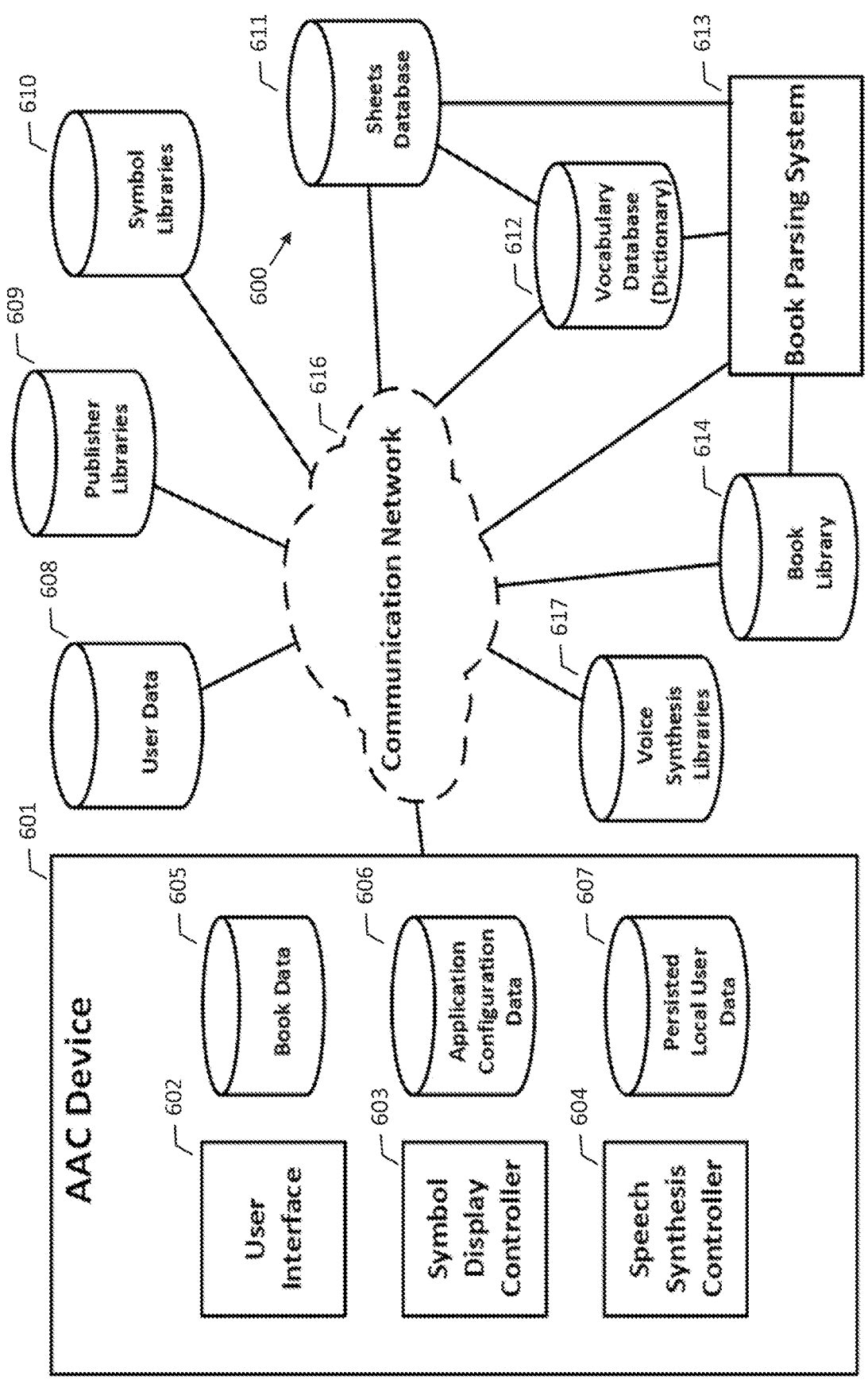
FIG. 6 is a block diagram illustrating System Network Relationships for an embodiment of the system.
Figure 7:
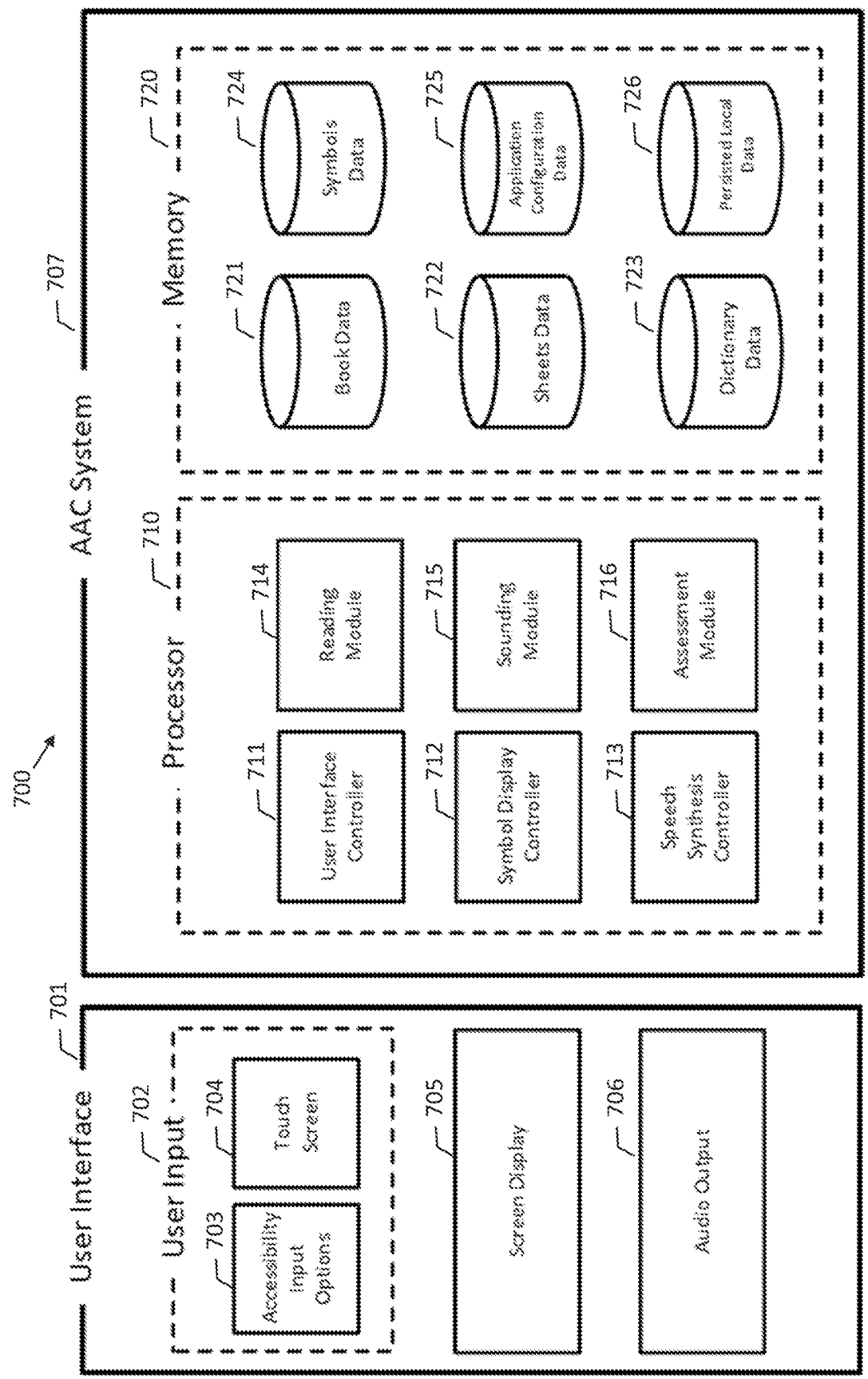
FIG. 7 is a block diagram illustrating a User Application Environment for an embodiment of the system.

FIGS. 6 and 7 show block diagrams of examples of the embodiments of the system. FIG. 6 shows an example of a system embodiment where a user interacts with the system via a communication network (616) connected AAC device (601). The device (601) in this embodiment includes a user interface (602) driven by a user interface module to control rendering of visual data on a display, output of audio data and receiving of user inputs. A symbol display controller (603) controls allocation of symbols to symbol groups for rendering and display in an AAC layout. A speech synthesis controller (604) converts the contents of book data files into realistic speech using articulation, pronunciation and emphasis appropriate to the language and dialect of the user. Device memory stores book data (605), application configuration data (606) and persisted local user data (607). The book data stores a set of a plurality of word records, each word record being associated with a word and comprising a word identifier unique within the dictionary, the word text, an AAC symbol representation for the word, and sound data to enable audible reproduction of the word via the user interface, the set of word records including a record for each one of all words occurring in the text of at least one book. Book data for a plurality of individual books prepared for reading using the AAC Reading System can be stored in a network accessible book library (614) for download to local book data library (605). Some embodiments may also be configured for on-line access.

In this embodiment (FIG. 6), the system also comprises a user data database (608) storing user data for a plurality of users. The data includes two types of data: data that helps in the configuration of the application, and data relating to the user's use of the application. Configuration data includes choice of grid configuration, symbol set, language and dialect and accessibility choices. Usage data includes details of books read, words learnt, errors, reaction and latency times and reading level.

In this embodiment (FIG. 6), the system also comprises a vocabulary database (612) storing dictionary data for a plurality of words. The system further comprises a book parsing system (613) configured to facilitate generation of book data and word records for books. The book parsing system can be configured to access a publisher library (609) to download book data (with appropriate permission from the publishers) for processing and generation of AAC book data files for storing in the book library (614). The book parser can be configured to access symbol libraries (610) to download symbol data (with permission from the AAC symbol publishers) for use in the symbol display controller (603) to represent each word in each book with a semantically congruent AAC symbol. The book parser can be configured to access a sheets database (611) that contains instructions to the symbol display controller (603) on the placement of words within a grid displayed in the user interface (602). The book parser (613) both accesses and builds on a vocabulary database (612) and sheets database (611) for the system. In the embodiment shown the book parsing system, vocabulary database, book library, sheets database, symbols libraries, publisher libraries and user data are accessible via a communication network.

For each book, the book data comprises book text data encoded to reference word identifiers from the dictionary for each word of text of the book and sequence data for the book. The symbol display controller (603) is configured to determine membership of at least one symbol group based on sequence data for the book and received user input, such that the symbols displayed will correspond to at least the symbols required for the user to select via the user interface (602) for audio output based on reading sequence of the book.

FIG. 7 shows a more detailed block diagram of an AAC system, this may be provided via a device (such as a tablet computer or laptop running a software application implementing the system or a client server arrangement) connected into a broader system such as shown in FIG. 6 or be a stand-alone device. The user interface (701) provides user input options (702) including touch screen (704) and accessibility options (703) (for example switching and eye gaze technologies), screen display (705) and audio output (706). The AAC System (707) utilises the processor (710) and memory (720) resources of a user device to provide the AAC functions as described above.

The processor (710) implements the user interface controller (711), symbol display controller (712) and speech synthesis controller (713). In some embodiments the system also includes a reading module (714) configured to control the flow of text from book data (721) to the user interface controller (711), symbol display controller (712) and speech synthesis controller (713). The system may also include an assessment module (716) configured to monitor user inputs and assess symbol selection, log errors, and generate feedback regarding errors. The assessment module can be further configured to provide a teaching mode wherein a word in text and an associated symbol are concurrently displayed to the user, and user input monitored to determine if the user inputs the correct symbol. The system can also include a sounding module (715) configured to sound out word components based on sound data for the word. The dictionary data (723) can include, for each word record, phonetic data including dialectal variations to enable reproduction of the whole word by the user interface. Embodiments can also include sounding out data to enable sounding out of components of the word including syllables and graphemes. Phonemic, graphemic and syllabic data from the dictionary (723) is utilised by the sounding module (715) to synthesize or otherwise reproduce (for example, from audio recordings) and sound out words and their components via the audio output (706).

The memory (720) provides storage for data which in some embodiments may include book data (721), sheets data (722), dictionary data (723), symbols data (724), application configuration data (725) and persisted local data (726). Book data (721) may include the text of a plurality of books formatted and encoded to allow the user interface controller (711), the symbol display controller (712), and the speech synthesis controller (713) to coordinate the reading process, synchronising the display of sentences and words with the output of the appropriate synthesised speech. The sheets data (722) includes a plurality of three-dimensional layered sheets that provide data to the symbol display controller (712) to allow the correct positioning and display of the words in the text in a grid displayed in the user interface (701). The symbols data (724) contains all the AAC symbols in a plurality of symbol sets that are referenced in the dictionary (723) to allow the symbol display controller to display the appropriate symbol for each word in a text. The dictionary data (723), application configuration data (725) and persisted local data have been described previously herein.

Home Page and Application Map

Figure 8A:
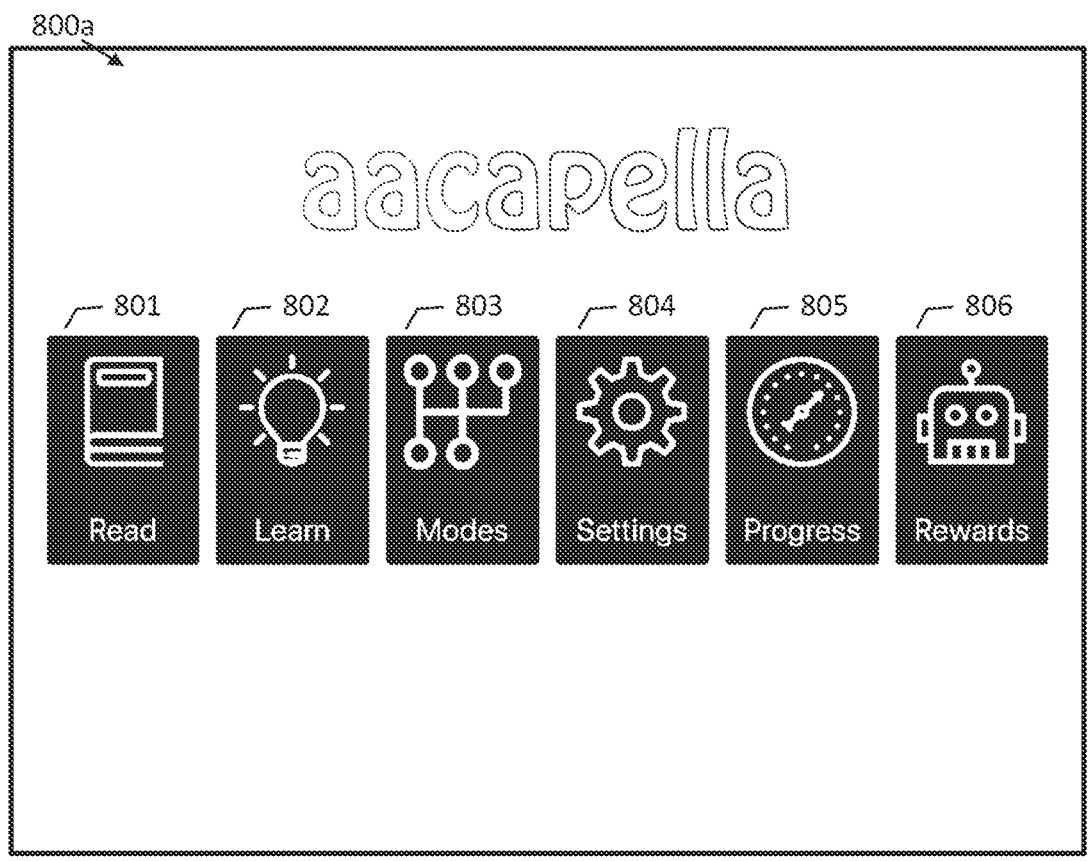
FIG. 8A is an example of a User Interface—Home Screen.

FIG. 8A displays a screenshot of the user interface home page. This page is the first page that is displayed when the Application is launched. The home page contains links to areas within the app that include the read section (801), learn section (802), modes section (803), settings section (804), progress section (805) and rewards section (806).

Figure 8B:
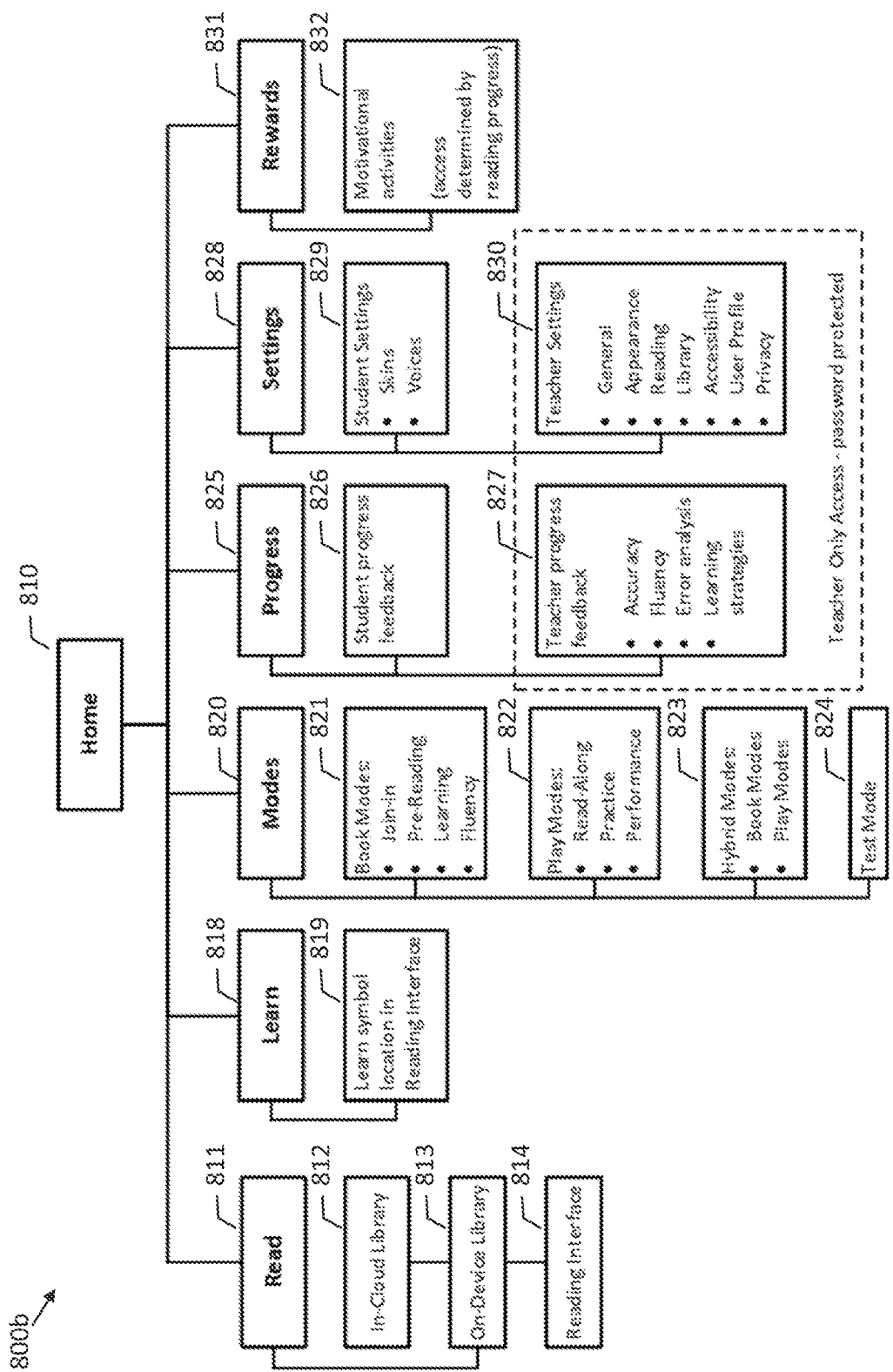
FIG. 8B is an example of a User Interface—Application Map.

FIG. 8B provides a map of the Application. The home page (810) contains links to areas within the app that include the read section (811), learn section (818), mode section (820), progress section (825), settings section (828) and the rewards section (831).

The read section of the Application (1811) performs the main functional processes of the Application. It contains both the libraries (812, 813) and the reading interface (814) that enables students to read books aloud. The learn section of the Application (818) provides an opportunity to pre-teach new symbols, revise difficult words and learn the location of these words within the reading interface (819). The mode section allows for the selection of different reading modes within the app (820). These different modes dictate the books/plays available to read in the library and the learning and error correction feedback provided to the student when they are using the reading interface. Different learning modes are available for books (821) and plays (822). Hybrid mode is used when both a book and a play are contained within the one text (823). In hybrid mode the system utilises the modes appropriate for whether the book or the play section of the text is currently being read. Test mode enables teachers to ask a student to read a text passage to assist with monitoring reading progress and determining what reading level has an appropriate level of difficulty for the student's current instructional needs (824). The progress section of the app (825) contains two sections: student progress feedback (826) and teacher progress feedback (827). Student progress feedback (826) provides simple measures of progress relating to reading accuracy, reading speed and current reward credits which unlock activities in the rewards section (831). The teacher progress section (827) is password protected and contains a more in-depth analysis of student progress relating to accuracy, fluency, error analysis and learning strategies. The settings section (828) consists of student settings (829) and teacher settings (830). Student settings allow the user to change the appearance of the reading interface background by selecting a skin. They can also select the voice for the system to use when outputting audio signals of the user selected words. The teacher settings (830) are password protected and contain a broader range of settings that influence the appearance of the reading interface, the reading modes available to be selected by the student, access methods, user profile and privacy settings. The final section of the app is the rewards section (831). This section contains motivational activities (832) to encourage the user to read. Access to these areas is unlocked by completing books and other reading activities.

Libraries and Reading Interface

The following section describes the libraries and the reading interface in greater detail. The system uses a library to store information relating to the books that the student reads aloud using the reading interface. This library can have two sub-libraries: an on-device library containing a small number of texts that the student is currently reading on their portable processing device, and an in-cloud library which contains a more extensive collection of book files including those previously read by the student. The collection displayed in the library is determined by the currently selected mode. Depending on the selected mode the library will display books, plays, hybrid books or text passages. The in-cloud library contains navigation, sorting and filtering options to find books and check boxes next to each book to enable multiple books to be selected at a time to be moved on/off the device. The cloud library is available only when the device is connected to the internet. These libraries are connected securely to enable the transfer of book files between them. Only books currently downloaded in the on-device library can be read aloud by the app.

Figure 9:
FIG. 9 is an example of a User Interface—Device Library.

FIG. 9 provides a screenshot of the user interface of the on-device library. The library contains a home button (901) to return to the home page, a settings button (902) to return to the settings section, a mode button to change reading modes (903) and a cloud button (904) to go to the in-cloud library. The on-device library also contains the books (905) that are currently downloaded onto the on-device library.

The Reading Interface

Figure 10A:
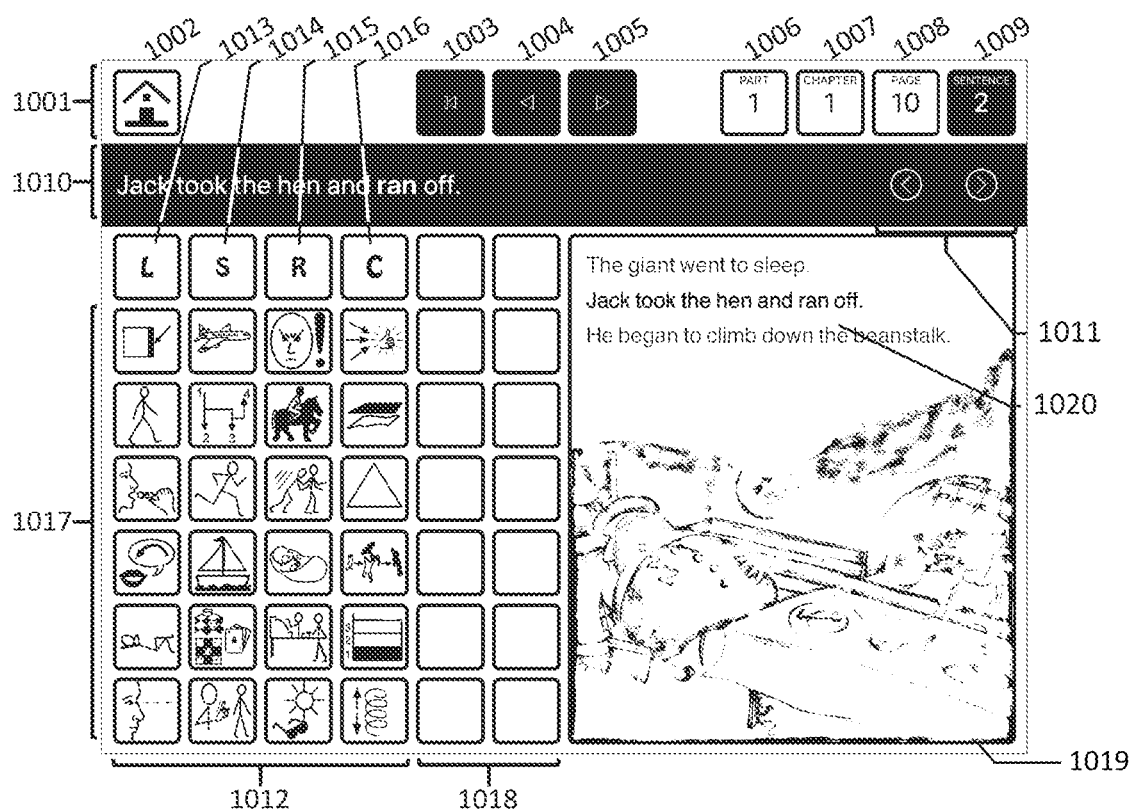
FIG. 10A is an example of a User Interface—Book Mode—Large Grid.

The reading interface enables students to read aloud books and is the main user interface within the application. Based on various student attributes (including physical limitations and sight impairment) users are presented with one of three different screen configurations. These configurations are selected in Teacher Settings. FIG. 10A shows a screenshot of an embodiment of the user interface in book mode using the large symbol grid. The top of the screen displays the control bar (1001) which contains all the buttons for navigating within the application. The home button (1002) allows the user to return to the home page. The navigation buttons allow the user to move back to the beginning of the section (1003), to navigate forwards (1005) and backwards (1004) through the book. The user firstly selects either the part (1006), chapter (1007), page (1008) or sentence button (1009) and the navigation buttons operate for the selected book section. For example, if the chapter button is selected, the navigation buttons navigate between chapters, if the page button is selected navigation between pages occurs, and if the sentence button is selected navigation between sentences on the current page occurs.

Directly below the control bar is the sentence bar (1010). The sentence bar contains the text of the current sentence that the student is reading in the book. The current word that the student is decoding is presented in a contrasting colour to the remainder of the sentence to assist with the reading process. The arrows at the end of the sentence bar allow the user to navigate word by word through the current sentence (1011).

Below the sentence bar on the left half of the screen is the grid array (1012). The first row of buttons in the grid array provide learning support to students to assist with the task of decoding and reading aloud the words. The 'Learn-It' button (1013), represented by an 'L' allows the student to learn the symbol associated with the current word and its location within the symbol grid. The 'Sound-It' button (1014), represented by an 'S' allows the student to sound out the current word in the text, and the 'Read-It' button (1015), represented by an 'R', allows the student to hear the current sentence read aloud up to but not including the current word, provided that the current sentence contains more than one word. The communicate button (1016), represented by a 'C', enables the reading interface to connect with and open a compatible AAC communication system so that users can more easily move between the AAC reading system and AAC communication systems and to alternate between completing language-based communication tasks such as discussing the content of the books and answering comprehension questions and reading-based communication tasks such as reading aloud the text. The methods and systems associated with these learning supports are discussed in more detail later in this section.

The remainder of the grid array is populated with symbols required to read the book (1017).

Each cell in the grid contains a button, and each button may or may not be populated with a symbol representing a word. The two far right columns in the reading interface (1018) remain blank when base words are displayed. They are required when popups occur to ensure that there is adequate space for popup grid overlays to be displayed. These popup overlays always include the base word position and the two grid spaces immediately to the right of the base word.

Below the sentence bar on the right half of the screen is the text box (1019). The text box contains all the text on the current page for books with smaller amounts of text. For books with larger amounts of text on the page than fits in the text box, the text displayed changes as required, but always ensures that the previous sentence, current sentence and next sentence are displayed. The current sentence is highlighted in the text box to assist the user with maintaining their place in the text (1020). In some embodiments the text box also contains an illustration related to the text, to support reading comprehension and facilitate user engagement with the text.

Figure 10B:
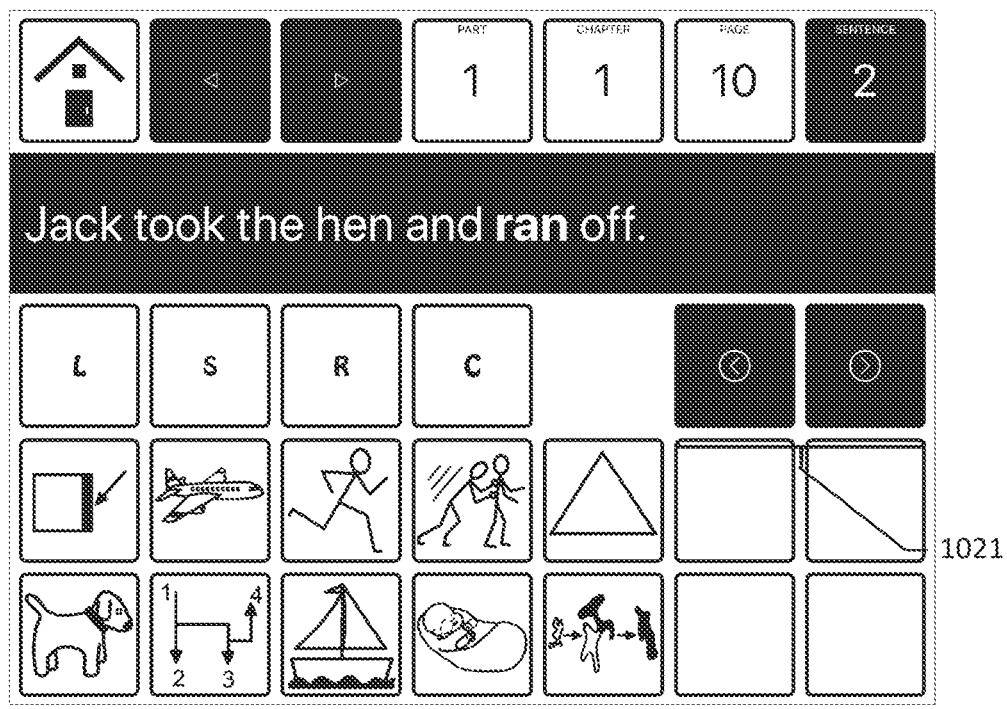
FIG. 10B is an example of a User Interface—Book Mode—Small Grid.

FIG. 10B provides a screenshot of an embodiment of the user interface in book mode using the small symbol grid. Most users will use the large grid array described above or a similarly configured medium grid. However, the larger button size on the small grid array may enable some users with vision impairments and/or physical disabilities to more effectively access the reading interface. It may also support students with sensory and/or cognitive impairments who find the content on the larger grid array too visually overwhelming. In the smaller grid there are some minor changes to the position of navigation controls such as the word navigation buttons now being placed below the sentence bar (1021). The main difference is that the text box does not appear in the smaller grid.

Figure 10C:
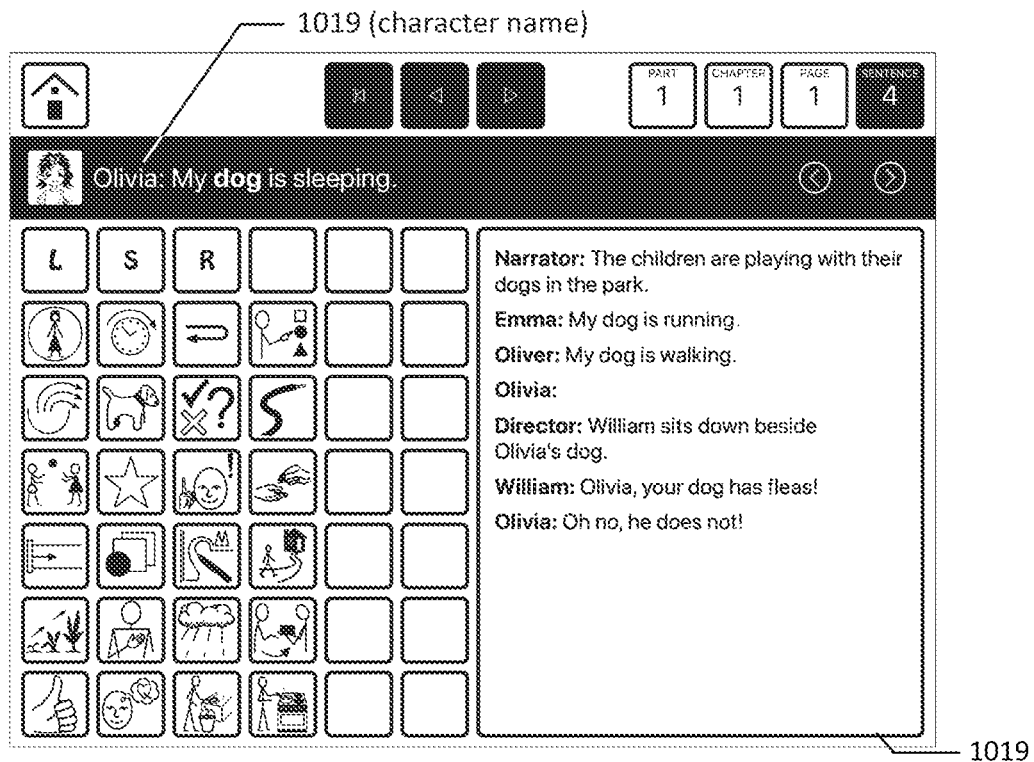
FIG. 10C is an example of a User Interface—Play Mode—Large Grid.
Figure 10D:
FIG. 10D is an example of a User Interface—Play Mode—Small Grid.

FIG. 10C displays a screenshot of an embodiment of the user interface in play mode using the large symbol grid. When reading plays the text box is useful for keeping track of the user's part and the parts of other characters in the play (1023). In the sentence bar the character name is displayed next to an image of the character, but it is not read aloud by the Reading Interface (1022). FIG. 10D displays a screenshot of an embodiment of the user interface for reading plays when the small symbol grid is being used. The smaller grid array has the same features as the larger grid for reading plays with the exception that it does not have the text box.

Symbol Layout

Each layer within a sheet contains all the symbol cells needed to fully populate the grid array. The sheets dynamically change on a word-by-word basis to display the sheet and layer containing the symbol representing the current word. The only difference in appearance for the base word symbols on different sheet layers is that the colour of the border of the symbols differs for the different word classes based on existing AAC colour coding conventions to assist with navigation of the AAC device. For example, the verb sheet layer symbols are represented by a green border, orange is used for the noun sheet layer, yellow is used for the pronoun and people sheet layer, blue is used for adverbs and adjectives and grey is used for the miscellaneous sheet layer.

When two or more words occupy the same cell on the same sheet on the same layer, one of the words is the default word for the sheet cell. The symbol for this word is displayed when the sheet layer contains the current word except when the current word is one of the words that shares the cell position. In these cases, assuming the words have a different symbol, the default symbol is temporarily dynamically replaced by the symbol for the word sharing the cell position while the word remains the current word.

Symbols which have popup symbols attached to them are displayed and function in an identical manner regardless of the word type. Each popup is displayed so that it is superimposed over the popup's base word and also occupies the two adjacent cells to the right of the base word. This allows a maximum of three words (including the base word) to be displayed in a row in a single popup. On some occasions, particularly for pronouns there may be an additional second row of popup words. Some words, particularly verbs have multiple popups linked to them to enable all the possible grammatical forms of the verb to be displayed.

Figure 11A:
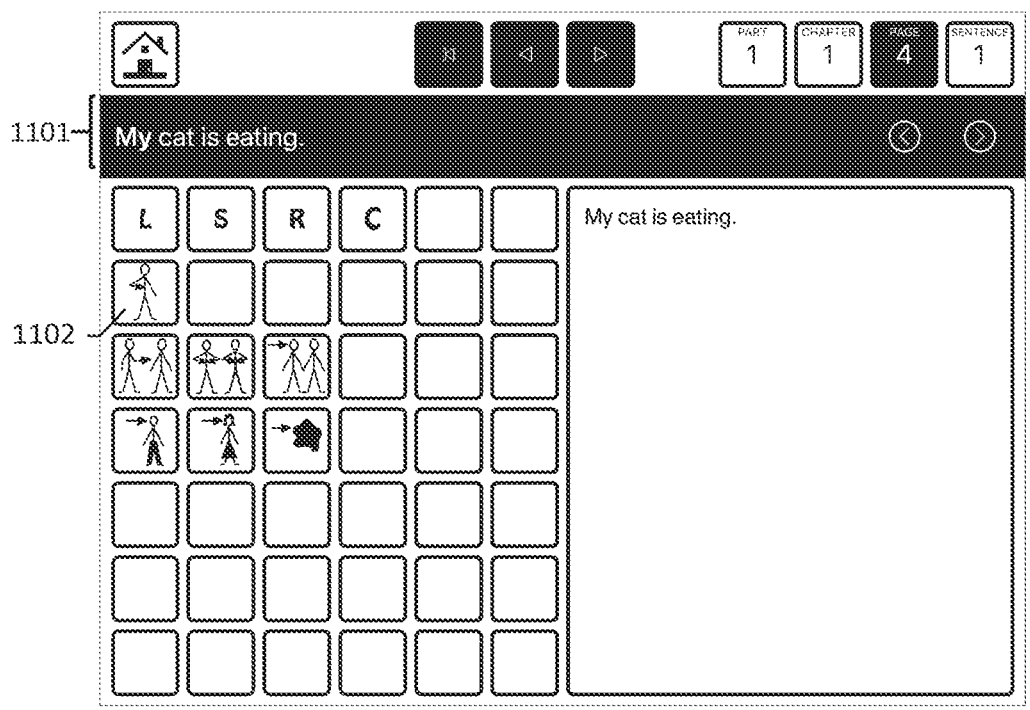
FIG. 11A is an example of a User Interface—Reading Interface—"My"—1$^{st}$ Press.
Figure 11B:
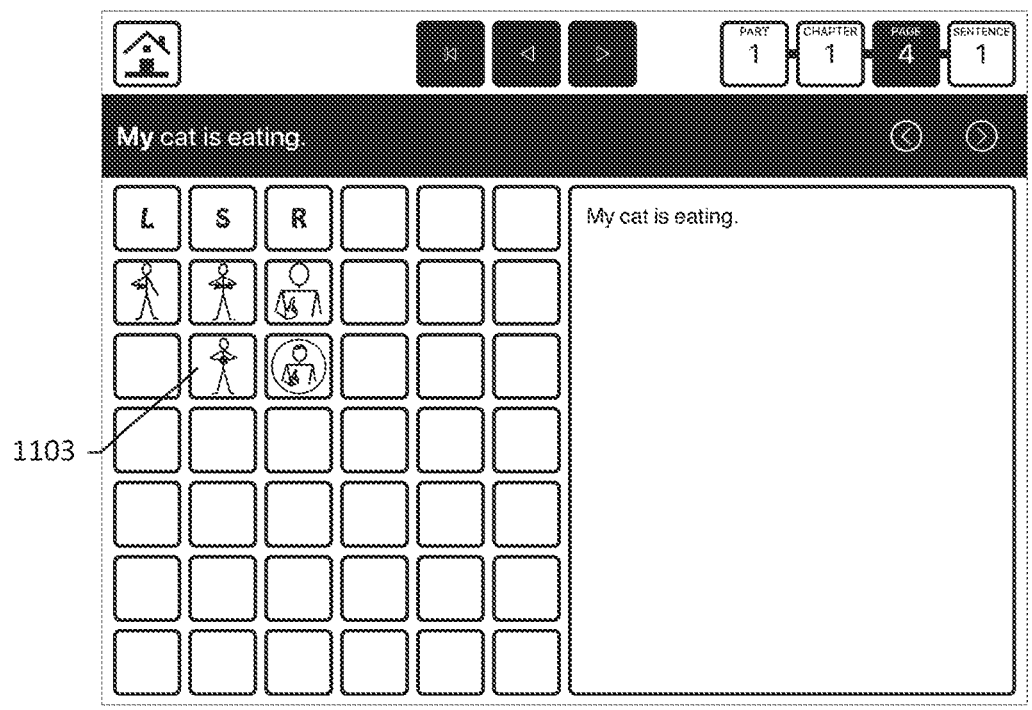
FIG. 11B is an example of a User Interface—Reading Interface—"My"—2$^{nd}$ Press.
Figure 11C:
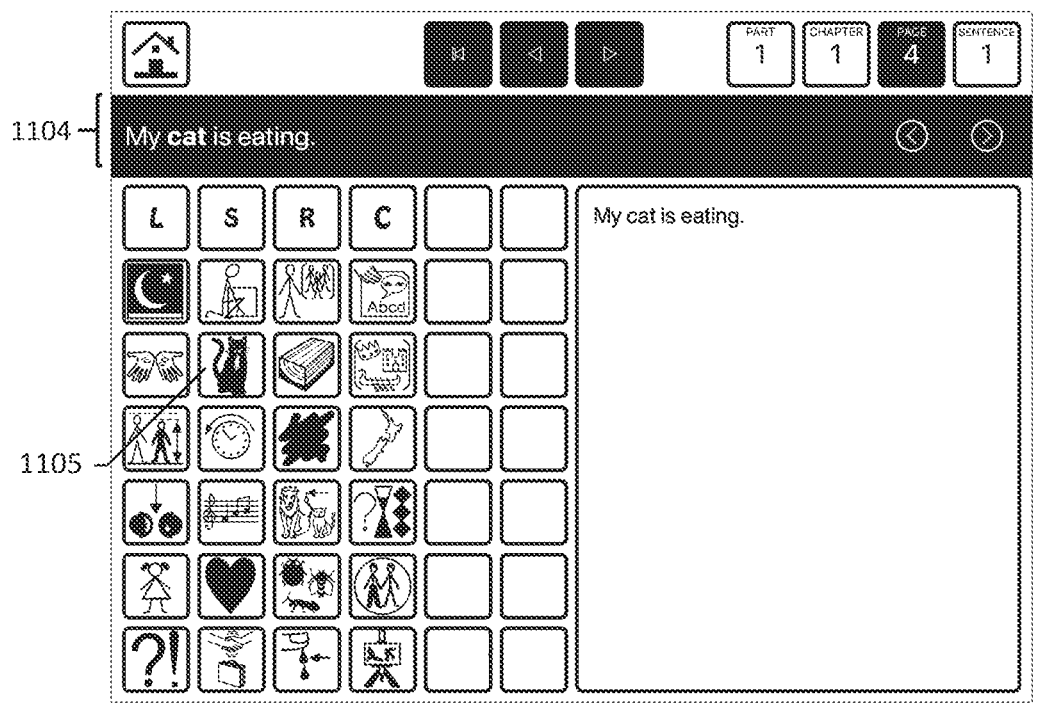
FIG. 11C is an example of a User Interface—Reading Interface—"dog;"
Figure 11D:
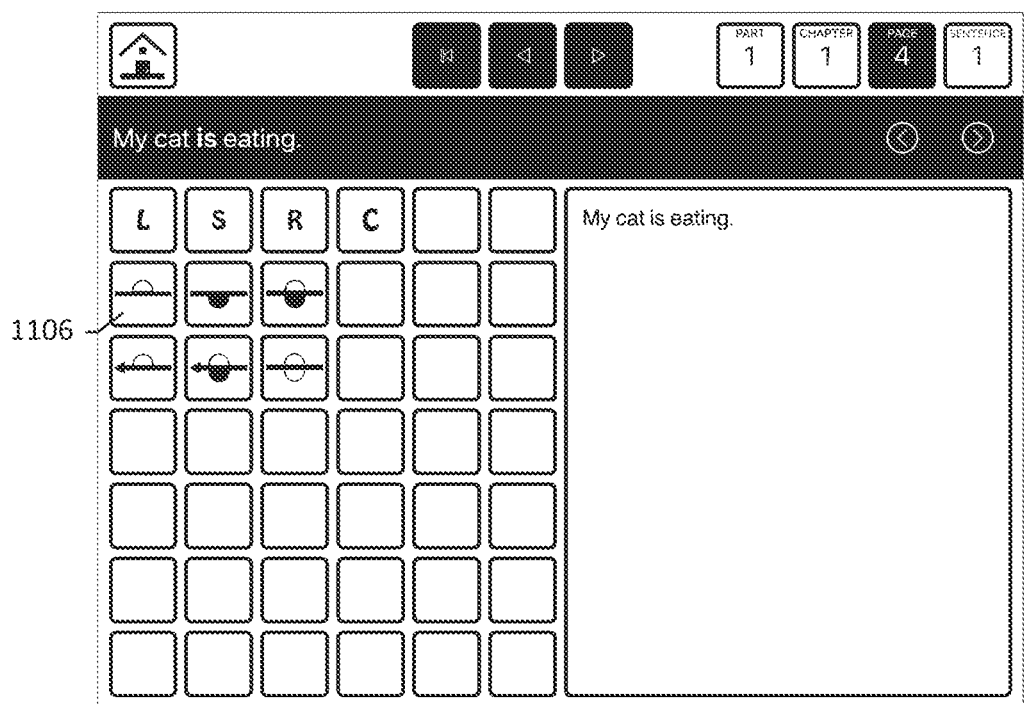
FIG. 11D is an example of a User Interface—Reading Interface—"is;"
Figure 11E:
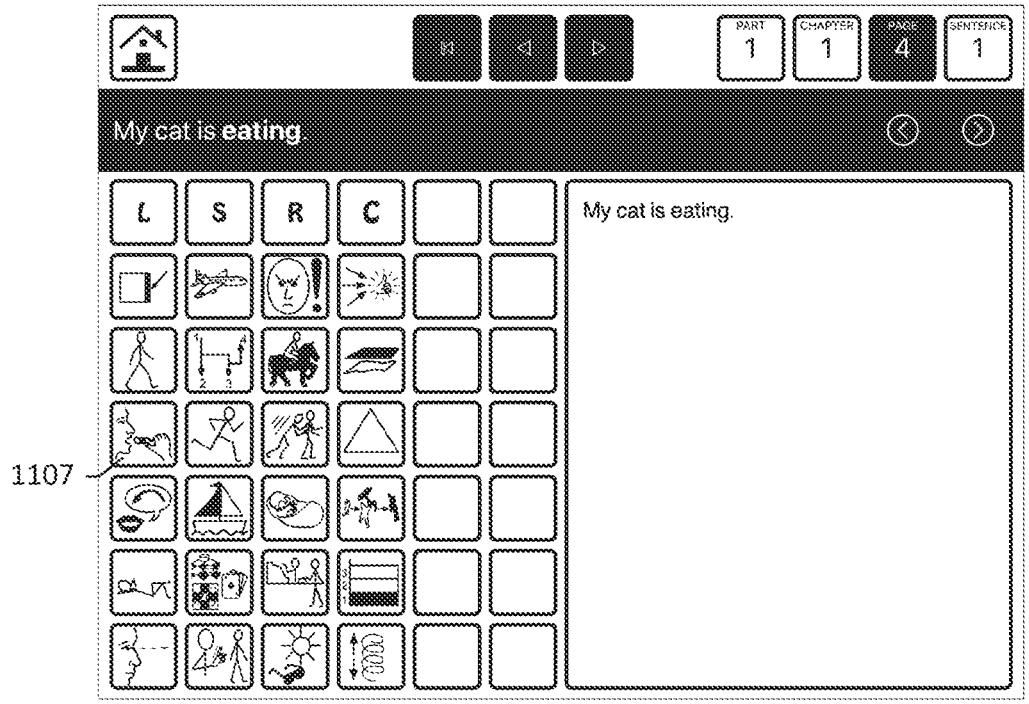
FIG. 11E is an example of a User Interface—Reading Interface—"eating"—1$^{st}$ Press.

FIG. 11A-11F describe the process of reading aloud a sentence using the reading interface to demonstrate how the symbol array changes on a word-by-word basis. FIG. 11A displays the sentence "My cat is eating" in the sentence bar (1101). The current word "My" is highlighted in the sentence bar and the grid array containing the base symbol for the current word "My" is displayed. The border of each symbol is yellow because the sheet layer containing the current word is for pronoun words. The word "My" is a popup word of the word "I", so it requires two button presses to access the word. The first button press involves the user pressing the button "I" (1102). The system then displays the popup for the word "I" that contains the word "My", which is shown in FIG. 11B. The symbol for "My" (1103) is then selected and the system produces an audio output for the word "My". FIG. 11C shows the reading interface set up for the user to read the word "cat". Note that the second word in the sentence cat is now highlighted in the sentence bar (1104) and the grid array has been populated with the sheet layer containing the symbol for the word cat. The border of the symbols on this sheet layer is orange as the sheet type is for words that are nouns. The word "cat" (1105) is a single button press so when the symbol is selected by the user it provides an audio output of the word "cat". The reading interface then dynamically reconfigures to display the grid array containing the word "is" and advances the highlighting in the sentence bar to the word "is" (FIG. 11D). The border of this sheet layer is green as the current word is a verb. The word "is" (1106) is a single button press so when the user selects the button it provides audio output of the word "is". FIG. 11E displays the grid array for the word "eating". The borders are green again because the sheet type is for verbs. Again, the reading interface has advanced the highlighting in the sentence bar to the current word eating. The word "eating" is a two button press word. The user must firstly select the base form of the verb "eat" (1107) and then the popup for eat is displayed in FIG. 11F. The user selects "eating" (1108) and the system audio outputs the word "eating".

Highlighting Symbol Groups

Figure 11F:
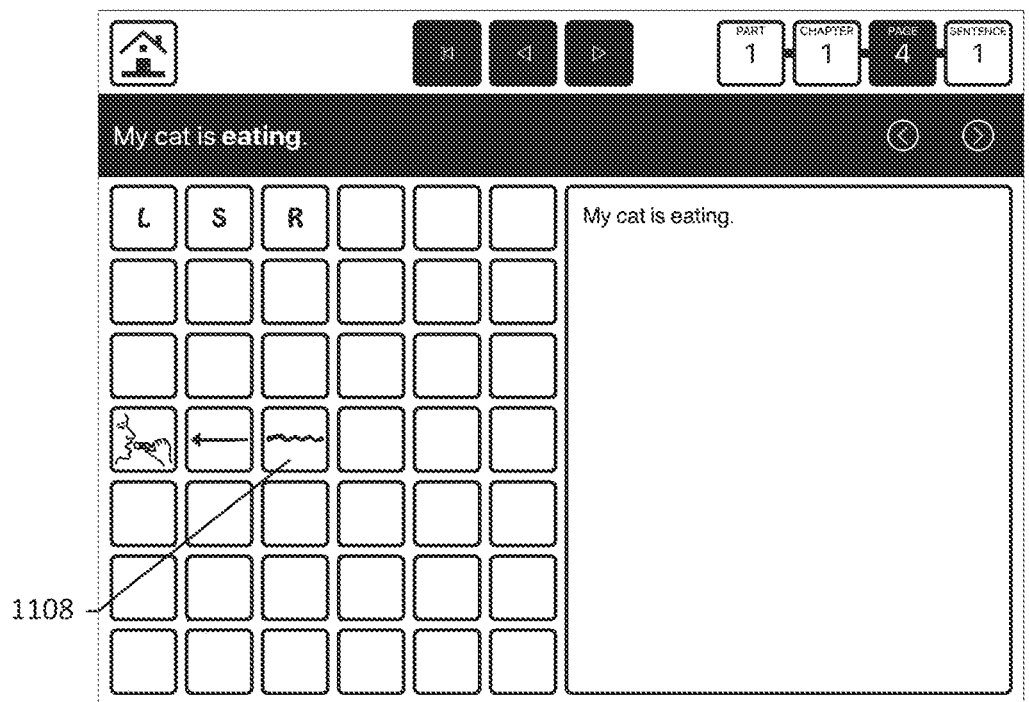
FIG. 11F is an example of a User Interface—Reading Interface—"eating"—2$^{nd}$ Press.
Figure 12A:
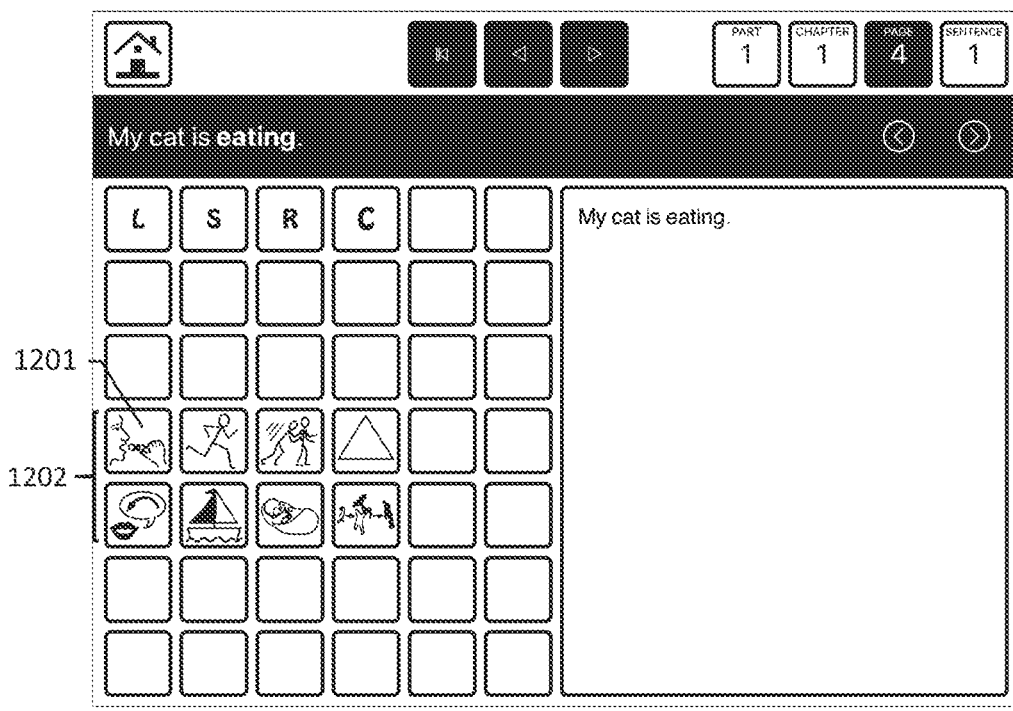
FIG. 12A is an example of a User Interface—Reading Interface—Full Highlight.
Figure 12B:
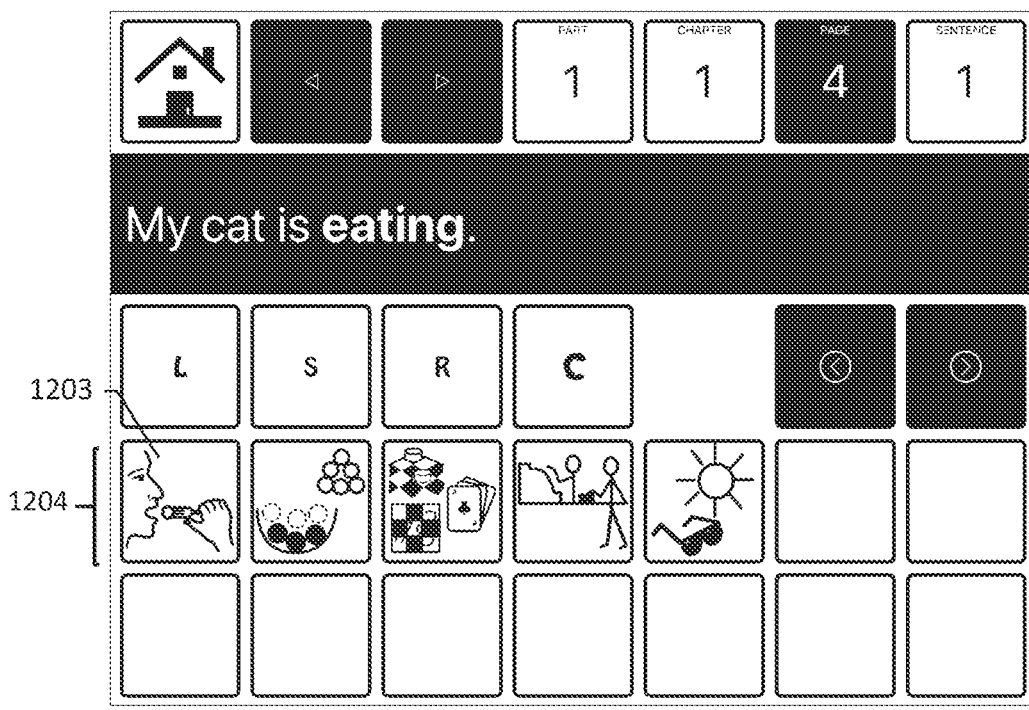
FIG. 12B is an example of a User Interface—Reading Interface—Part Highlight.

To reduce the learning load associated with the task of locating and selecting the correct symbol and to reduce the visual confusion of many symbols, the application offers several symbol display choices in Teacher settings. Two of these choices are shown in FIGS. 11E and 12A. FIG. 11E shows the symbol array with all the symbols highlighted. In this case the student's task is to find the base word symbol for the word "eating". "Eating" is a two button press word which requires the student to press the base word "eat" (1107) and then select "eating" in a popup (FIG. 11F, 1108). FIG. 12A shows the same task of finding the base word "eat" (1201) with a smaller group of symbols (1202) highlighted. The highlighting makes the task of locating the correct base word symbol much quicker and easier for the user and enables them to put their concentration into decoding words rather than locating words. FIG. 12B shows the same task of finding the base word "eat" (1203) with a smaller group of symbols (1204) highlighted in a smaller grid configuration.

Reading Interface System

Figure 13:
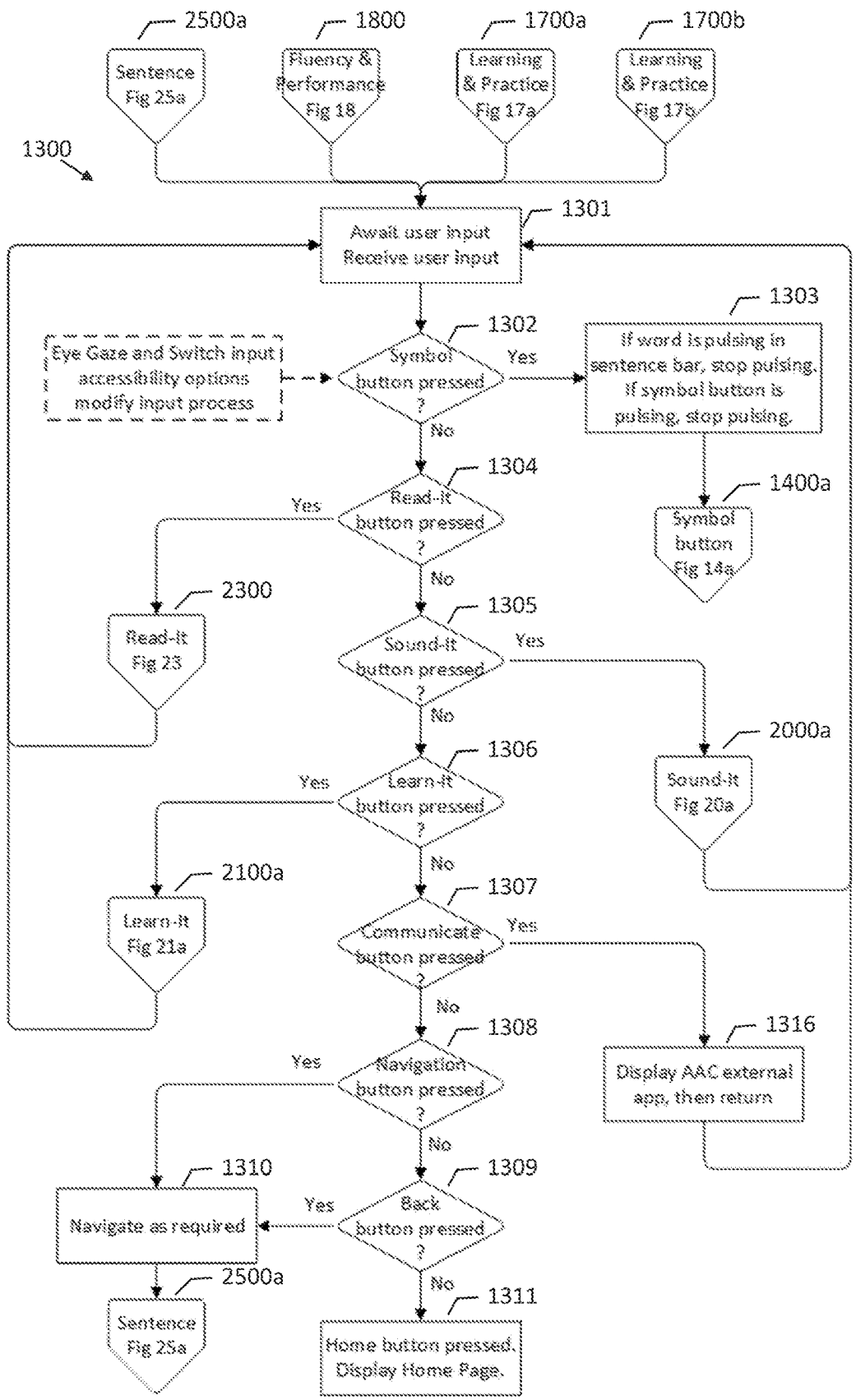
FIG. 13 is a flowchart representing an example of a reading process using the User Interface—Reading Interface.

FIG. 13 shows the system processes in the reading interface. Following configuration of the user interface, the system awaits and receives user input (1301) and then determines whether the input was a symbol button press (1302).

If the input was not a symbol selection (1302), the system determines whether the Read-It button is pressed (1304). If the Read-It button is pressed, the Read-It process is activated (2300). If the Sound-It button (1305) is pressed, the Sound-It process is activated (2000*a*). If the Learn-It button was pressed (1306), the Learn-It process is activated (2100*a*). The Read-It, Sound-It, and Learn-It processes are discussed in more detail in the sections below in FIGS. 23, 20A and 21A respectively. If the communicate button is pressed (1307), the system transfers the user to their regular AAC communication system (1316). When the user transfers back to the reading interface, the system awaits further input from the user (1301). If the navigation button was pressed (1308), the system navigates to the user selected text position in text (1310) and then activates the sentence process (2500*a*) to configure the sentence bar and symbol grid for the new section of text. The sentence process is outlined in greater detail in sections below. If the system determines the back button was pressed (1309), the system navigates to the user selected text position in text (1310) and then activates the sentence process (2500*a*) to configure the sentence bar and symbol grid for the new section of text. If the input from the user was a home button press (1311), the system displays the home page.

If the user selects a symbol button (1302), if the current word is pulsing in the sentence bar, the system stops the pulsing. If the symbol is pulsing, the system also stops the symbol from pulsing (1303). The system then activates the symbol button process (1400*a*). The symbol button process is outlined in greater detail in FIG. 14A. The system firstly determines whether Join-in, Pre-Reading or Read Along modes are enabled (1401). If they are enabled, the system begins the Pre-Reading Mode process (1600). This process is described in a later section below in FIG. 16.

If Pre-Reading/Read along mode are not enabled (1401), the system determines whether the correct symbol has been selected (1402). If the symbol selection was correct, the system begins the correct symbol process (1400*b*). This process is described in the later section below in FIG. 14B.

If the system determines that an incorrect symbol has been selected (1402), the system outputs an audio signal of the incorrect word (1403). There is then a teacher configured system pause to allow the user to self-correct an error (1404). When the pause time has elapsed, the system determines whether it has received any additional user input of a symbol (1405). If the user has selected an additional symbol, the system then determines whether the correct symbol has been selected (1406). If the correct symbol has been selected, the system starts the correct symbol process (1400*b*) which is outlined in greater detail in a later section in FIG. 14B.

If an incorrect symbol had been selected again by the user (1406), the system outputs an audio signal of the incorrect word (1407). If no additional symbol was selected (1405) or an additional incorrect symbol selection occurred (1405, 1406, 1407), the system then determines whether Testing Mode is enabled (1408). If Testing Mode is enabled (1408), the system starts the Testing Mode (1500). Testing Mode is discussed in greater detail in FIG. 15 a later section. If Testing Mode is not enabled (1408), the system determines whether Learning or Practice Mode is enabled (1409). If Learning or Practice mode is enabled, the system starts the Learning Mode process (1700*a*). The Learning Mode process is discussed in FIG. 17A in greater detail in a later section below. If Fluency Mode is enabled, the system starts the Fluency Mode process (1800). This process is discussed in FIG. 18 in greater detail in a later section below.

Correct Symbol Process

Figure 14A:
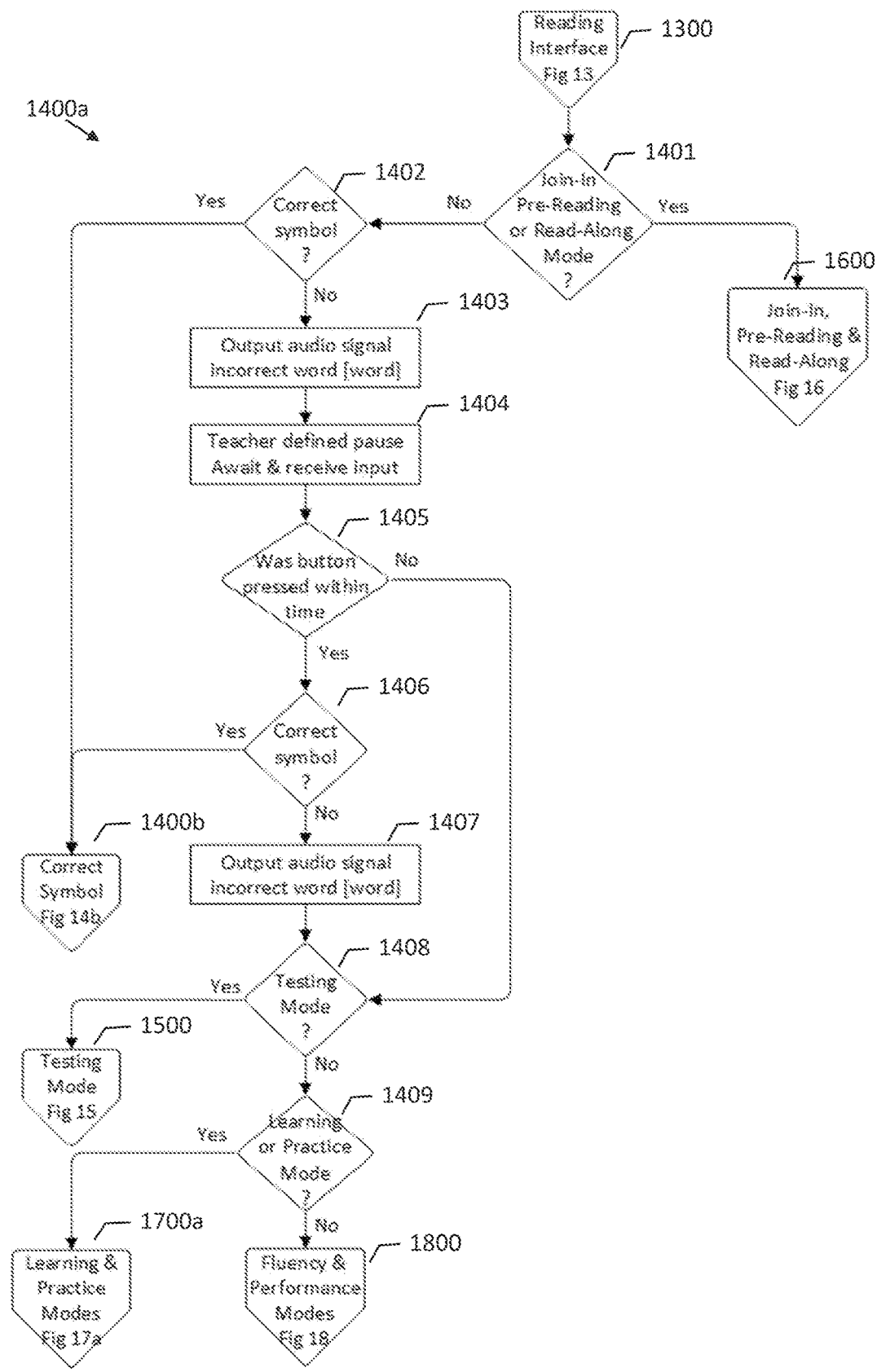
FIG. 14A is a flowchart representing an example of a symbol button press process.
Figure 14B:
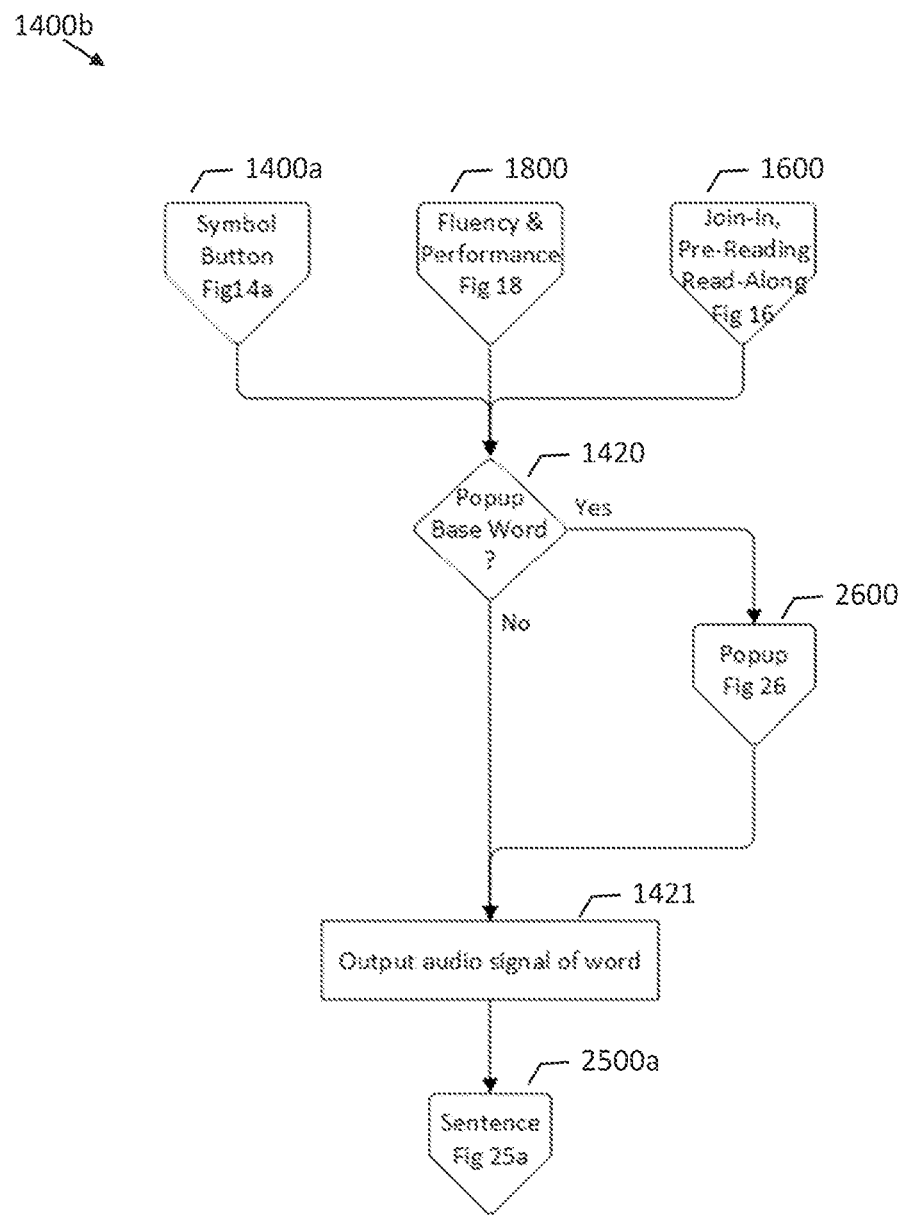
FIG. 14B is a flowchart representing an example of a Correct Symbol Button Process.
Figure 16:
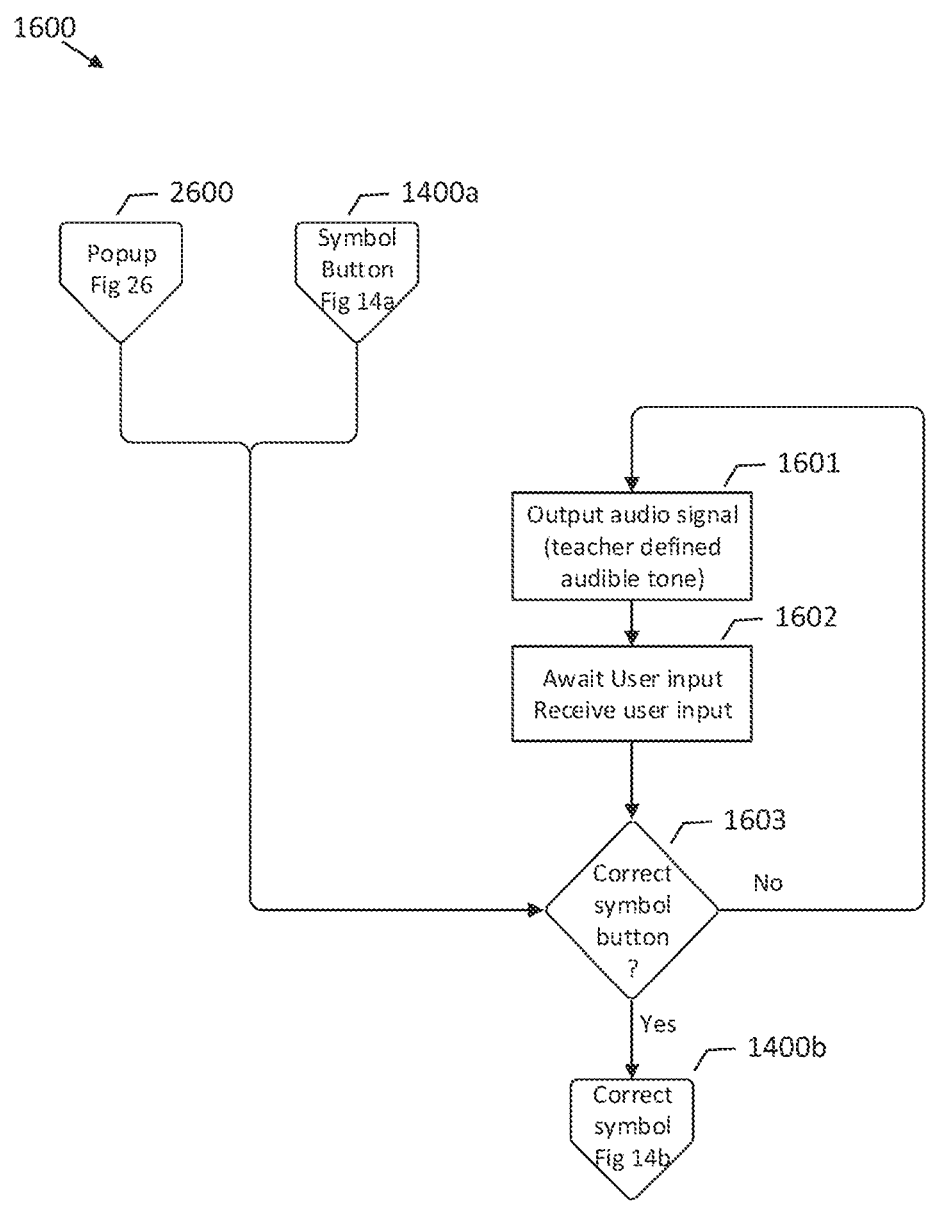
FIG. 16 is a flowchart representing an example of a process for a Join-In, Pre-Reading & Read-Along Modes.
Figure 18:
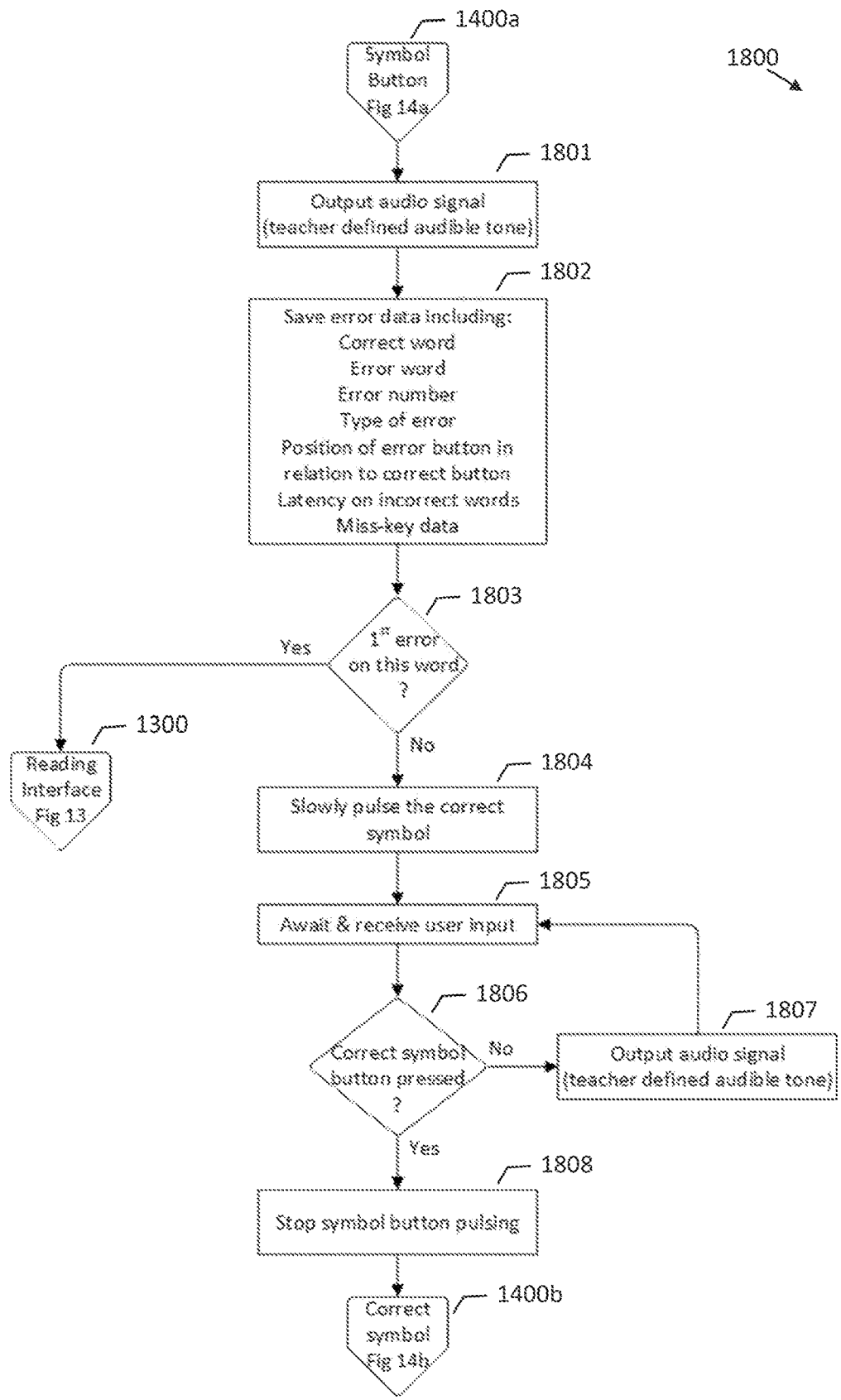
FIG. 18 is a flowchart representing an example of a process for Fluency & Performance Modes.

FIG. 14B describes the process that occurs when the correct symbol is selected by the user. Following correct symbol selection (FIG. 14A, 1402/1406; FIG. 18, 1806; FIG. 16, 1603), the system determines whether the current word is a popup base word (1420). If the word is not a popup base word, the system outputs an audio signal of the word (1421) and then activates the sentence process to configure the sentence bar and symbol grid for the next word in the text (2500*a*). This process is discussed in FIG. 25A in greater detail in a later section below.

If the word is a popup base word (1420), the system activates the popup process (2600) to enable the user to make the second symbol selection for the current word. The popup process is described in more detail in FIG. 26 a later section below. Once the user successfully selects the popup symbol(s), the system returns to the Correct Symbol Process and outputs an audio signal of the word (2621). The system then activates the sentence process (2500*a*) to configure the sentence bar and symbol grid for the next word in the text (See FIG. 25A).

Testing Mode

Figure 15:
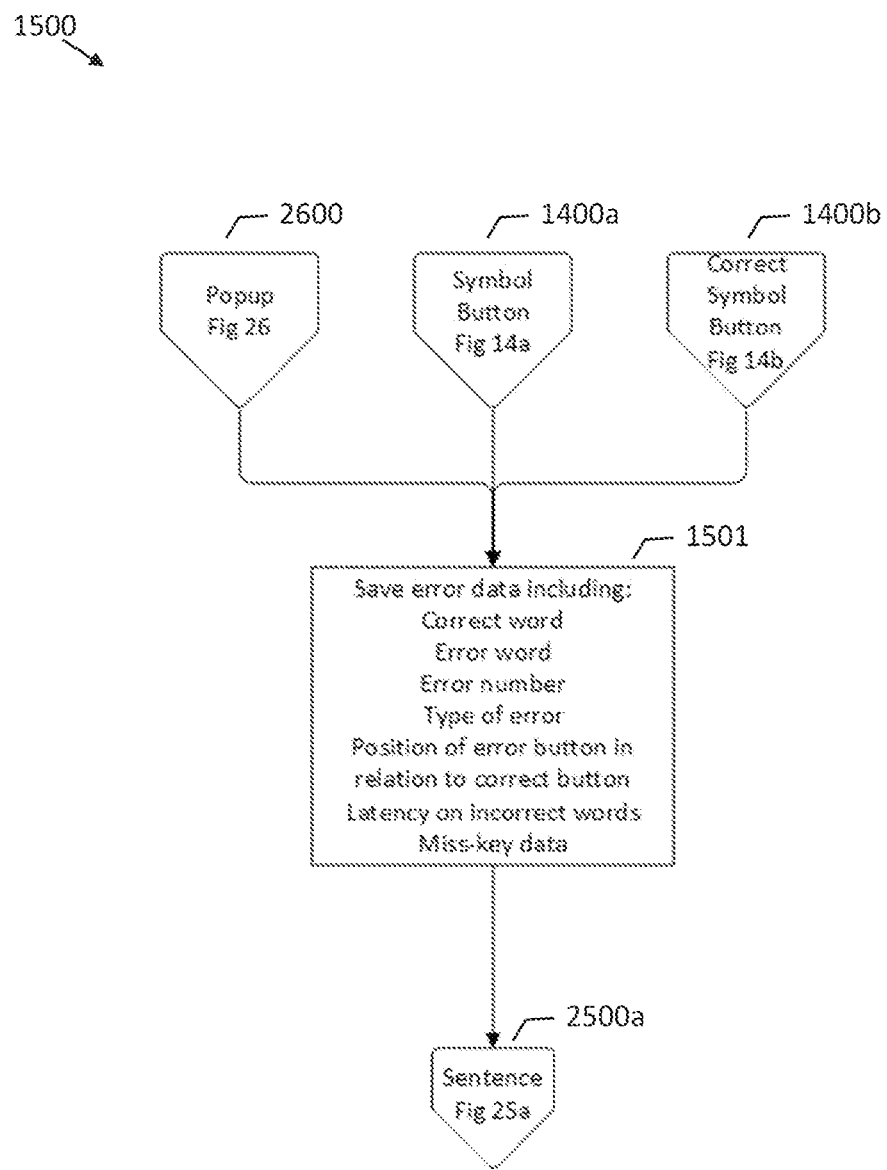
FIG. 15 is a flowchart representing an example of a process for a Testing Mode.
Figure 25A:
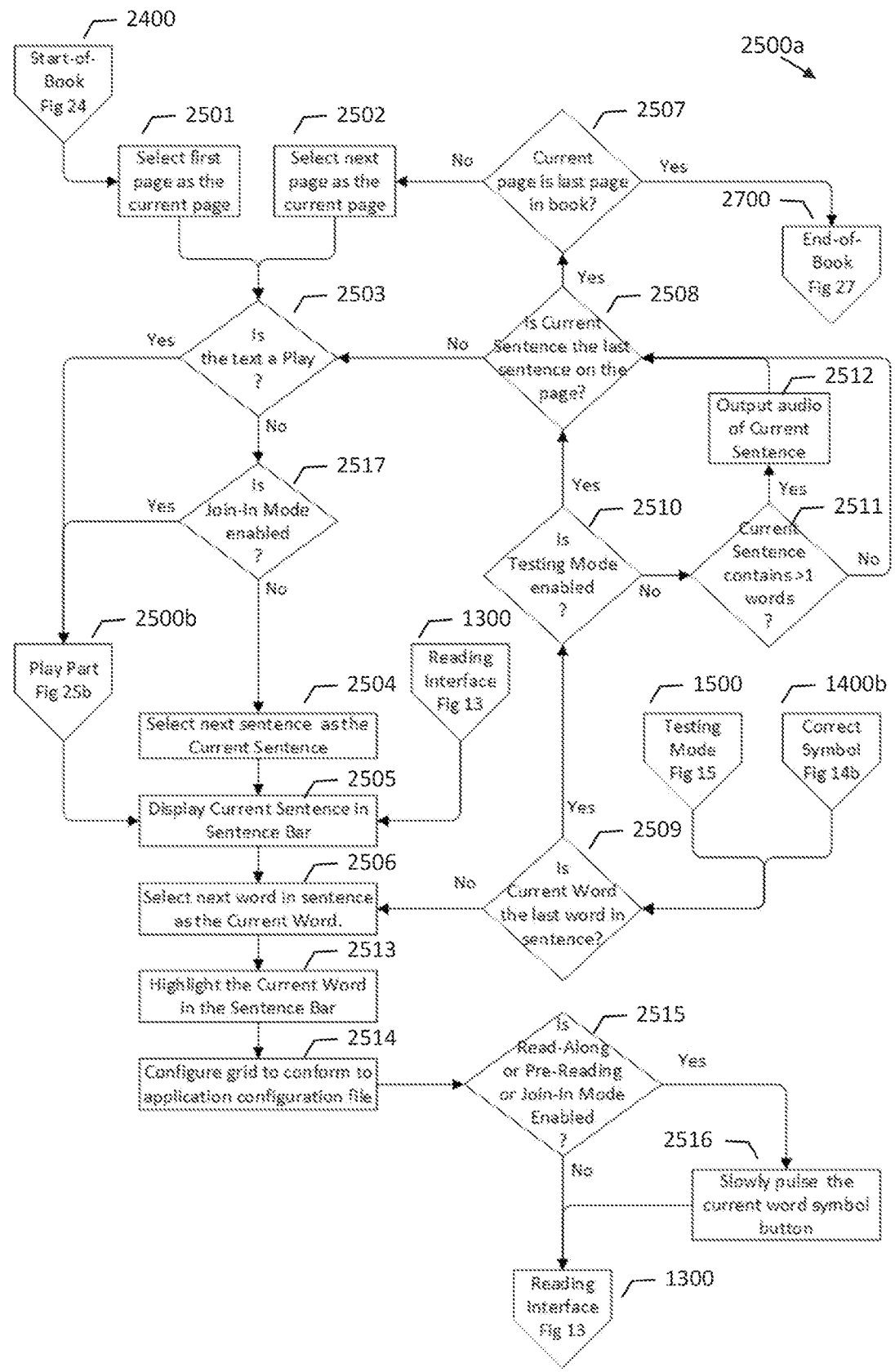
FIG. 25A is a flowchart representing an example of a Sentence Process.
Figure 25B:
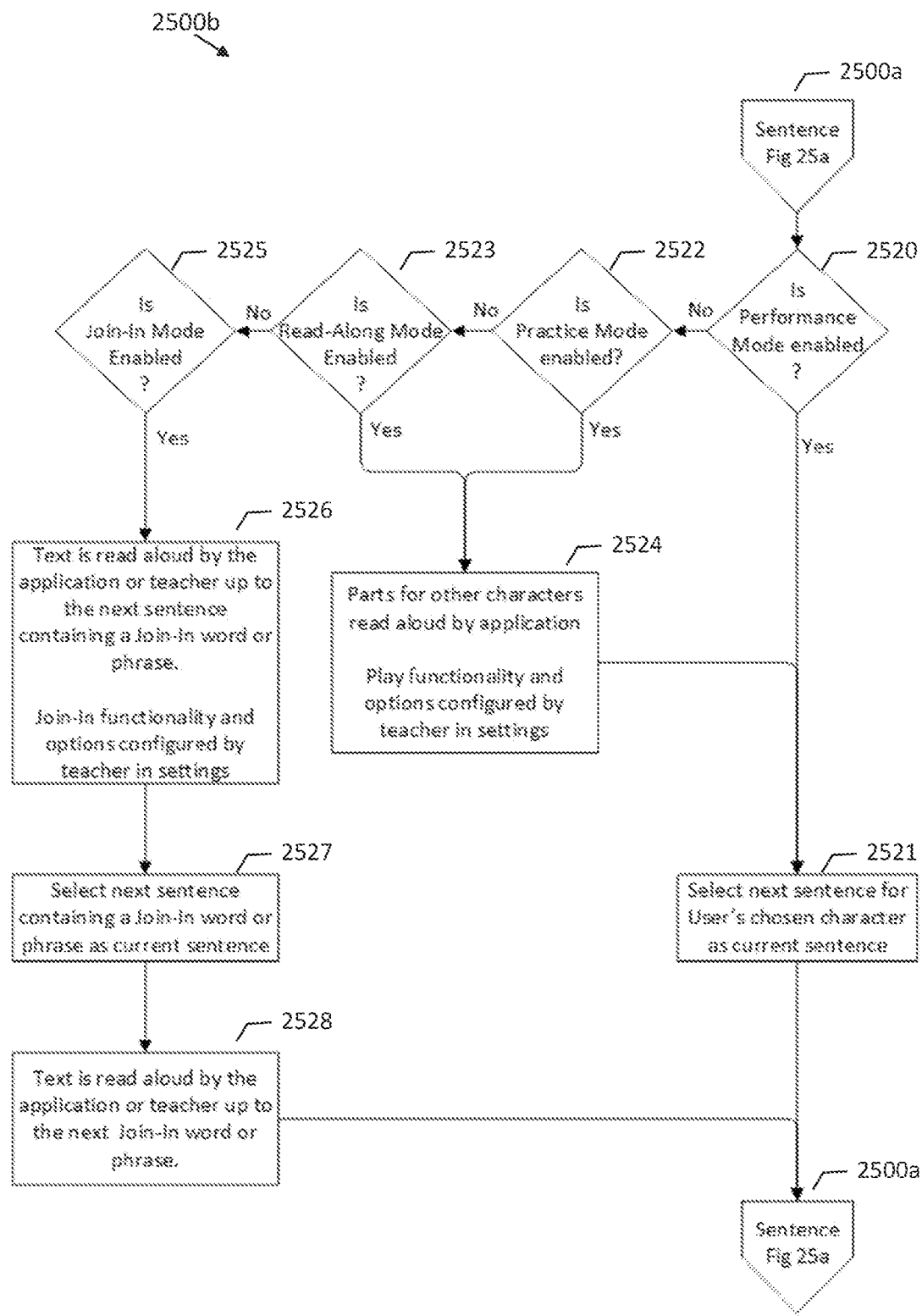
FIG. 25B is a flowchart representing an example of a Sentence Process—Play Part & Join-In Mode.

Testing mode provides an opportunity for teachers to assess student reading progress using text passages. These passages may also be used to assign an appropriate levelled book reading level for independent (usually an easier level for student reading text on own) and instructional reading (a harder level that challenges the student's abilities but requires greater support from an instructor). FIG. 15 displays the reading process from Testing Mode following a symbol selection from a user. In Testing Mode, there is no differentiated response to a correct or incorrect word as the aim is not to give corrective feedback to the user during testing. Following each symbol selection and the audio output of the current word, the system saves error data (1501) and then activates the sentence process to configure the sentence bar for the next word in the text (FIG. 25A).

Join-In, Pre-Reading or Read-Along Mode

When Join-In, Pre-Reading or the Read-Along reading modes are enabled, they provide opportunities for students who currently are not able to decode text to participate in reading aloud activities in an errorless learning experience. This may include younger users who have not yet commenced formal literacy instruction or older users who have not yet mastered decoding. Join-In mode provides the option for the user to complete one word or a repetitive phrase within the book whilst either the system or another person reads aloud the remainder of the book. This mode is only available when reading books. Pre-Reading and Read Along modes allow the user to use errorless learning to read the entire book or their play part within a play. The only difference between Pre-Reading Mode and Read-Along mode is that Pre-Reading mode is used when reading books and Read-Along mode is used for reading plays. The reading processes in all three modes are the same.

When Join-In, Pre-Reading or Read-Along mode has been enabled, the system is configured for errorless learning by pulsing the current symbol that needs to be selected within the symbol group and then pulsing the next required symbol within the symbol group and so forth. When this mode is enabled, the Sound-It, Learn-It and Read-It buttons are disabled, as the target symbol is already being highlighted for the student.

FIG. 16 displays the system process for Join-In, Pre-Reading or Read-Along Modes following selection of a symbol button by the user in the reading interface (for more detail see FIG. 14A). Following selection of a symbol by the user the system then determines whether the user selected the correct symbol (1603). If the correct symbol was selected, the system activates the Correct Symbol Process (1400*b*) described above in FIG. 14B.

If the system determines that there is an error in symbol selection (1603), the system outputs an audible tone to signal an error (1601). The system then awaits input from the user and receives the input of a symbol selection (1602) and determines whether the correct selection has been made (1603). If the correct symbol was selected, the system activates the correct symbol process (1400*b*) as described above in FIG. 14B.

Learning/Practice Mode

When Learning or Practice Mode is enabled, the user is provided with error correction feedback and then given the opportunity to use the embedded learning support provided by the Learn-It, Sound-It and Read-It processes to assist in decoding the current word. There is also the opportunity for the student to try another symbol selection is they have accidently selected the wrong button. Learning and Practice Modes are identical, with the only difference being that Learning Mode is activated for books and Practice Mode is activated for plays. The type of support available to the user is modified by both the number of previous errors the user has made on the current word and by the learning strategies that the student has previously employed. There is a balance between giving students the flexibility to try a range of learning options and not losing sight of the need to read at an acceptable speed.

Figure 17A:
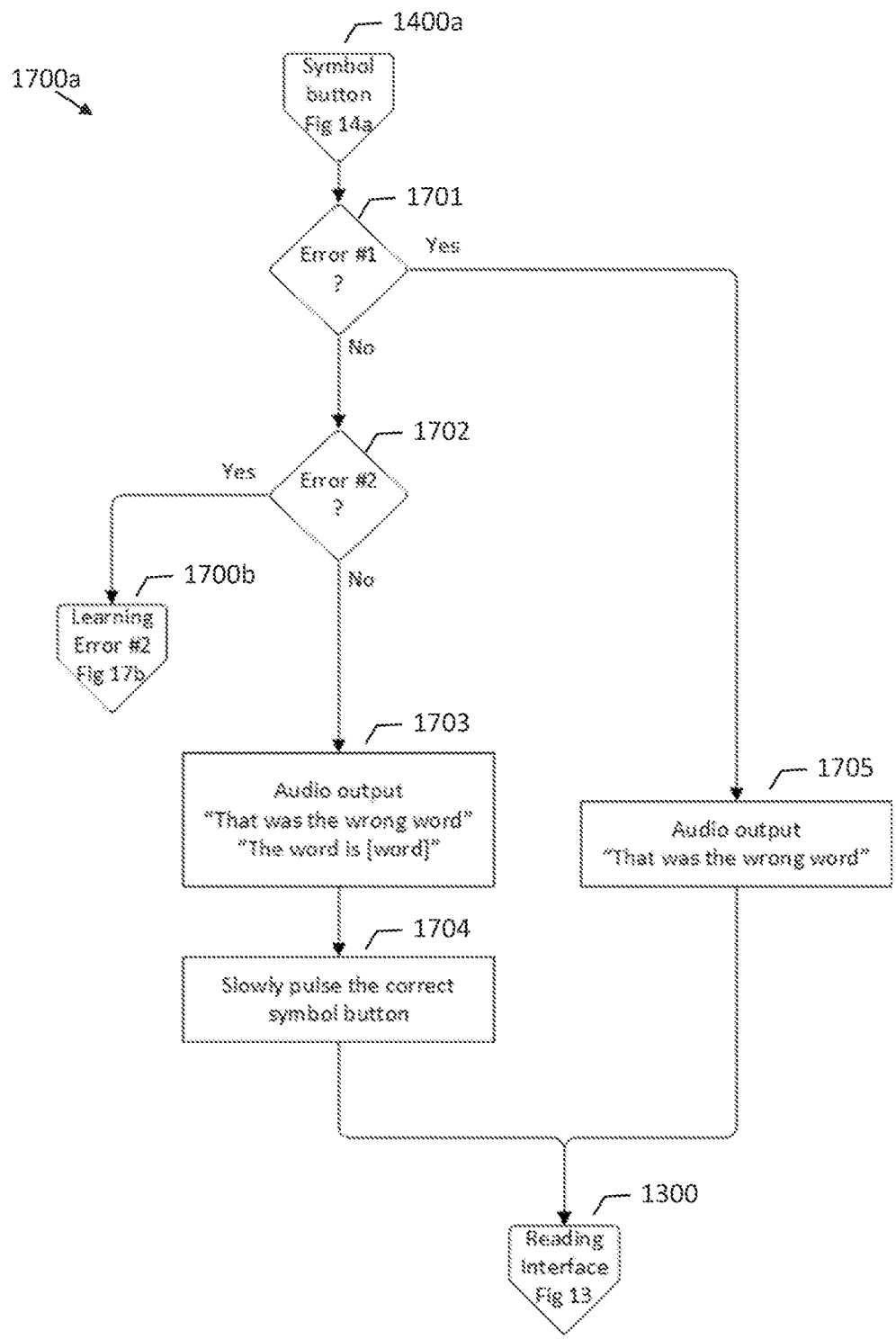
FIG. 17A is a flowchart representing an example of a process for a Learning & Practice Modes.

FIG. 17A describes the Learning and Practice Mode reading processes. When the user has made an incorrect symbol selection and Learning or Practice Mode is enabled (for more detail see FIGS. 13 & 14A), the system starts the learning and practice mode process (FIG. 17A). The system firstly saves error data such as the correct word, the error word, the number of errors in the current word, the type of error and latency measures relating to symbol selection. The system then determines whether the current error is the first error on the current word (1701). If it is the first error, the system provides an audio signal informing the user that they have selected the incorrect word (1705). The system then returns to the main reading interface (FIG. 13, 1300) and awaits further input by the user.

Figure 17B:
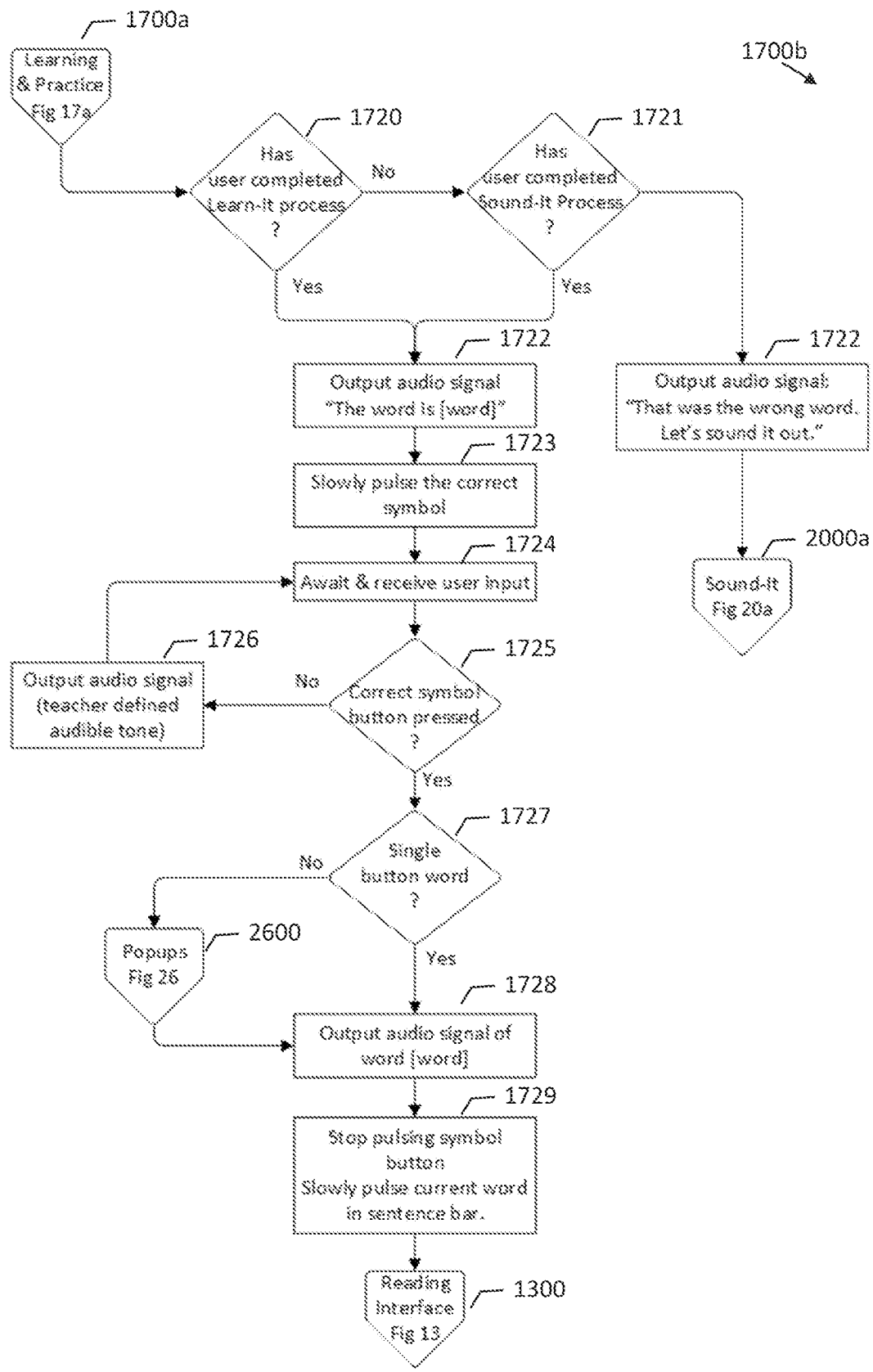
FIG. 17B is a flowchart representing an example of a process for Learning & Practice Modes 2$^{nd}$ Error.

Returning to FIG. 17A, if the user has made a second error on the current word (1702), the system activates the learning error number two process (1700*b*) described in FIG. 17B. The system determines whether the user has previously completed the Learn-It process (1720) or the Sound-it process (1721) for this word. If the user has completed one or both of these processes, the system then outputs an audio signal stating the correct word (1722). The correct symbol is then pulsed in the grid (1723). The system then awaits and receives input from the user (1724), and then the system determines whether the user selected the correct word (1725). If the user did not select the correct symbol, the system outputs an audio signal of an error tone (1726), awaits and receives input from the user (1724) and then determines whether the selected symbol was the correct symbol button (1725). If the correct symbol was selected, the system determines whether the word is a single button word (1727). If the word is a single button word, the system outputs an audio signal of the word (1728). For popup words, the popup process (2600) described in more detail later in FIG. 26, displays the popup and if required provides corrective feedback based on the user's symbol selection. Once the student has selected the correct popup symbol, the process returns to FIG. 17B and the system then outputs an audio signal of the word (1728). For all word types the system then removes pulsing of the symbol button and slowly pulses the current word within the sentence bar to indicate to the user that another independent attempt at symbol selection is required (1729). The system then returns to the reading interface (1300) for the student to make an independent selection of the current word (FIG. 13). Depending on the user input the correct word or error processes will then be activated.

Returning to FIG. 17B, if the user has made a second error on the current word and has not completed the Learn-It or Sound-It process (1720, 1721), the system outputs an audio signal to the user that indicates that they have selected the wrong word and need to sound it out (1722). The system then activates the Sound-it process (2000*a*). This process is described in a following section in FIG. 20A.

Returning to FIG. 17A, if this is the user's third error on the current word, the system outputs an audio signal stating that the user has selected an incorrect word and then outputs the current word (1703). The system then pulses the correct symbol button (1704) and then returns to the reading interface (FIG. 13) to await user input of selecting the highlighted symbol. If the word is a popup base word, the popup will be displayed for selection during the correct symbol process (FIG. 14B).

Fluency/Performance Mode

Fluency Mode and Performance Mode offer an express error correction process that has been specifically designed to maximise the user's reading fluency in tasks such as reading aloud a book (Fluency Mode) or play (Performance Mode) and to avoid excessively intruding into the student's reading process. Both modes are identical except that Fluency Mode works with books and Performance Mode works with plays. In addition to being faster, the error correction process is also more subtle, often consisting of the use of audible tones to signal errors and on-screen pulsing of correct symbols to facilitate fast error correction.

If the student has selected an incorrect symbol in the reading interface and Fluency or Performance Mode is enabled, the Fluency or Performance Mode process starts (FIG. 18). The system outputs an audio tone to alert the user to an error (1801) and saves the error data (1802). The system then determines whether this is the first error in the current word (1803). If it is the user's first error on the current word, the system returns to the reading interface (1300) to give the user another attempt at reading the current word (FIG. 13). If this is the user's second error on the word, the system slowly pulses the correct symbol (1804) and awaits and receives user input (1805). The system then determines whether the user selected the correct button (1806). If the user did not select the correct button, the system outputs and audio signal of an error tone (1807) and then awaits and receives user input (1805). When the user selects the correct button (1806), the system stops the symbol from pulsing and commences the previously described correct symbol button process (1400*b*) in FIG. 14B.

Sound-It & Learn-It

The Sound-It and Learn-It processes assist students to read unfamiliar words in the text. If the student does not instantly recognise the current word in the text, the student can use the Sound-It process to sound out the individual sounds in the word to assist them to decode the word. If the student is able to decode the word but does not know the symbol that represents the word, the Learn-It process can assist them with matching the word to its corresponding symbol. When the Sound-It process is activated, the Sound-It and Learn-It processes are combined so that the user first sounds out the word and then learns the location of the symbol representing the word within the AAC Reading System.

There are different sounding out options depending on the selected teacher settings. There are two main options to select: the traditional approach and the non-traditional approach. The traditional approach divides words into regular and irregular words depending on whether the letter to sound correspondences in the word are common patterns (regular) or uncommon patterns (irregular). In this approach regular words are sounded out and irregular words are considered non-decodable words and are spelt out instead. In contrast, in the non-traditional approach all forms of the letter to sound correspondences are taught regardless of how infrequently they occur. In this approach there are no irregular words and all words are sounded out. There are two additional options available to teachers when the system is sounding out multisyllabic words. In settings the teacher can elect for all the sounds in each syllable to be sounded out individually (e.g. t-a-b-le) or for each syllable to be pronounced as a single sound unit (e.g. ta-ble).

Figure 19A:
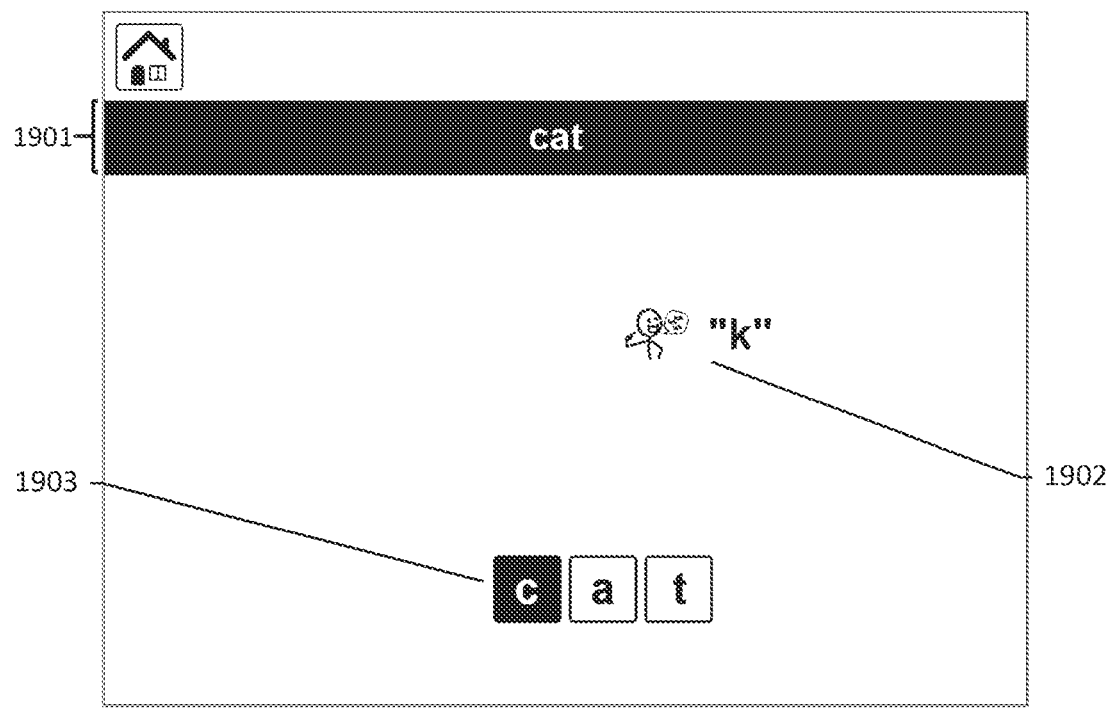
FIG. 19A is an example of a screen display for step one of a sounding out process for an embodiment of the system, User Interface—Sound It #1.
Figure 19B:
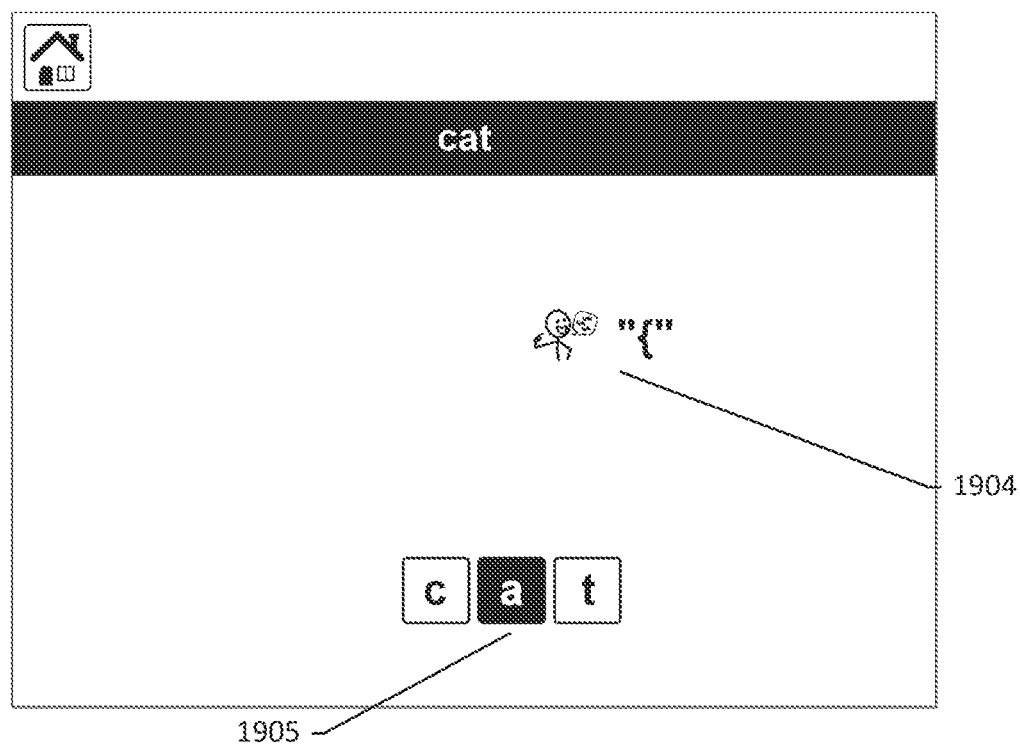
FIG. 19B is an example of a screen display for step two of a sounding out process for an embodiment of the system, User Interface—Sound It #2.
Figure 19C:
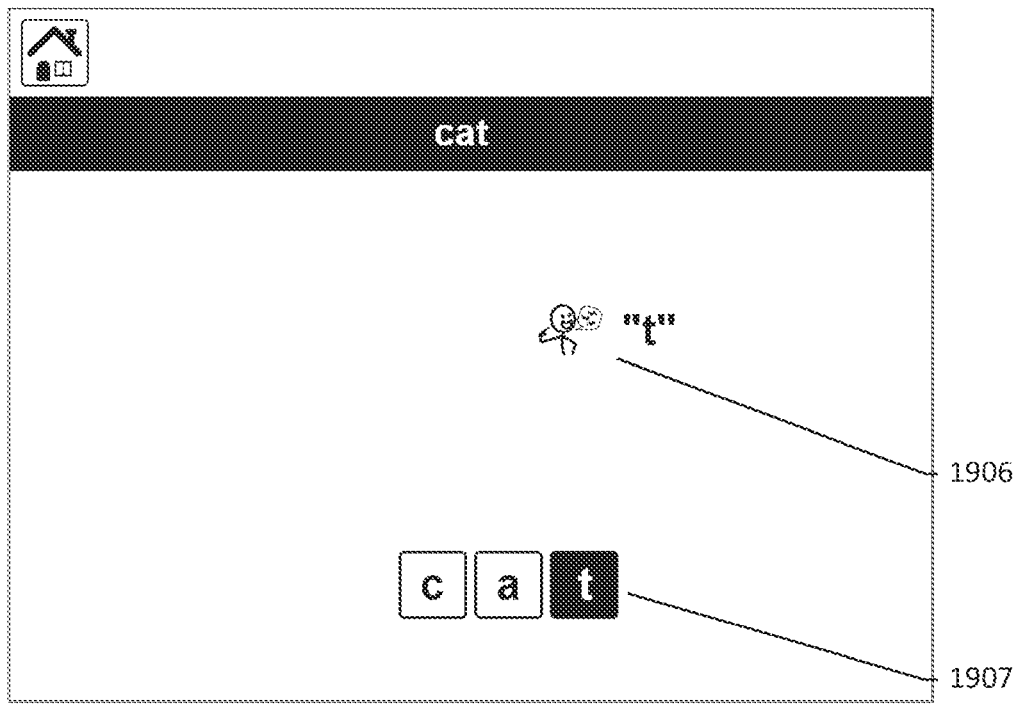
FIG. 19C is an example of a screen display for step three of a sounding out process for an embodiment of the system, User Interface—Sound It #3.
Figure 19D:
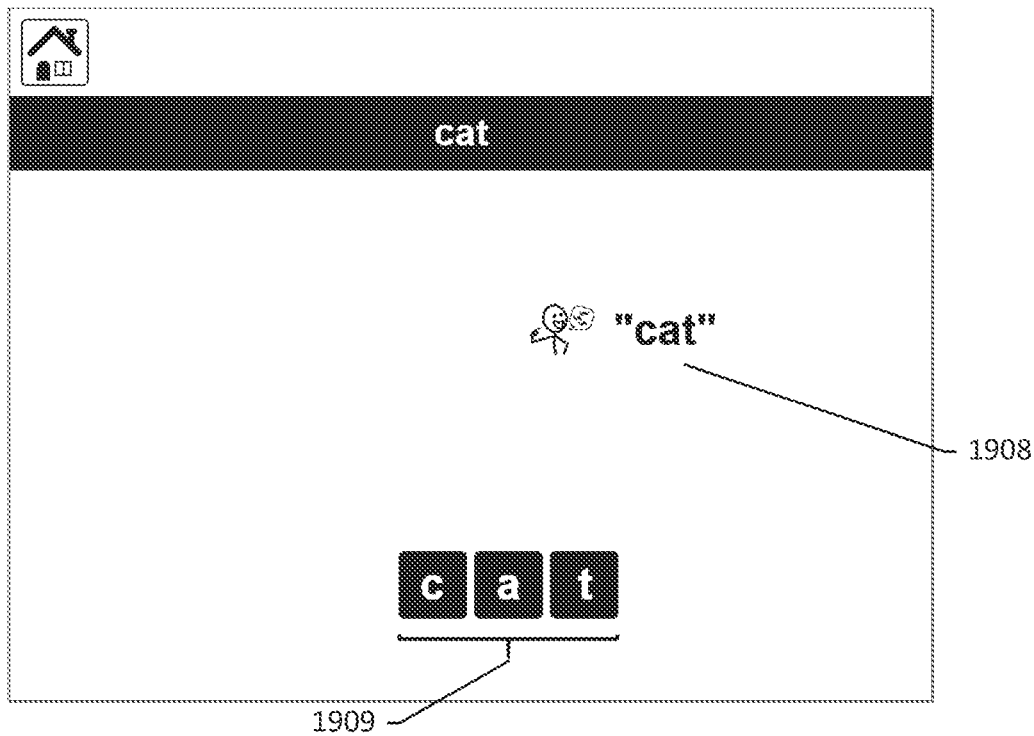
FIG. 19D is an example of a screen display for step four of a sounding out process for an embodiment of the system, User Interface—Sound It #4.

FIGS. 19A-19F show screenshots of the key stages in the Sound-It and Learn-It process in use with the word 'cat' when the large grid size of the Reading Interface is used. FIG. 19A shows the first stage in the process. If the user encounters a word that they need to sound out, they press the Sound-It button and the system starts the Sound-It process. A Sound-It screen covers the entire reading interface and the current word is displayed in the sentence bar (1901). The graphemes in the word are also displayed and the first grapheme(s) in the word is highlighted (1903). The system then audio outputs the first phoneme associated with the grapheme "c" using the phonetic tag "k" (1902). FIG. 19B displays the system sounding out the phoneme associated with the next grapheme in the word "a" (1905) using the phonetic tag "{" (1904). Note the importance here of programming each individual sound using a phonetic tag as both the consonant "c" and the vowel "a" have several possible pronunciations. FIG. 19C displays the system sounding out the phoneme associated with the next grapheme in the word "t" (1907) using the phonetic tag "t" (1906). FIG. 19D displays the whole word being articulated after each of the individual sounds have been sounded out individually. All the graphemes are highlighted (1909) and the word is said slowly with very slight pauses between the sounds "c-a-t" (1908) to try and emulate the process of blending the sounds together that occurs when students are able to use their natural speech.

The next steps that occur represent the starting point for the Learn-It process that involves matching the symbol to the word. Note though that in the case of Learn-It being activated as part of the Sound-It process the word is not said at normal speed prior to the user selecting a symbol as blending the sounds together to determine the word they form is an important learning task when sounding out words.

Figure 19E:
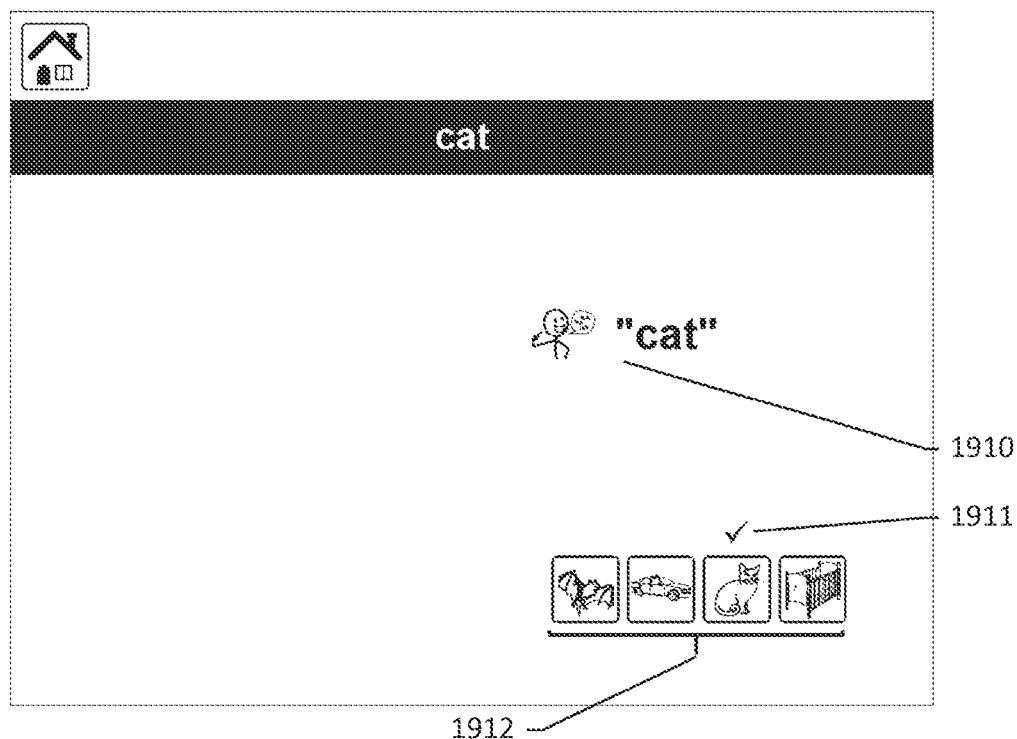
FIG. 19E is an example of a screen display for an example of a learning process for an embodiment of the system, User Interface—Learn It #1.
Figure 19F:
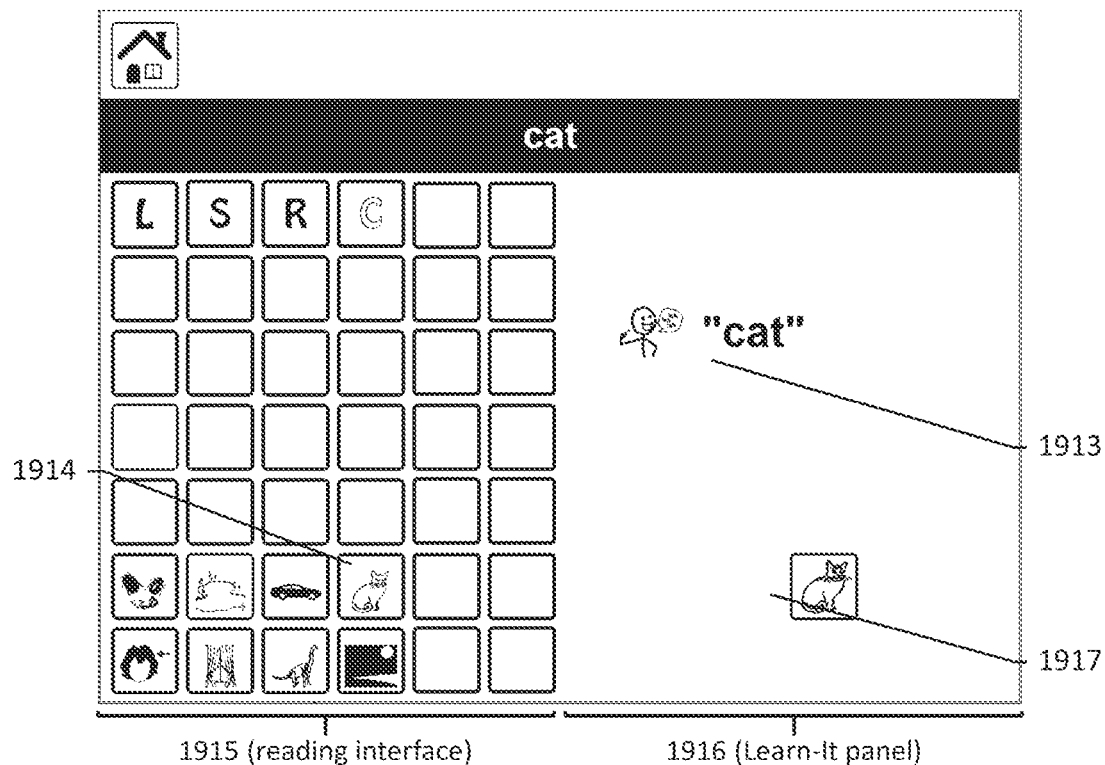
FIG. 19F is an example of a screen display for a learning process for an embodiment of the system, User Interface—Learn It #2.

The process continues in FIG. 19E. If there are foils (similar word choices) available for the word, the system randomly displays four word choices for the user to select from (1912). The choices consist of the current word (cat) and three phonemically similar foils that differ from the current word by one phoneme (bat, cot, cab). The system then awaits input from the user. Assuming the user has selected the correct symbol, the system places a tick above the cat symbol (1911) and says the word "cat" at normal speed (1910). Error processes are not depicted here but are described below in the systems processes in Learn-It FIGS. 21A-D.

There is then a brief pause and then the symbols and the tick disappear, and the Learn-It Panel shrinks to only cover the right side of the screen (1916) and display the single cat symbol (1917) as a visual prompt. The system then waits for the user to input selection of the cat symbol in the correct grid position (1914) in the Reading Interface (1915). Following input of the symbol for cat in the Reading Interface, the system provides audio output of the word cat (1913) and then closes the Learn-It screen, restores the sentence to the sentence bar with cat highlighted as the current word and then awaits independent input of the word cat in the main reading interface.

Figure 20A:
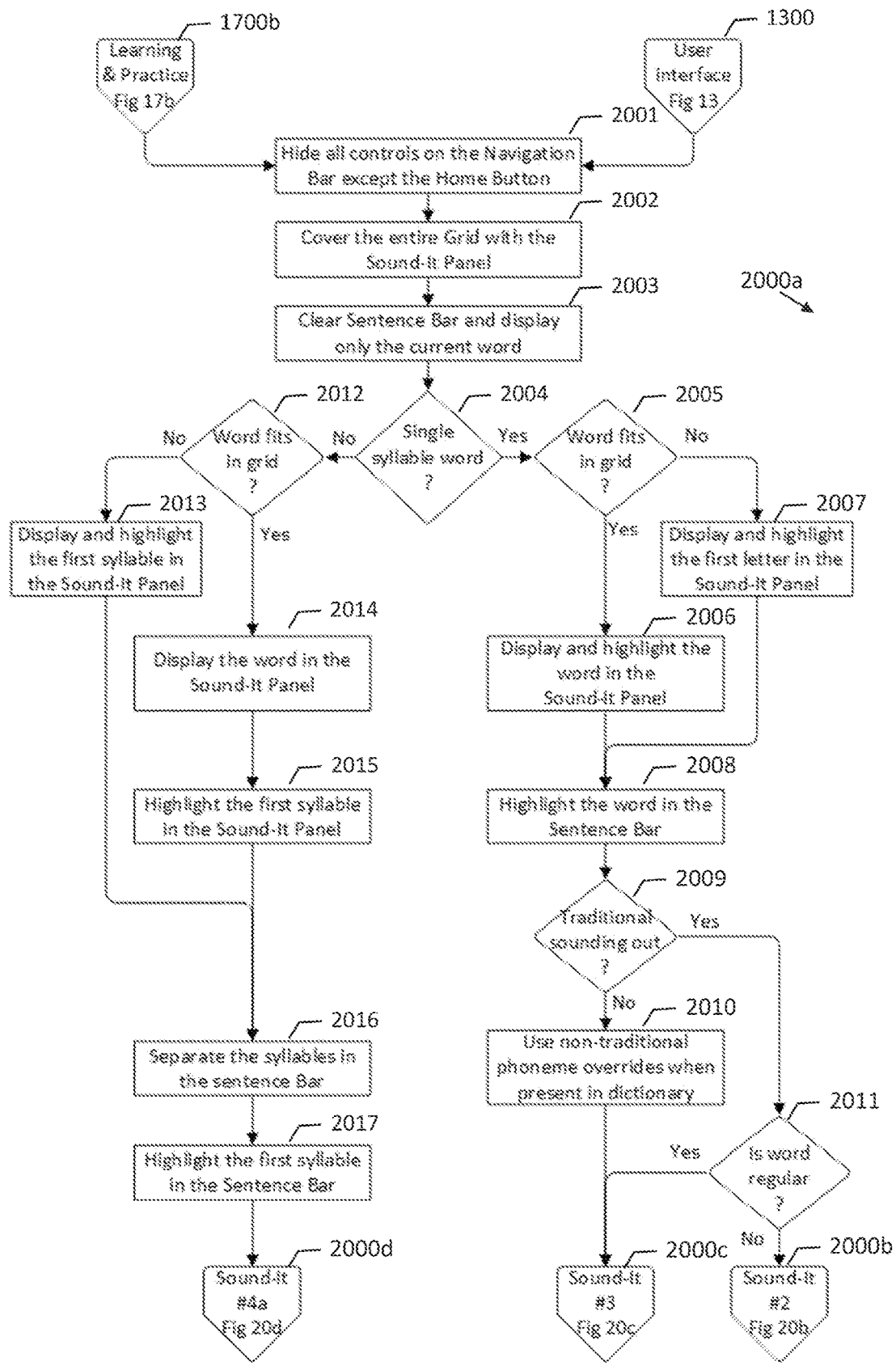
FIG. 20A is a flowchart representing an example of a process for sounding out words, Sound-It #1.

The system processes in Sound-It are displayed in FIGS. 20A-20G and then amalgamated with the Learn-It processes in FIGS. 21A-21D. FIG. 20A displays the start of the Sound-It process. The sound it process can be activated directly by the user selecting the Sound-It button in the user interface (1300—see FIG. 13 for more detail) or automatically by the system if Learning or Practice mode is enabled and the user has made two errors on the current word without selecting the Sound-it or Learn-It button (1700b—see FIG. 17B for more detail). When Sound-It is activated, the system hides all controls on the navigation bar except the home page (2001), covers the entire grid with the Sound-It panel (2002), and clears the sentence bar to display only the current word (2003). The System then determines whether the current word is a single syllable word (2004).

If the word has multiple syllables, the system then determines whether there is enough grid space for the whole word to be displayed in the grid when each grapheme is placed in a single grid cell (2012). If there is enough grid space, the system displays the whole word in the Sound-It panel (2014) and highlights the first syllable in the Sound-It panel (2015). If the word is too long to fit in the grid (2012), the system displays and highlights the first syllable of the word in the Sound-It panel (2013). The system then separates the word into syllables in the sentence bar (2016) and highlights the first syllable in the sentence bar (2017). The process continues in FIG. 20D (2000d). The system then determines whether traditional sounding out is enabled (2040).

If non-traditional sounding out is enabled, the non-traditional phoneme overrides the traditional phonemes when required (2041). If traditional sounding out is enabled (2040), the system then determines whether the word is regular or irregular (2042). Both non-traditional and traditional words that are phonetically regular follow the same process (2000f) which is outlined in FIG. 20F. The system determines whether the word is sounded out using the individual phonemes within the syllable or by sounding out each syllable as a single whole unit (2070). This is specified by teacher settings. If the word is to be sounded out with each syllable as a unit, the system then determines whether the syllable contains a vowel consonant 'e' (VCe) vowel (2071). If the syllable does contain a VCe vowel, the system is instructed to highlight the 'e' associated with the vowel in the word in the Sound-it panel because the 'e' modifies the vowel to be pronounces as the vowel's letter name (e.g. the 'a' in cake). If the word is to be sounded out using phonemes (2070), the system highlights the grapheme associated with the first sound in the syllable in the Sound-It panel (2073) and then determines whether the current grapheme is a VCe vowel (2075). If it is a VCe vowel, there is an extra step where the system highlights the 'e' associated with the vowel in the Sound-It panel (2076). The system then audio outputs the phoneme(s) for the grapheme as it is highlighted in the Sound-It panel (2077). The system then determines whether the phoneme is the last phoneme in the syllable (2078). If it is not the last phoneme, the system highlights the grapheme associated with the next sound in the Sound-It panel (2074) and repeats the process until all the last phoneme has been sounded out in the syllable (2078). The system then highlights the syllable in the Sound-It panel (2070). The process for both words that have been sounded out as whole syllables and word that have been sounded out as phonemes within syllables then returns to FIG. 20D (2000d). The system then provides audio output of the syllable using phonemes to achieve the correct pronunciation (2043) and then determines whether the current syllable is the last syllable in the word (2044). If it is not the last syllable in the word, the system provides a teacher configured pause (2045) and then if the word fits in the grid (2046), the system highlights the next syllable in the Sound-It panel (2048). If the word does not fit in the grid (2046), the system displays and highlights the next syllable in the Sound-It panel (2047). The system then then highlights the next syllable in the sentence bar (2049). The sounding out process for syllables or phonemes within syllables is then repeated until the current syllable is the last syllable in the word (2044). The process (2000g) then continues and will be described in a later section in FIG. 20G.

Figure 20B:
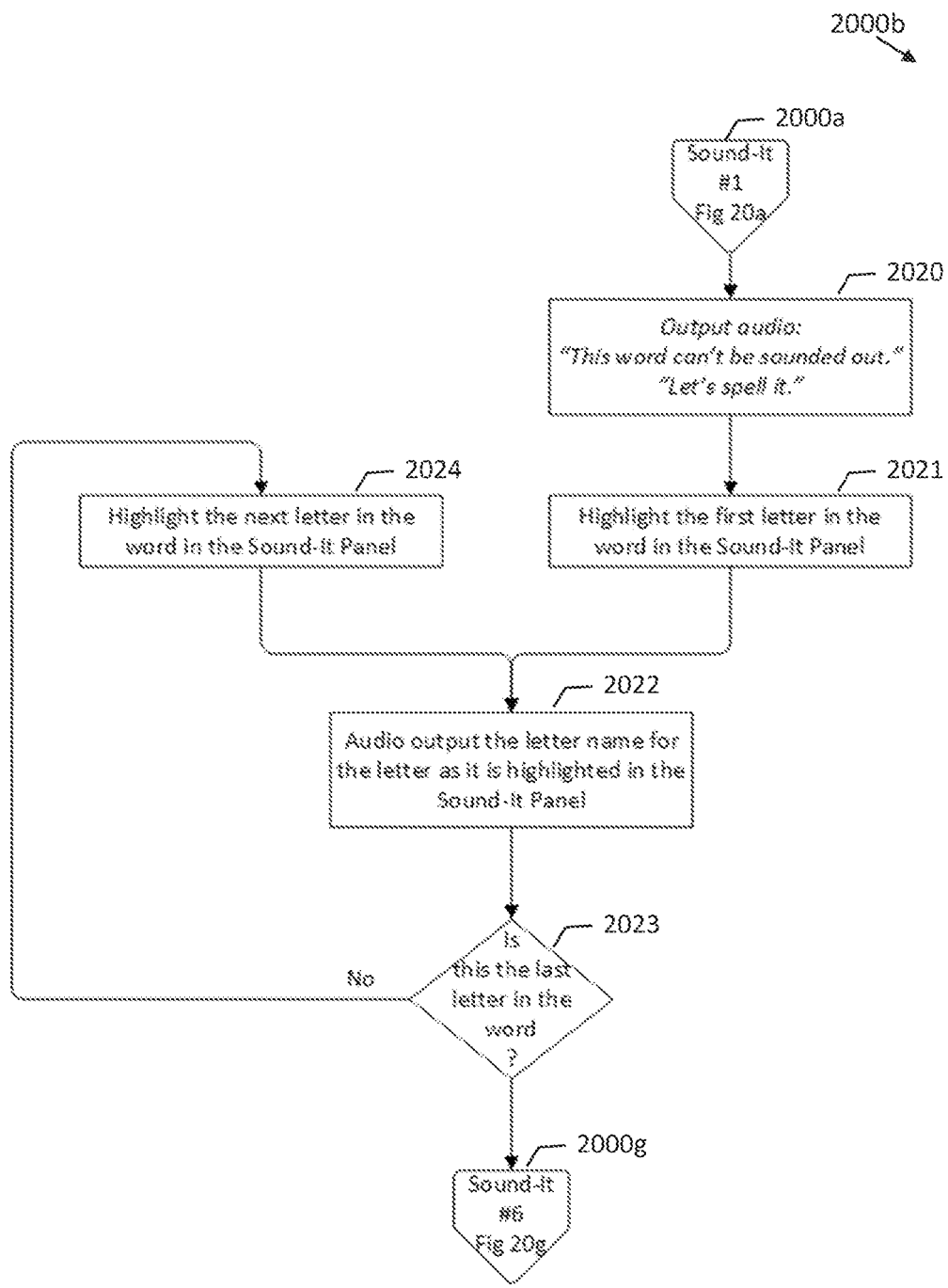
FIG. 20B is a flowchart representing an example of a process for sounding out words, Sound-It #2—Single Syllable—Traditional—Irregular.
Figure 20C:
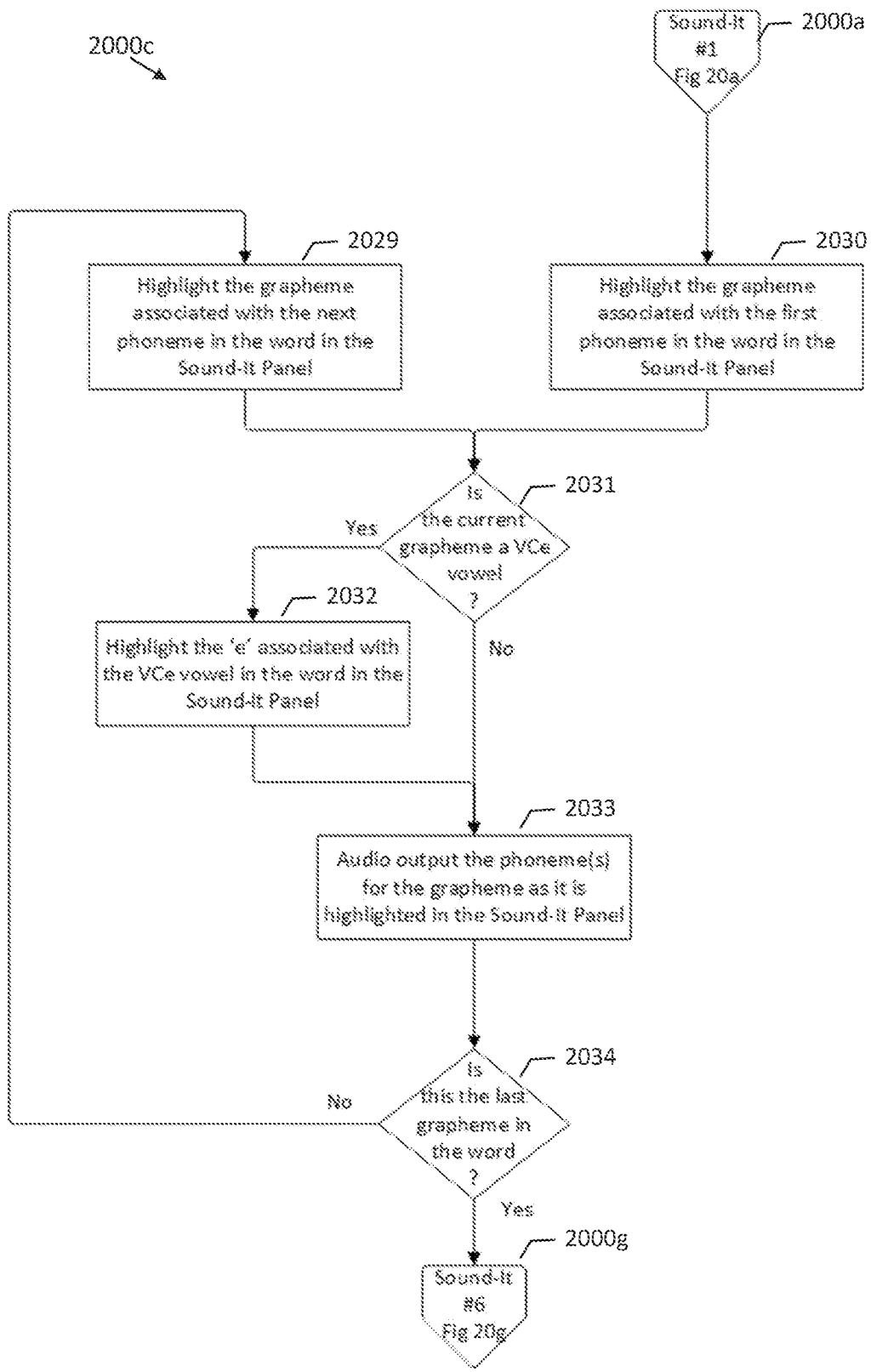
FIG. 20C is a flowchart representing an example of a process for sounding out words, Sound-It #3—Single Syllable—Traditional—Regular & Non-Traditional.
Figure 20D:
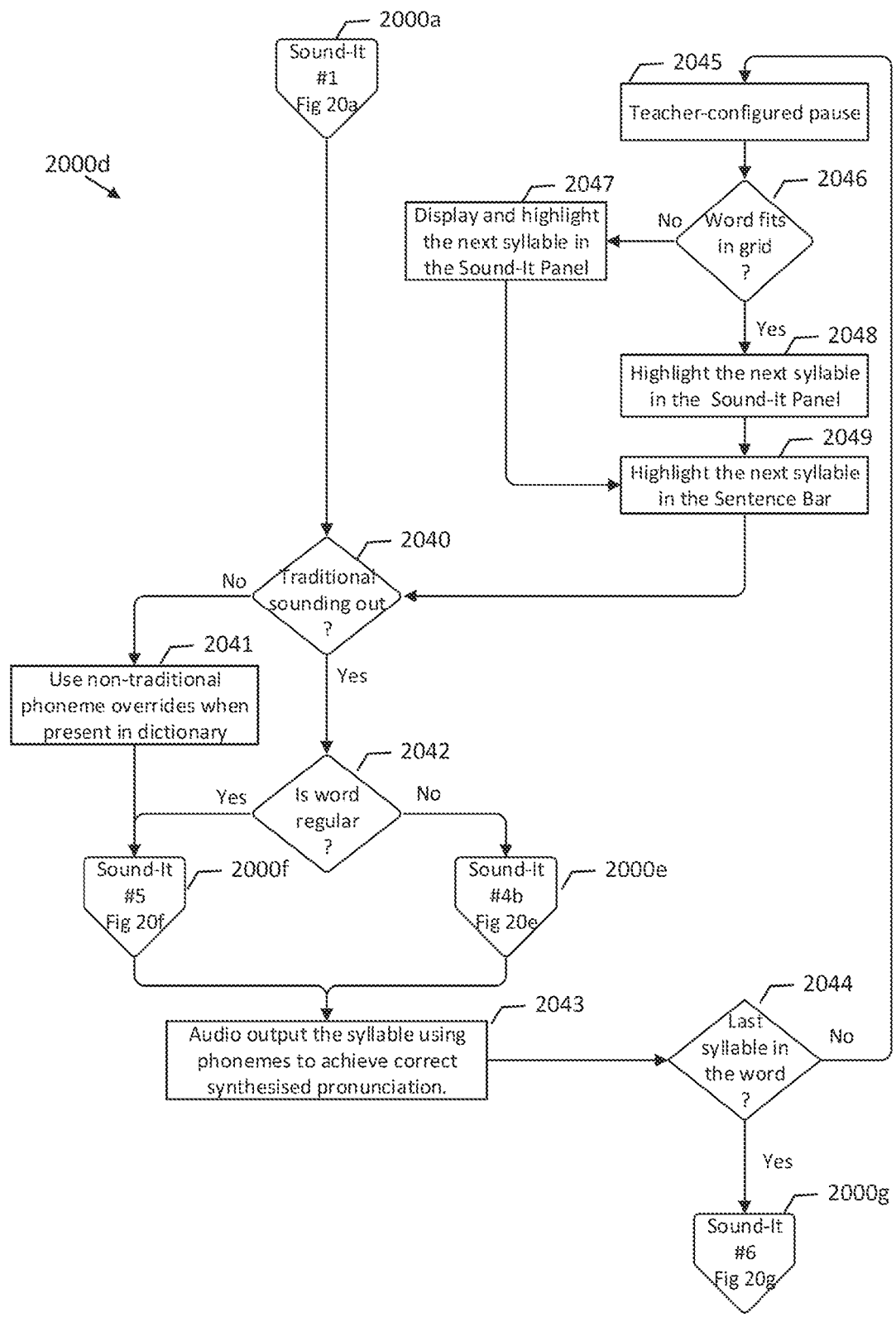
FIG. 20D is a flowchart representing an example of a process for sounding out words, Sound-It #4a—Multisyllable.
Figure 20E:
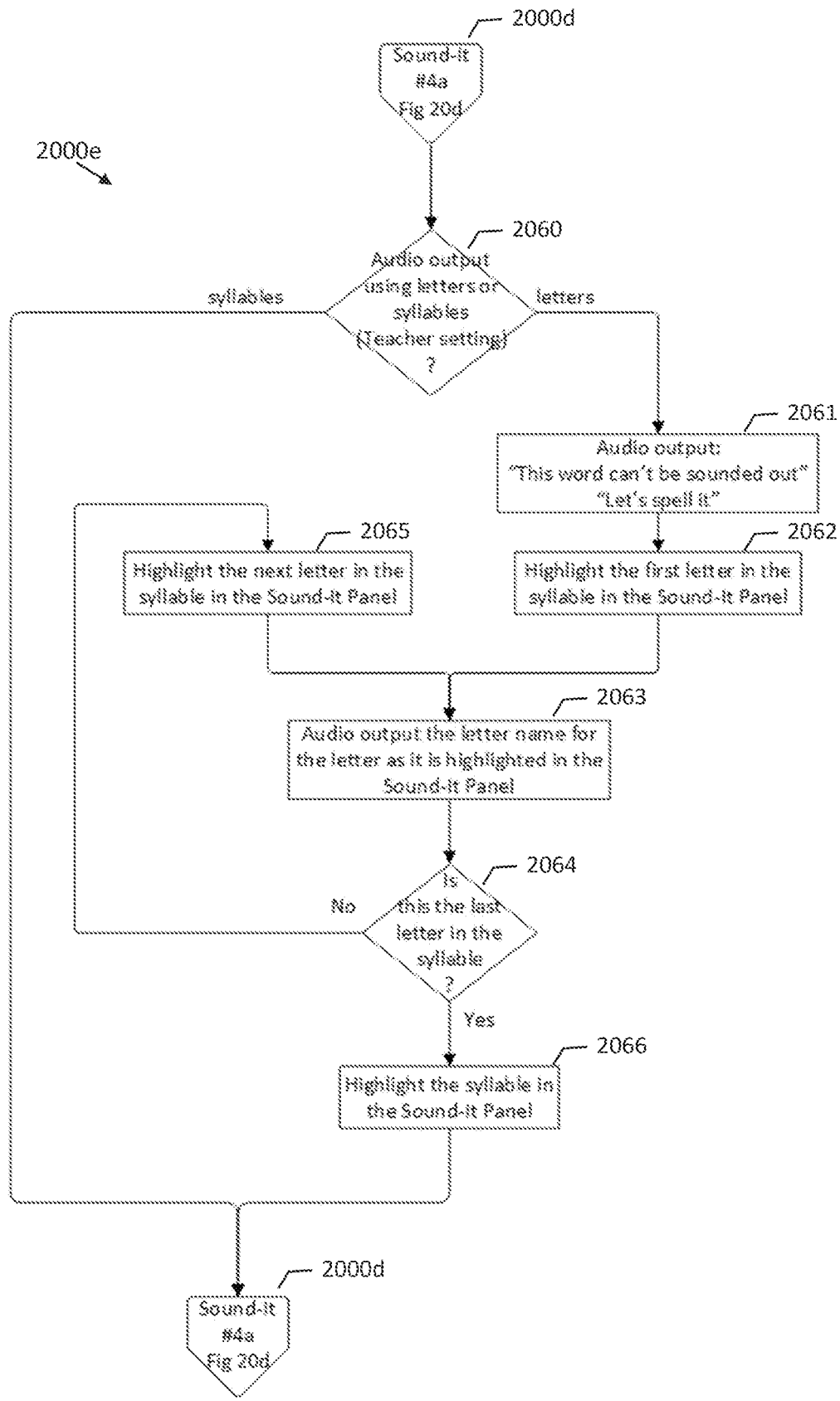
FIG. 20E is a flowchart representing an example of a process for sounding out words, Sound-It #4b—Multi-syllable—Traditional—Irregular.
Figure 20F:
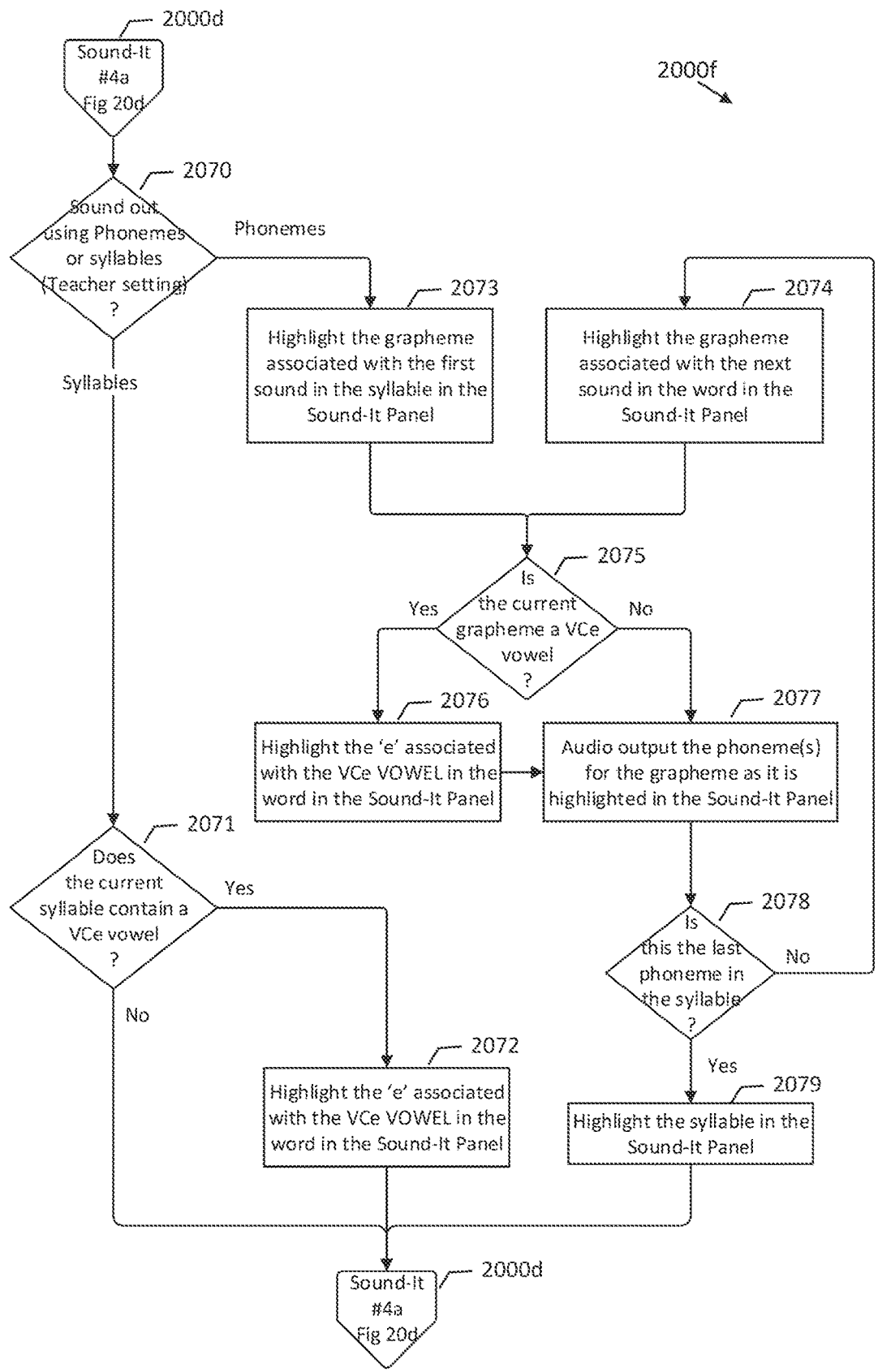
FIG. 20F is a flowchart representing an example of a process for sounding out words, Sound-It #5—Multi-syllable—Traditional—Regular & Non-Traditional.

Returning to FIG. 20D, if a word is a multisyllable word and traditional sounding out is enabled (2040) and the word is irregular (2042), the sounding process (2000e) is described in FIG. 20E. The system firstly determines whether the word is to have an audio output of letters within syllables or whole syllables (2060). This is determined in teacher settings. If the audio output is letters within the syllables, the system provides an audio output advising the user that the word can't be sounded out and needs to be spelt out (2061). The system then highlights the first letter in the syllable in the Sound It panel (2062) and audio outputs the letter name for the letter (2063). The system then determines whether there are additional letters in the syllable (2064), and if so, highlights the next letter in the syllable in the Sound-It panel (2065) and then repeats the process until it audio outputs the last letter in the syllable (2064). The system then highlights the syllable in the Sound-It panel. Once this has occurred the process for both words that are said using whole syllables (2060) and words said using letters within syllables continues in FIG. 20D (2000d). The system then provides audio output of the syllable using phonemes to achieve the correct pronunciation (2043) and then determines whether the current syllable is the last syllable in the word (2044). If it is not the last syllable in the word, the system provides a teacher configured pause (2045) and then if the word fits in the grid (2046), the system highlights the next syllable in the Sound-It panel (2048). If the word does not fit in the grid (2046), the system displays and highlights the next syllable in the Sound-It panel (2047). The system then highlights the next syllable in the sentence bar (2049). The sounding out process for syllables or phonemes within syllables is then repeated until the current syllable is the last syllable in the word (2044). The process (2000g) then continues and will be described in a later section in FIG. 20G.

So far, the processes for multisyllabic words have been described. This section describes the Sound-It processes for single syllable words. Returning to FIG. 20A, if the system determines that the word is single syllable (2004), the system determines whether the word can fit in the grid (2005). If the word fits, the system displays and highlights the word in the Sound-It panel (2006). If the word doesn't fit in the grid, the system displays and highlights the first letter in the Sound-It panel (2006). The system then highlights the word in the sentence bar (2008). The system then determines whether traditional sounding out is enabled (2009) and whether the word is regular or irregular (2011). If traditional sounding out is not enabled, non-traditional overrides occur when they are present in the dictionary (2010). Both non-traditional sounding out and traditional sounding out when the words are regular follow the same sounding out process (2000c) in FIG. 20C. The system highlights the grapheme associated with the first phoneme in the word in the Sound-It panel (2030). The system then determines whether the current grapheme is a VCe vowel (2031). If the grapheme is a VCe vowel, the system highlights the 'e' associated with the VCe vowel in the word in the Sound-It panel (2032). The system then audio outputs the phoneme(s) for the grapheme as it is highlighted in the Sound It panel (2033). The system then determines whether the grapheme is the last grapheme in the word (2034). If it is not the last grapheme in the word, the system highlights the next grapheme associated with the next phoneme in the word in the Sound-It panel (2029) and the process is repeated until it has been completed for the last phoneme in the word (2034). The process (2000g) then continues and will be described in a later section in FIG. 20G.

Returning to FIG. 20A, if a word is single syllable and traditional sounding out is enabled (2009) and the word is irregular (2011), the sounding out process (2000b) is described in FIG. 20B. The system provides audio output to advise the user that they can't sound out the current word and so it needs to be spelt out (2020). The system then highlights the first letter in the word in the Sound-It panel (2021) and provides an audio output of the letter name for the letter as it is highlighted in the Sound-It panel (2022). The system then determines whether it was the last letter in the word (2023). If it is not the last letter in the word, the system highlights the next letter in the word in the Sound-It Panel (2024) and then repeats the process until it is the last letter in the word. The process (2000g) then continues in FIG. 20G.

Figure 20G:
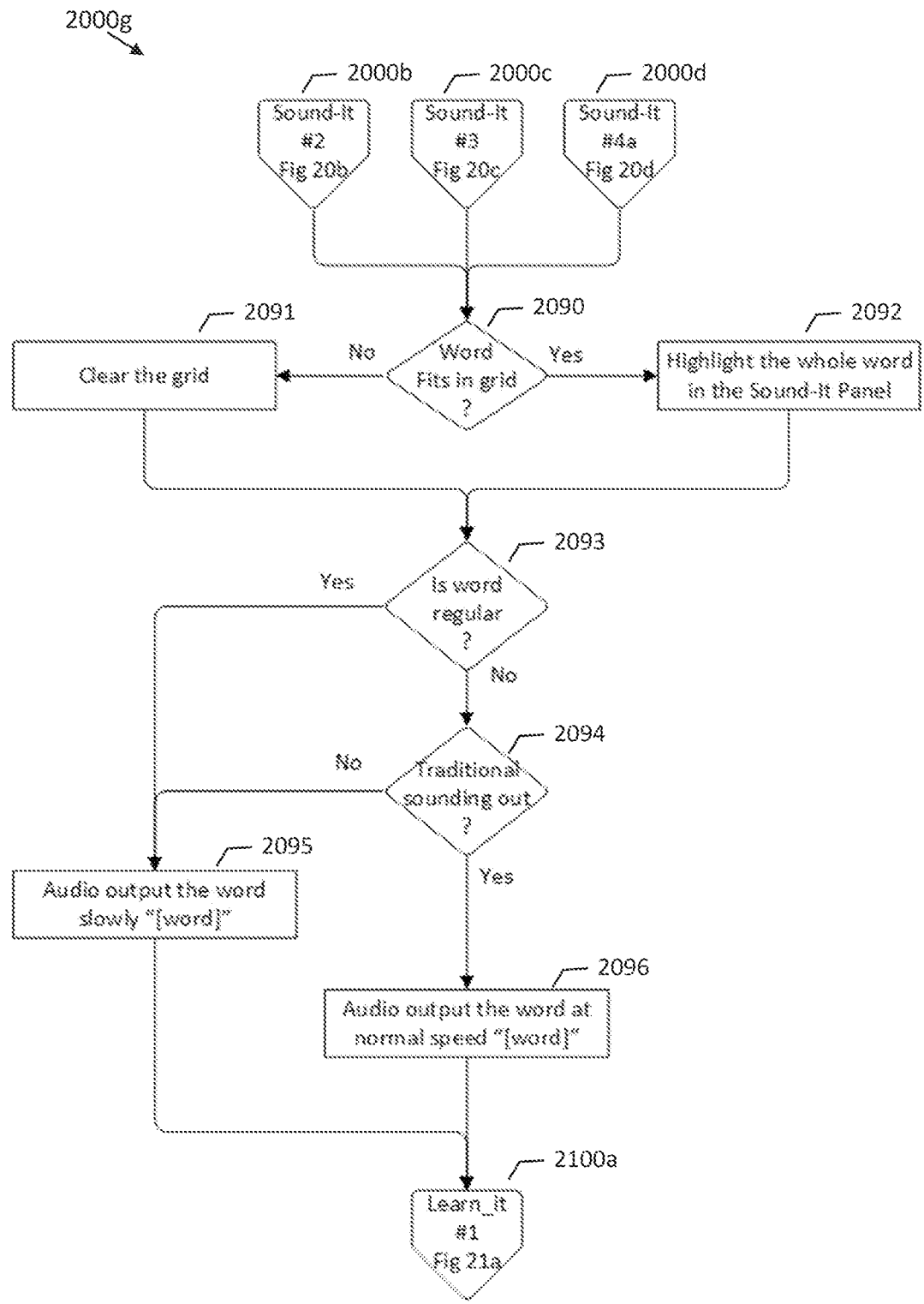
FIG. 20G is a flowchart representing an example of a process for sounding out words, Sound-It #6.

The final component of the Sound-It process is described in FIG. 20G and applies to all of the Sound-It scenarios described above. The system firstly determines whether the word fits the grid (2090). If the word does not fit, the system clears the grid (2091). If the word fits the grid, the system highlights the whole word in the Sound-It panel (2092). The system then determines whether the word is regular (2093) and whether traditional sounding out is enabled (2094). If a word is regular, or if a word is irregular but non-traditional sounding out is enabled, the system provides an audio output of the word articulated slowly (2095). If the word is irregular and traditional sounding out is enabled, the system provides an audio output of the word at normal speed.

Figure 21A:
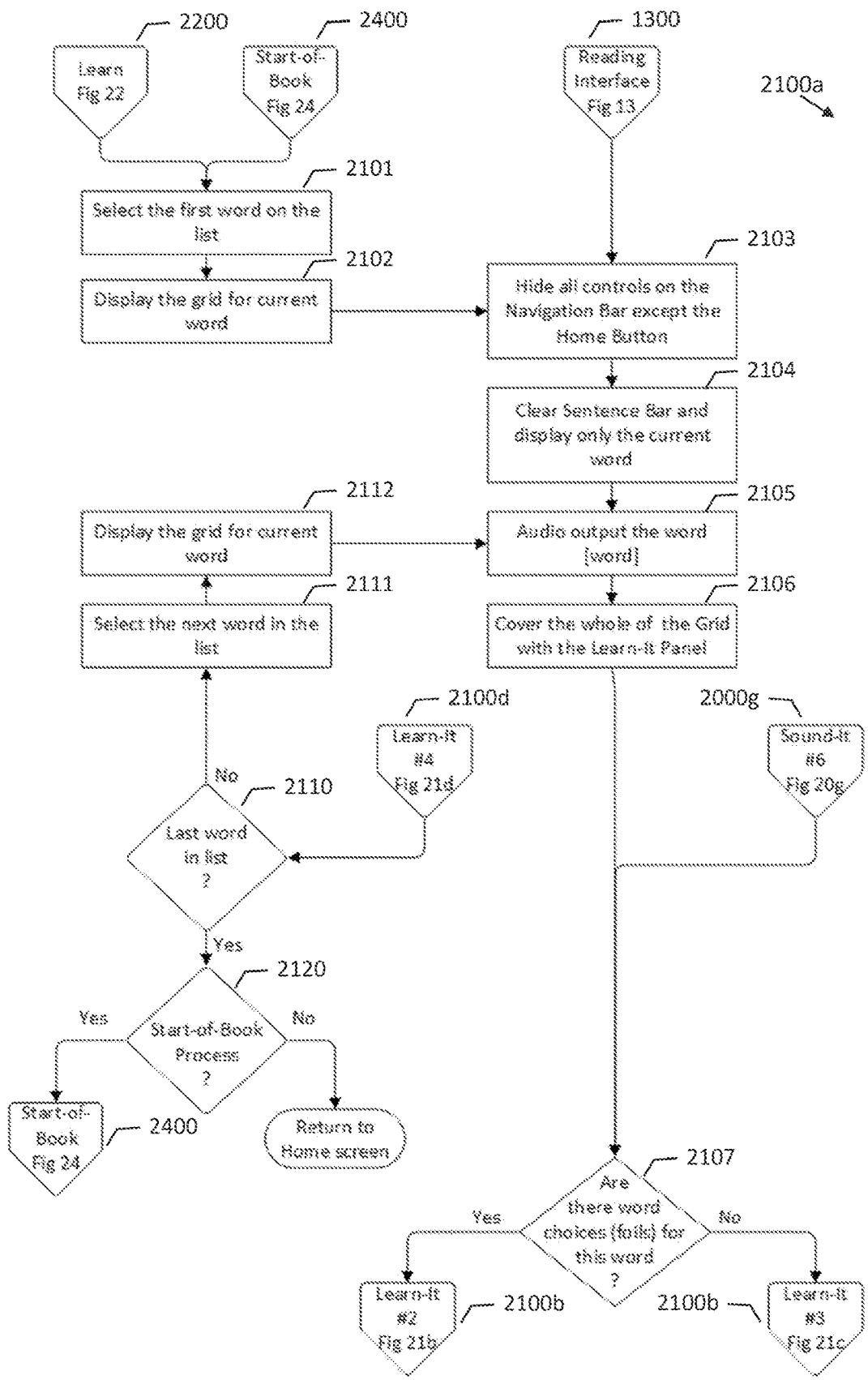
FIG. 21A is a flowchart representing an example of a process for system guided learning, Learn-It #1.
Figure 21B:
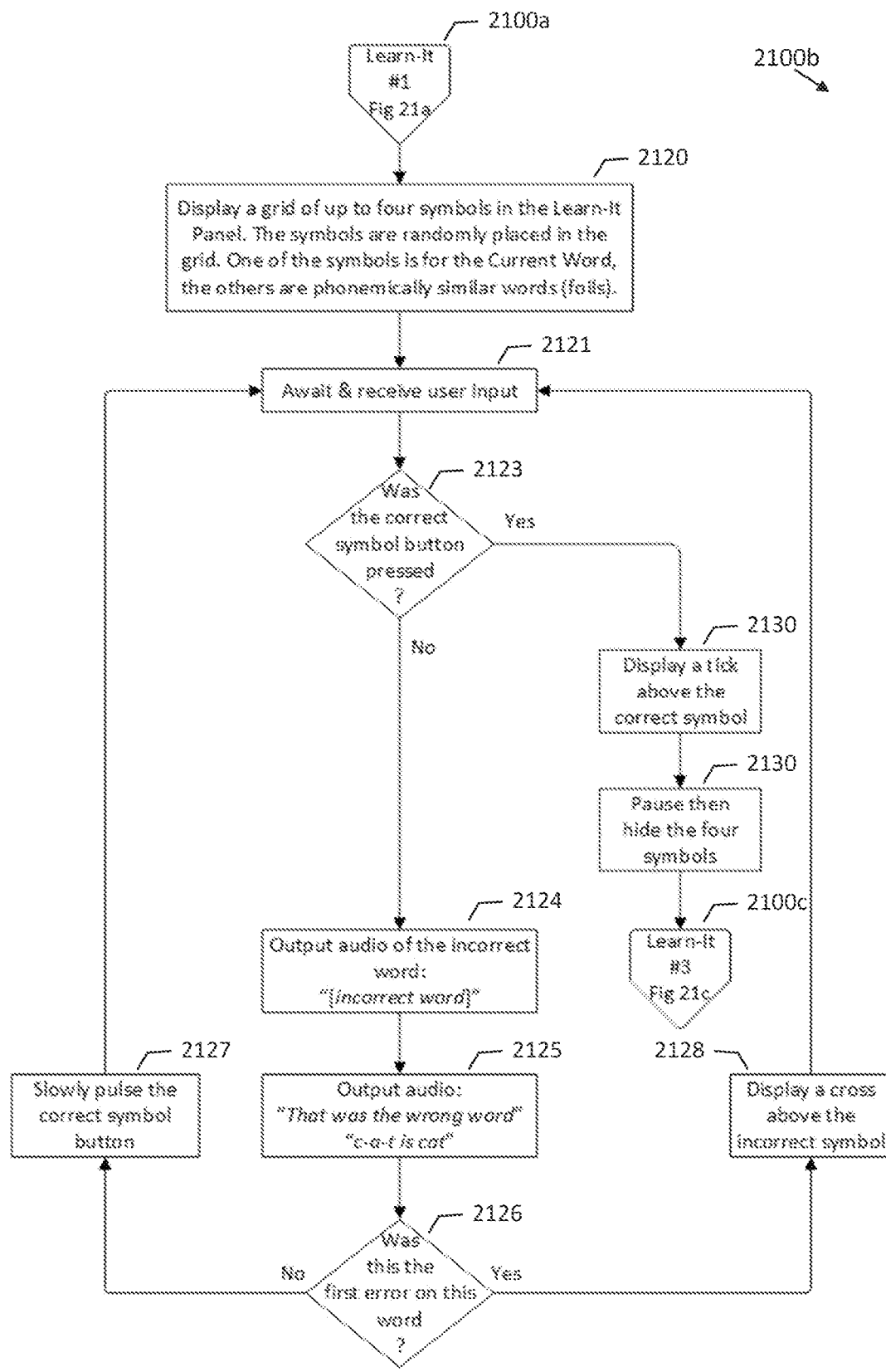
FIG. 21B is a flowchart representing an example of a process for system guided learning, Learn-It #2—Word Choices.

The Learn-It component of sounding out then commences and is described in FIG. 21A. The system then determines whether there are foils for the word (2107). If there are foils for the word, the Learn-It process (2100b) continues in FIG. 21B. The system displays a grid of up to four randomly arranged symbols in the Learn-It grid (2120). One of the symbols represents the current word and the remaining three words are phonemically similar words (foils). The system then awaits and receives user input (2121). When the user has selected a button (2122), the system then determines whether the user selected the correct button (2123). If the user has not selected the correct button, the system provides an audio output of the incorrect word (2124) and then provides an audio output of corrective feedback to the user informing them that they have selected the incorrect word. The system then the sounds out the word and says it at normal speed for example "c-a-t is cat" (2125). The system then determines if it is the user's first error on the word (2126). If it is the user's first error on the word, the system displays a cross above the incorrect symbol (2128) and the user has an additional attempt as selecting the correct button (2121). If it is the user's second error on the word (2126), the system pulses the correct symbol button to draw the user's attention (2127) and then the user has another attempt at selecting the correct button (2121). Once the correct symbol has been selected (2123), the system displays a tick above the correct symbol (2129), and then provides a brief pause and then hides the four symbols and the tick/cross (2130). The process (2100c) continues in FIG. 21C. The system then determines whether the user is using the small grid (2140). If the user is using the large grid, the system shrinks the Learn-It panel so that it instead of covering the whole grid it just covers the right half of the grid (2141). If the user is using the small grid the Learn-It panel remains the same size and continues to cover the whole grid. The system then displays the symbol for the word in the Learn-It panel (2142) and displays a tick above the correct symbol (2136). The system then determines whether there is an additional popup symbol for the word (2137). If there is an additional popup, the system displays the popup symbol for the word in the Learn-It panel (2138) and awaits and receives user input (2139). The system then displays a tick above the correct symbol (2136). If there is no additional popup symbol for the word (2137), the system provides an audio output for the current word at normal speed (2140) and the process continues in FIG. 21D. The system audio outputs an instruction to the user to find the word (2150). This part of the process teaches the user the location of the symbols within the grid in the reading interface. The system determines whether the user is using the small grid (2151). If the user is using the small grid, the system hides the Learn-It panel so that the reading interface is visible (2152). The system then highlights the symbol group that contains the current word within the grid and awaits and receives input from the user (2154). The system then determines whether the user pressed the button within the teacher specified time (2155). If the user did not press the button within the timeframe or the pressed an incorrect button (2156), the system pulses the button (2157) and then repeats the process of awaiting a user input (2154). If the system determined that the user selected the correct symbol button, the system then stops the button pulsing if it is pulsing (2158). The system then determines whether there is an additional popup symbol for the word (2159). If there is, the system displays the popup group for the word (2162) and then awaits and receives user input (2154). The process including error correction, if required, repeats for the popup as described above in the same manner as for the previously selected base symbol. When the system determines that there are no additional popups for the word (2159), the system audio outputs the current word (2160). The system then determines whether the Learn-It System was activated through the Learn process (2161). In this case the Learn-It process is activated through the Sound-It process so the system returns to the Reading Interface (1300) in FIG. 13 so that the student can make an independent attempt at reading the current word and then continue reading the book.

Figure 21C:
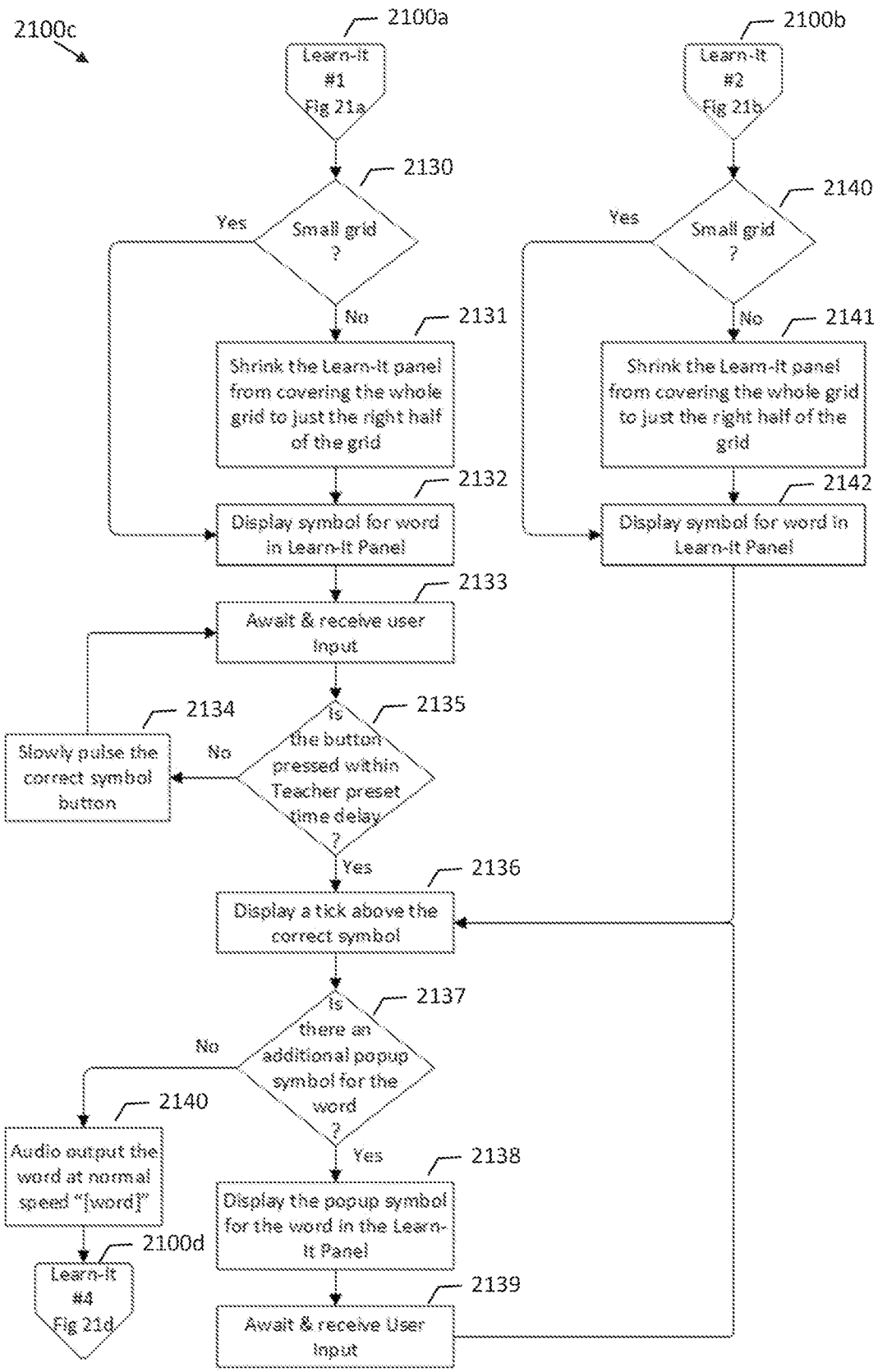
FIG. 21C is a flowchart representing an example of a process for system guided learning, Learn-It #3.
Figure 21D:
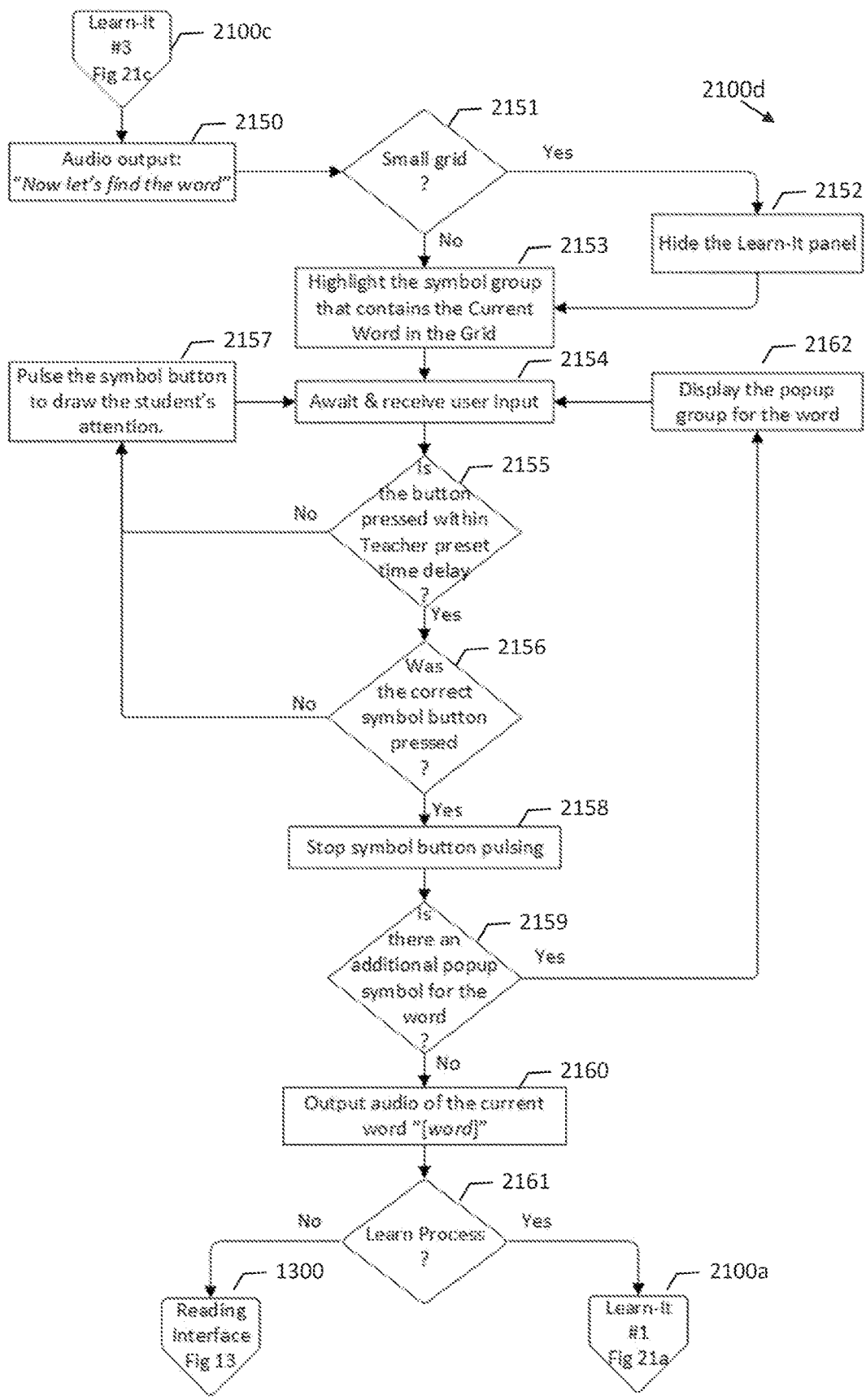
FIG. 21D is a flowchart representing an example of a process for system guided learning, Learn-It #4.

Returning to FIG. 21A, if the system determines that there are no foils for the current word (2107), the Learn-It process continues in FIG. 21C (2100c). The system determines whether the user is using the small grid (2130). If they are not, the system shrinks the Learn-It panel from covering the whole grid to covering the right half of the screen (2131). If the user is using the small grid, the Learn-It Panel remains covering the whole screen. The system then displays the symbol for the word in the Learn-It panel (2132) and awaits and receives user input (2133). The system then determines whether the button was pressed within the Teacher pre-set time delay (2135). If it was not, the system slowly pulses the correct symbol (2134) and awaits and receives user input (2133). Once the system has received input from the user (2135), the system displays a tick above the correct symbol (2136). The process from this point (2136) onwards is as described above for words with foils.

Learn-It

In addition to forming part of the Sound-It process as described above, the Learn-It process can also be activated when the user selects the Learn-It button in the Reading Interface (for more detail see FIG. 13). In this case, the Learn-It process provides support for the user when they do not know the symbol for a word or know the symbol but do not know where to locate it within the grid array. This process is outlined in FIG. 21A. Following selection of the Learn-It button in the reading interface (1300), the system hides all the controls on the navigation bar except the home button (2103). The system then clears the sentence bar and displays only the current word (2104) and provides an audio output of the word (2105). The system then covers the whole of the grid with the Learn-It panel (2106) and then follows the processes described above when Learn-It is combined with the Sound-It process starting with the determination of whether there are foils for this word (2107).

The Learn-It process in FIG. 21A is also activated as part of the start-of-book process (2400) when the user selects a new book for the first time and that book contains new words that the user hasn't encountered before in the AAC Reading System. The system selects the first word on the list (2101) and displays the grid for the current word (2102). The system then follows the same processes described above for the selection of the Learn-It button in the Reading Interface, starting with hiding all navigation controls except the home button (2103). The process is the same as until on FIG. 21D when the system asks whether the Learn-It process is part of the Learn process (2161). In this case, the start-of book process utilises the Learn word list (Book Words Dynamic List—see Learn section below for more details) so the process returns to FIG. 21A (2100). The system determines whether the current word is the last word in the list (2110). If it is not the last word in the list, the system selects the next word in the list (2111) and then displays the grid for the current word (2112) and the process repeats with the new word, starting with the system providing an audio output of the new word (2105). If the word is the last word in the list (2110), the system determines whether the current Learn-It process is part of the start-of-book process (2120). As the process is part of the start-of-book process, the Learn-It process is completed and the start-of-book process continues in FIG. 24 (2400).

Learn Section

The learn section provides an opportunity for the user to learn to associate symbols with words. The learn task allows the user to pre-learn symbols representing new words in new books, to practice words that they have previously made errors on, or to learn words that commonly occur in children's books to improve their sight word vocabulary (automatic word recognition without needing to sound out) and reading fluency. Several word lists are available for students to select from to achieve these goals.

The Error Words Dynamic List (EWDL) is a list of all the errors a student has made across all the books that they have read that are currently on their device. The list is dynamic with new words added whenever the student makes an error whilst reading a book and deleted when they are correctly selected within a book. Book specific or rarely occurring words are flagged so that they are only presented when the book they are in is the current book. Rarely used words will be defined by a usage formula once a sufficient number of words and books have been entered into the database. This list is prepared on the server and pushed to the device each time it is connected. The on-device list is maintained by the device and is dynamically modified as the student reads. The teacher can choose whether to order this list by frequency of occurrence number using Fry's Static Word List or the Aacapella Static Word List (ASWL). If a word does not appear in the Fry's list it takes the word order number from the ASWL. When a student selects Learn, a sublist of words, with the number pre-determined by teacher settings, is selected for the student to learn. Every time the device connects to the server it uploads the student's usage data which is used to update the data. Words are deleted from the list when a book is deleted from the device.

The Learned Word List (LWL) is a list of all words that have been learnt in the Learn process. Word are never deleted from this list. Word statistics for this data include the number of times the word has been displayed in the Learn, Learn-It and Sound-It processes, how many times the word has been read, how many books that the word appears in have been completely read, the number of errors the student has made on the word, and the date when it was last read in a book, the date of the last error when reading a book and date of last error in the Sound-It process.

The Book Word Dynamic List (BWDL) is a list of all new words in the current book plus all the error words in the current book. This list is prepared on the server and pushed to the device each time a new book is downloaded onto the device. The on-device list is maintained on the device and is dynamically modified as the student reads. This list is ordered by Aacapella word number.

The Fry's Words Static List (FWSL) is a list of Fry's top 1000 words which is a list of the most commonly occurring words in children's books. The list is stored on the server and pushed to the device whenever the list is modified. Data includes an Aacapella Words Static List (AWSL) to allow ordering by Aacapella number. The number is modified whenever the AWSL list is updated. This list has a lowest level field that holds the lowest reading level that the word occurs in for each publisher. These fields are updated when each new book is entered.

The Fry's Words Dynamic List (FWDL) is a subset of words, the number of which is determined by a teacher setting, which is taken from the Fry's Words static list, which is dynamically generated based on Teacher defined parameters. Examples of these parameters include: Fry number range, Aacapella number range, lowest level range, and errors from the Error Word Dynamic List (EWDL). When a student learns a word in the Learn process, it is documented in the last date and next date fields. The next time the Learn process is run it is again selected for revision and consolidation and then is quarantined from the sublist for a teacher defined period of time based on a revised date in the next date field. When a student makes an error reading a word that has a future next date, the next date field is cleared.

The Aacapella Word Static List (AWSL) is a list of all words in all books entered in the AAC Reading System. The lowest level field that holds the lowest reading level a word appears in is updated every time a new book is entered. This list counts all occurrences of a word within: all books; the top 500 most read books; all books by reading level by publisher; the number of books a word appears in by reading level and/or publisher; the number of times the word is learned by all students by book reading level; count of the number of errors made by all students on the current word after they have learned the word based on book reading level; the number of times the word is sounded out by all students by book and book reading level; and the number of times a word is sounded out more than once by all students by book reading level.

The Aacapella Words Dynamic List (AWDL) is a subset of a teacher defined number of words from the Aacapella Words Static list. Parameters include: Aacapella number range, lowest level range, and errors from the Error Word Dynamic List (EWDL). When a student learns a word in the Learn process, it is documented in the last date and next date fields. The next time the Learn process is run it is again selected for revision and consolidation and then is quarantined from the sublist for a teacher defined period of time based on a revised date in the next date field. When a student makes an error reading a word that has a future next date, the next date field is cleared.

Figure 22:
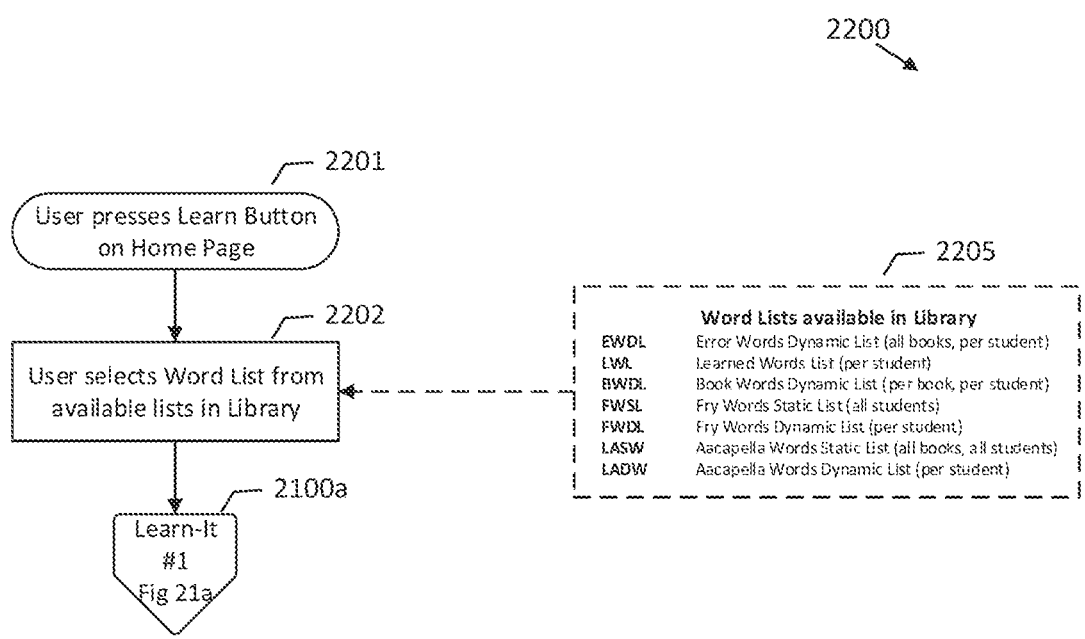
FIG. 22 is a flowchart representing an example of a process for system guided learning, Learn.

The Learn process is described in FIG. 22. The learn process is activated when the user selects the Learn button on the home page (2201). The system then launches the Learn-It process (2100*a*) that was described in the previous section for the start of book process in FIG. 21A starting with selecting the first word in the list (2101). The only difference is that for the Learn Process, on FIG. 21A when the system has finished the last word in the list (2110), the process is not the start of book process (2120) and so the system returns to the home screen (2121).

Read-It

Figure 23:
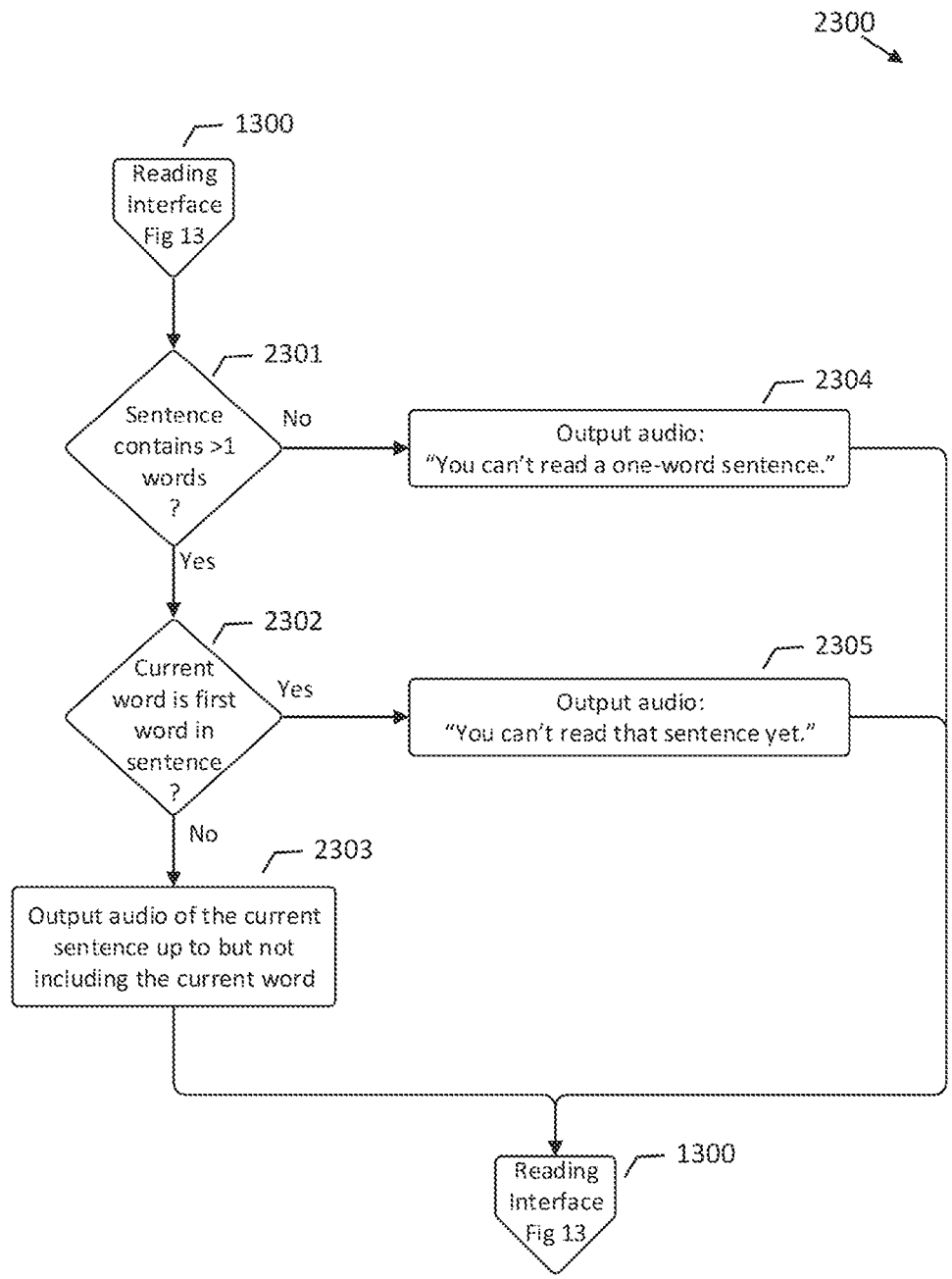
FIG. 23 is a flowchart representing an example of a process for system guided learning, Read-It.

The Read-It process supports a student to decode a word using the contextual meaning of the sentence to derive the likely word and is described in FIG. 23. Following selection of the Read-It button in the user interface (1300), the system firstly determines whether the sentence contains more than one word (2301). If the sentence only contains one word, the system outputs an audio signal that informs the user that they can't read a one-word sentence (2304) and awaits further input from the user in the reading interface (see FIG. 13).

If the sentence contains more than one word (2301), the system then determines whether the current word is the first word in the sentence (2302). If the current word is the first word in the sentence, the system outputs an audio signal that informs the user that they can't read the sentence yet (2305) and awaits further input from the user in the reading interface (see FIG. 13).

If the current word is not the first word in the sentence (2302), the system outputs an audio signal of the current sentence up to but not including the current word (2303). The system then awaits further input from the user in the reading interface (see FIG. 13).

Further Detail of the AAC System
Start of Book Process

Figure 24:
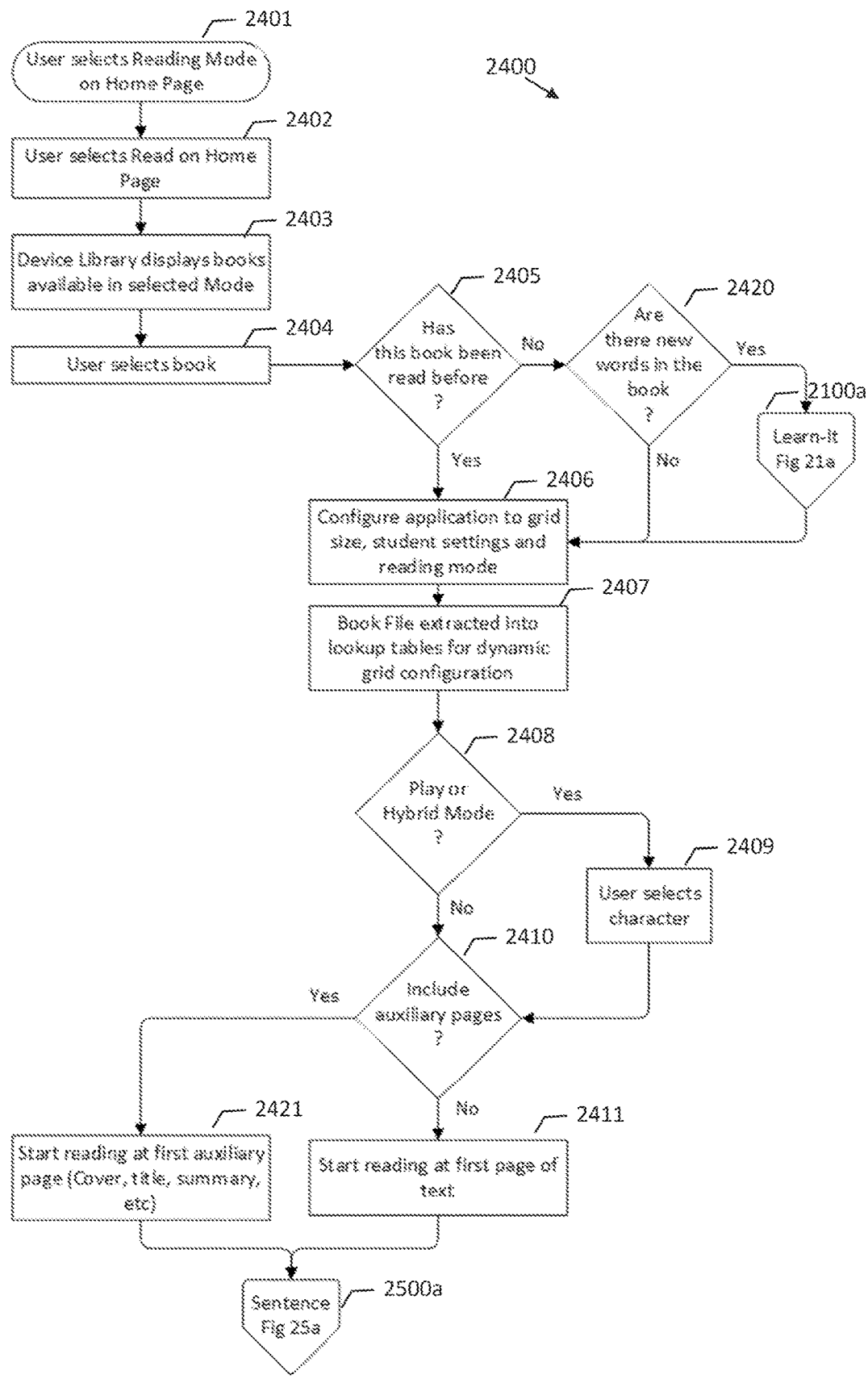
FIG. 24 is a flowchart representing an example of a Start-of-Book Process.

The start of book process is displayed in FIG. 24. The process is initiated by the selection of a reading mode on the home page (2401) followed by the selection of Read on the home page by the user (2402). The system then displays the Device Library which contains all the available texts for the currently selected reading mode (2403). The user then selects a book (2404) and the system determines whether the book has been read before (2405). If the book has not been read before (2405), the system determines whether there are new words in the book that the user hasn't encountered before (2420). If there are new words in the book, the system launches the previously described Learn-It system (See FIG. 21, 2100a) so that the user can learn the symbols associated with new words prior to reading the book. If the student has previously read the book (2405) or if there are no new word in the book (2420) the learn process is bypassed. The system then configures the application to grid size, student settings and the reading mode (2406). The system then extracts the book file into lookup tables for dynamic grid configuration (2407). If the current mode is play or hybrid mode (2408), the user is prompted to select their character (2409). The system then determines whether to include auxiliary pages such as the title or summary pages (2410). This is determined in teacher settings. If auxiliary pages are to be included (2410), reading commences on the first auxiliary page (2421). If they are not included, reading commences of the first page of the text (2411). The system then commences the sentence process (2500a) outlined in the following section in FIG. 25A.

Sentence Reproduction Process

Following completion of the start-of book process, the system commences the sentence process outlined in FIG. 25A. The system selects the first page as the current page (2501). The system determines whether the text is a book or a play (2503). If the book is a play (2503) or Join-In Mode is enabled (2517), the system completes the process (2500b) displayed in FIG. 25B. The system determines whether Performance Mode is enabled (2520). If Performance Mode is enabled, the system selects the next sentence for the User's chosen character as the current sentence (2521) and then continues the sentence process (2500a) displayed in FIG. 25A.

Returning to FIG. 25B, if Practice Mode (2522) or Read-Along modes are enabled (2523), parts of other characters are read aloud by the Application (2524). How these parts are read can be modified in Teacher settings. The system then selects the next sentence for the User's chosen character as the current sentence (2521) and then continues the sentence process (2500a) displayed in FIG. 25A.

Returning to FIG. 25B, if Join-In Mode is enabled (2525), the text is read aloud either by the application or teacher up to the next sentence containing a Join-In word or phrase (2526). The system then selects the next sentence containing a Join-In word or phrase as the current sentence (2527). The text is then read aloud by the application or teacher up to the next Join-In word of phrase (2528) and then continues the sentence process (2500a) displayed in FIG. 25A.

Returning to FIG. 25A, if the text is a book or a test text passage (2503) and Join-In mode is not enabled (2517), the system selects the next sentence as the current sentence (2504). For both books and plays, the system then displays the current sentence in the sentence bar (2505), selects the next word in the sentence as the current word (2506) and highlights the current word in the sentence bar (2513). The system then configures the grid to conform with the application configuration file (2514). The system then determines whether Join-In Mode, Read-Along Mode or Pre-Reading Mode (2515) are enabled. If one of these modes is enabled, the system pulses the current word symbol button in the grid (2516) before it commences the reading interface processes (1300) which are displayed in FIG. 13. If these modes are not enabled, the system commences the reading interface processes (1300).

Returning to FIG. 25A, in addition to the Start of Book Process, the sentence process may be activated following any symbol selection in Testing Mode so that the user does not receive error feedback (FIG. 15, 1500) or following a correct symbol button press in other Modes (FIG. 14B, 1400b). The system firstly determines whether the current word was the last word in the sentence (2509). If the word is not the last word in the sentence, the system selects the next word in the sentence as the current word (2506) and continues with the sentence process as previously described. If the current word was the last word in the sentence (2509), the system then determines whether Testing Mode is enabled (2510). If Testing Mode is not enabled and the sentence contains more than one word (2511), the system outputs an audio signal of the current sentence (2512). If Testing Mode is enabled (2510) or the sentence only contains one word (2511), the sentence is not read aloud. The system then determines whether the sentence is the last sentence on the page (2508). If the sentence is not the last sentence on the page, the system repeats the sentence process starting with determining whether the text is a book or a play (2503). If the sentence is the last sentence on the page (2508), the system then determines whether the current page is the last page in the book (2507). If the current page is not the last page in the book, the system then selects the next page in the text as the current page (2502) and repeats the sentence process starting with determining whether the text is a book or a play (2503). If the system determines that the current page is the last page in the book (2507), the system activates the End-of-Book process which is described in a later section in FIG. 27.

Popups

Figure 26:
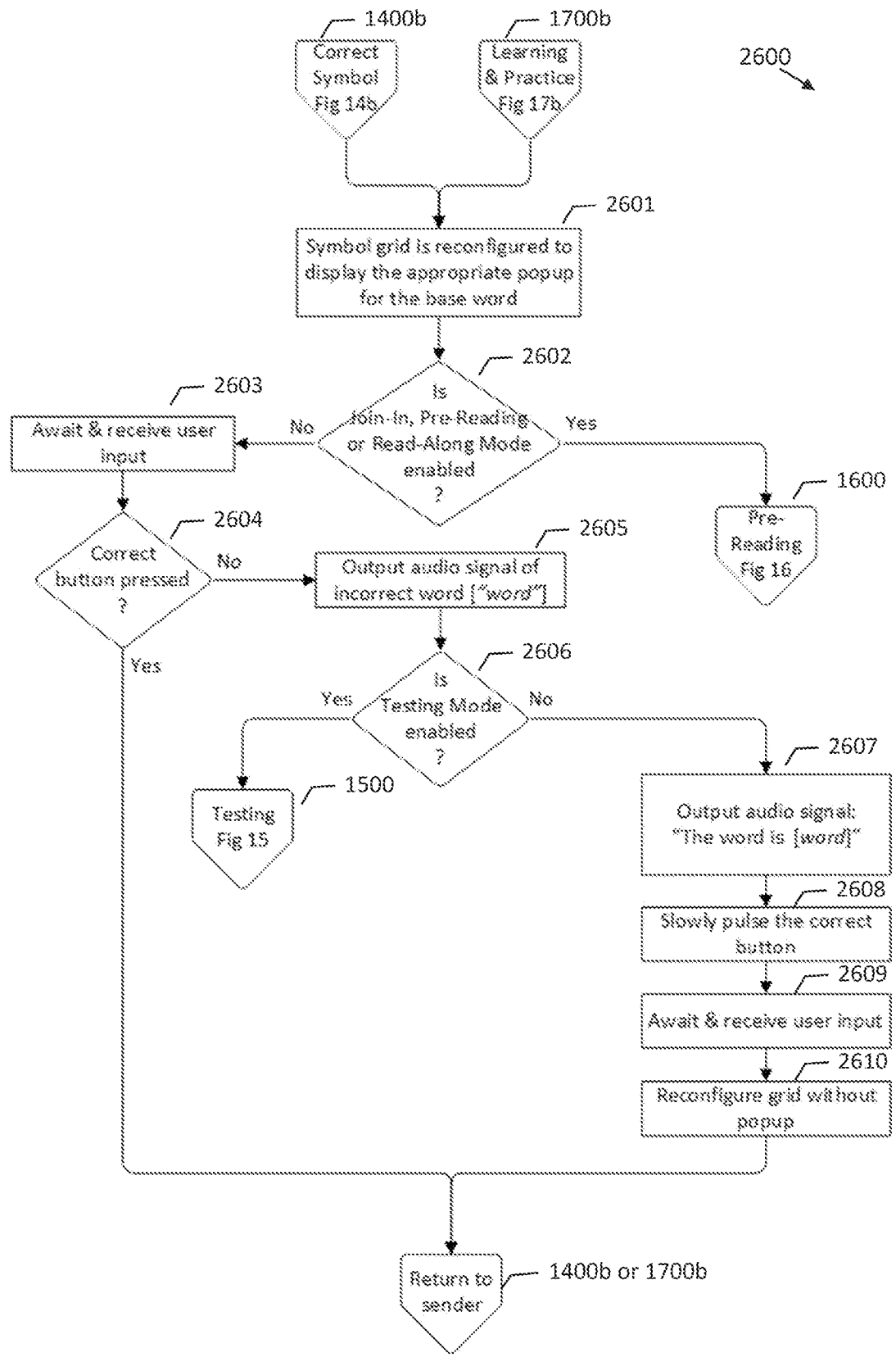
FIG. 26 is a flowchart representing an example of a Popup Process.

Following selection of a correct popup base word in the correct symbol process (FIG. 14B) or in Learning and Practice Mode (FIG. 17B), the system activates the popup process (FIG. 26). The symbol grid is reconfigured to display the appropriate popup for the base word (2601). The system then determines whether Join-In, Pre-Reading or Read-Along mode are enabled (2602). If one of these modes is enabled, the system returns to the Join-In, Pre-Reading or Read-Along mode process (1600) in FIG. 16. If one of these modes is not enabled (2602), the system awaits and receives user input (2603) and determines whether the correct button was pressed (2604). If the correct button was pressed, the system returns to where it originated from (FIG. 14B, 1400b or FIG. 17B, 1700b). If an incorrect button was pressed (2604), the system outputs an audio signal of the incorrect word (2605) and then determines whether testing mode is enabled (2606). If testing mode is enabled, the system returns to testing mode (1500) in FIG. 15. Returning to FIG. 26, if testing mode is not enabled (2606), the system provides an audio output "The word is [word]" (2607) and then pulses the correct button (2608) and awaits and receives user input (2609). The system then reconfigures the grid without the popup and returns to where it originated from (FIG. 14B, 1400b or FIG. 17B, 1700b).

End of Book Process

Figure 27:
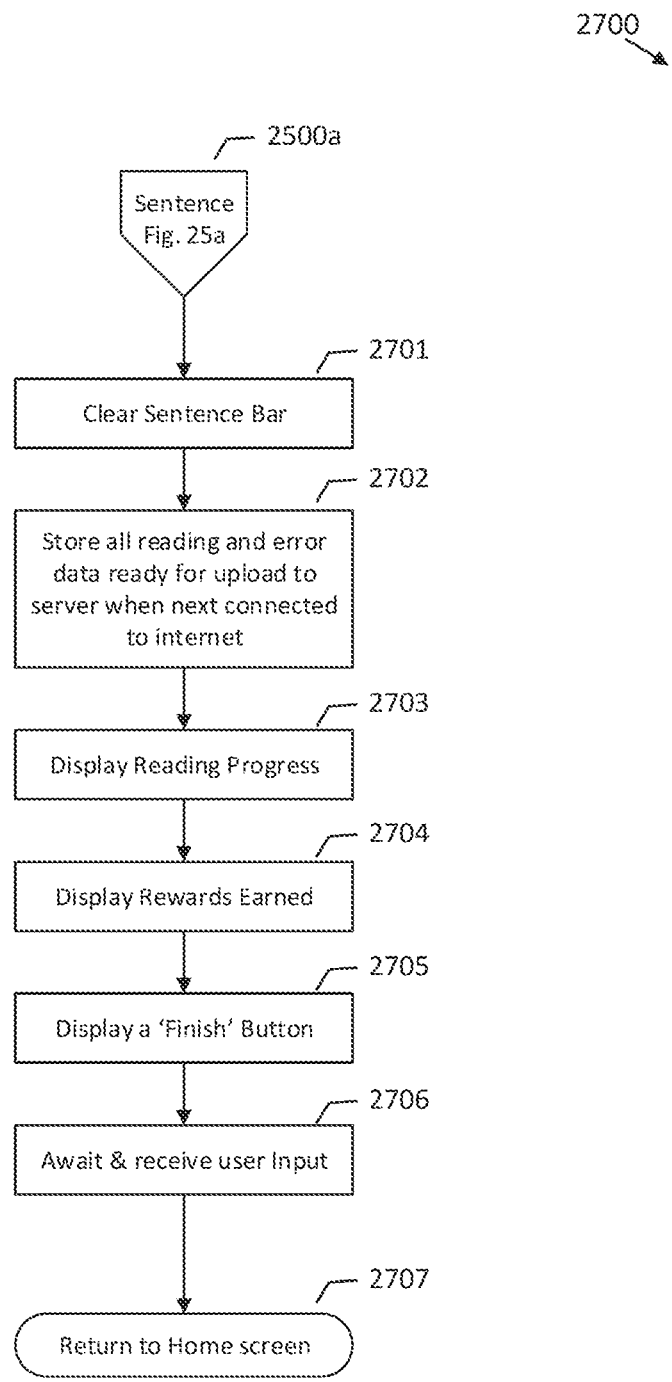
FIG. 27 is a flowchart representing an example of an End-of-Book Process.

When the end of book process is launched in the sentence process (see FIG. 25A), the processes that occur are described in FIG. 27. The system clears the sentence bar (2701) and stores all the reading and error data in preparation for upload when device is connected to the internet (2702). The system then displays the user's reading progress (2703), displays the rewards earned (2704), displays a finish button (2705), awaits and receives user input (2706), and returns to the home screen (2707).

Embodiments of the AAC reading system as disclosed herein offer several advantages over conventional AAC systems particularly related with learning to read.

It should also be appreciated that the display data structures used in embodiments of the invention can be utilised for languages other than English, (for example Spanish, French, German). It is envisaged that the sheet and layer data structures could be applicable for any non-pictorial language. Separate data structures may be used for each language, with the remainder of the system processes not requiring alteration to then operate for different languages.

The sheet and layer data structures also enable efficient processing for symbol display in some embodiments as grid layout for symbols display is predefined within such data structures. This also allows efficient used by the user because a symbol for a particular word can appear in the same position each time the word—or any related word variants—are used in the book. Further using the sheet and layer structure to define symbol positions means that for most symbols a user is able to select the correct symbols using a single input for most words and requiring no more than two inputs for the remaining words.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

What is claimed is:

1. An augmentative and alternative communication (AAC) reading system comprising:
a user interface module configured to control rendering of visual data on a display, output of audio data and receiving user inputs;
a symbol display controller configured to control allocation of symbols to predefined symbol positions for rendering and displaying one or more individual symbols of a set of symbols in an AAC symbol grid layout by the user interface module for selection by a user, and access a symbol library storing data for a plurality of symbol records, each symbol record including a unique symbol identifier and being associated with a symbol graphic file for a symbol; and
memory storing dictionary data of a dictionary and book data for at least one book, the dictionary data storing:
a set of word records, each word record being associated with a word and comprising a word identifier unique within the dictionary, a word text, a symbol identifier for the word, and sound data to enable audible reproduction of the word via the user interface module, the set of word records including a record for each one of all words occurring in text of the at least one book;
one or more display data structures, each display data structure comprising a display data structure identifier, a data record defining a set of lexical elements and an order for display of the set of lexical elements in n display positions of the AAC symbol grid layout, each one of the n display positions being allocated to a respective one of the set of lexical elements, each lexical element comprises a set of up to m semantically related words,
where each of the up to m semantically related words is a word variant associated with a different one of m word categories, each word variant being associated with a symbol conveying meaning for the word variant, each word of a book occurring within a display data structure for the book, and, for each book, the book data comprises book text data encoded to reference word identifiers for each word of text of the book, sequence data for the book; and identifiers of display data structures for all words in text of the book,
wherein the symbol display controller is configured to for each word, determine a display data structure including the word and identify symbols to populate the n display positions based on word category based on sequence data for the book and received user input, such that the symbols displayed will correspond to at least the symbol required for the user to select via the user interface module for audio output based on reading sequence of the book.

2. An augmentative and alternative communication (AAC) reading system as claimed in claim 1 wherein the dictionary data includes for each word record phonetic data to enable reproduction of the whole word by the user interface module; and sounding out data to enable sounding out of components of the word.

3. An augmentative and alternative communication (AAC) reading system as claimed in claim 1 wherein a plurality of display data structures are used, each data structure defining display order for a set of n lexical elements, such that all n symbol positions on a symbol display grid will be populated for display.

4. An augmentative and alternative communication (AAC) reading system as claimed in claim 3 wherein for the set of n lexical elements in a data structure, each lexical element has a common number and type of semantically related words, such that for all word types all positions of the symbol display grid will be populated.

5. An augmentative and alternative communication (AAC) reading system as claimed in claim 1 wherein a number of display positions n is a configurable system parameter value.

6. An augmentative and alternative communication (AAC) reading system as claimed in claim 5 wherein the dictionary data stores a plurality of sets of display data structures, each set of display data structures corresponding to a different value of n.

7. An augmentative and alternative communication (AAC) reading system as claimed in claim 1 wherein the symbol library is also stored in the memory.

8. An augmentative and alternative communication (AAC) reading system as claimed in claim 1 wherein the symbol library is stored in external network accessible memory and is accessed by the AAC system via communication network.

9. An augmentative and alternative communication (AAC) reading system as claimed in claim 1 wherein the user interface module is configured to suppress display of text in conjunction with symbols based on configurable system parameters or selected operating mode for the AAC system.

10. An augmentative and alternative communication (AAC) reading system as claimed in claim 1 wherein the user interface module is configured to highlight sections of the displayed symbols based on configurable system parameters or selected operating mode for the AAC system.

11. An augmentative and alternative communication (AAC) reading system as claimed in claim 1 further comprising a vocabulary database storing dictionary data for a plurality of books.

12. An augmentative and alternative communication (AAC) reading system as claimed in claim 1 further comprising a book parsing system configured to facilitate generation of book data and word records for books.

13. An augmentative and alternative communication (AAC) reading system as claimed in claim 1 wherein the symbol display controller is configured to trigger highlighting of one or more symbols for display based on any one or more of: symbol type, word being read, and operating mode.

14. An augmentative and alternative communication (AAC) reading system as claimed in claim 1 further comprising an assessment module configured to monitor user inputs and assess symbol selection, log errors, and generate feedback regarding errors.

15. An augmentative and alternative communication (AAC) reading system as claimed in claim 14 wherein the assessment module is further configured to provide a teaching mode wherein a word in text and an associated symbol are concurrently displayed to the user, and user input monitored to determine whether or not the user inputs a correct symbol.

16. An augmentative and alternative communication (AAC) reading system as claimed in claim 1 further comprising a sounding module configured to sound out word components based on sound data for the word.

17. An augmentative and alternative communication (AAC) reading system as claimed in claim 1 wherein the m word categories are based on Fitzgerald key categories.

18. An augmentative and alternative communication (AAC) reading system as claimed in claim 17 wherein the m word categories include: noun; verb; adjective/adverb; pronouns & people; and miscellaneous.

19. A method of displaying symbols in an augmentative and alternative communication (AAC) reading system for reading a book, the method comprising the steps of:
  accessing book sequence data to determine a word identifier for a current word to be read and identifier for a display data structure including the current word;
  selecting symbol identifiers from the display data structure for n symbols to display based on the word identifier;
  accessing a symbol library using the selected symbol identifiers to retrieve symbol graphic file data for the n symbols, the symbol library storing data for a plurality of symbol records each symbol record including a unique symbol identifier and being associated with a symbol graphic file for a symbol; and
  populating n symbols display positions of an AAC symbol grid for display using the retrieved symbol data, whereby the symbol representing a meaning of the current word is displayed within the n symbols in the AAC symbol grid for selection by a user to indicate the user's reading interpretation of the current word.

20. A method of parsing book data to build data structures to be used in an augmentative and alternative communication (AAC) reading system for reading a book, the method comprising the steps of:
  analysing book text data to identify individual sentences within the book text data; and
  for each word in a sentence:
    determining a word identifier for the word in accordance with meaning of the word in a context of the sentence; and
    determining a display data structure incorporating the word, wherein the display data structure is an AAC symbol grid layout for presentation of symbols for selection by a user; and
    storing the word identifier and display data structure identifier in sentence data for the sentence.

* * * * *